May 8, 1962 L. L. WHEELER ETAL 3,033,084
BOMBING-NAVIGATIONAL COMPUTER
Filed Nov. 1, 1949 27 Sheets-Sheet 2

INVENTORS
LISLE L. WHEELER
ROBERT F. GARBARINI
BY
ATTORNEY

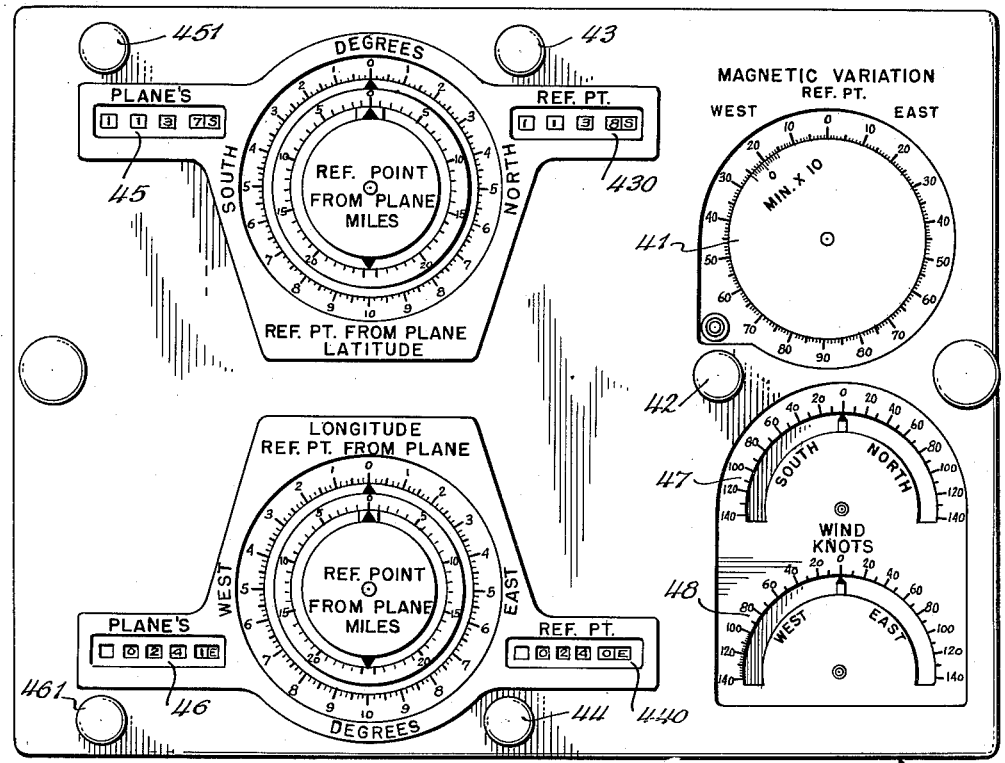
FIG. 6.
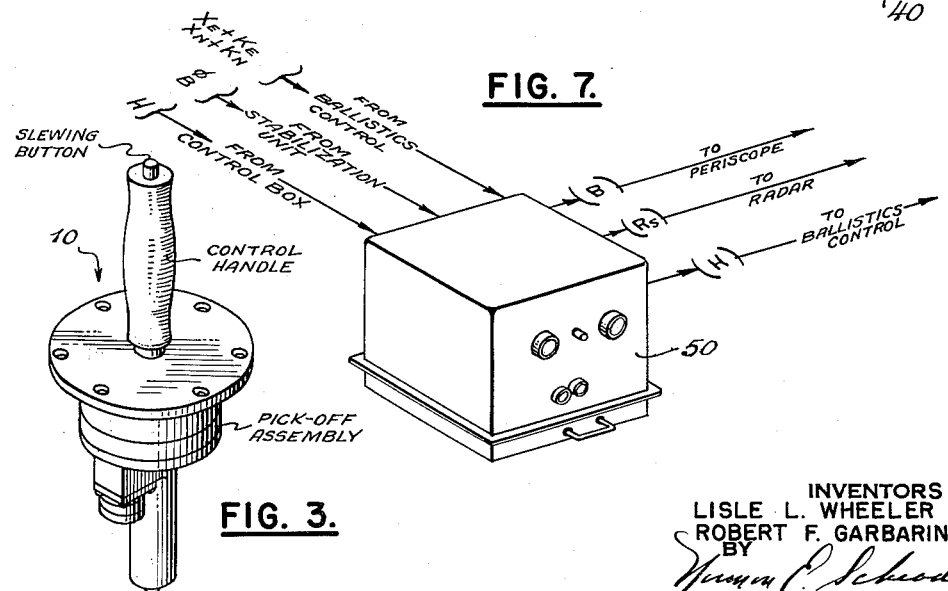
FIG. 7.
FIG. 3.
INVENTORS
LISLE L. WHEELER
ROBERT F. GARBARINI
BY
ATTORNEY May 8, 1962  L. L. WHEELER ETAL  3,033,084
BOMBING-NAVIGATIONAL COMPUTER
Filed Nov. 1, 1949  27 Sheets-Sheet 4
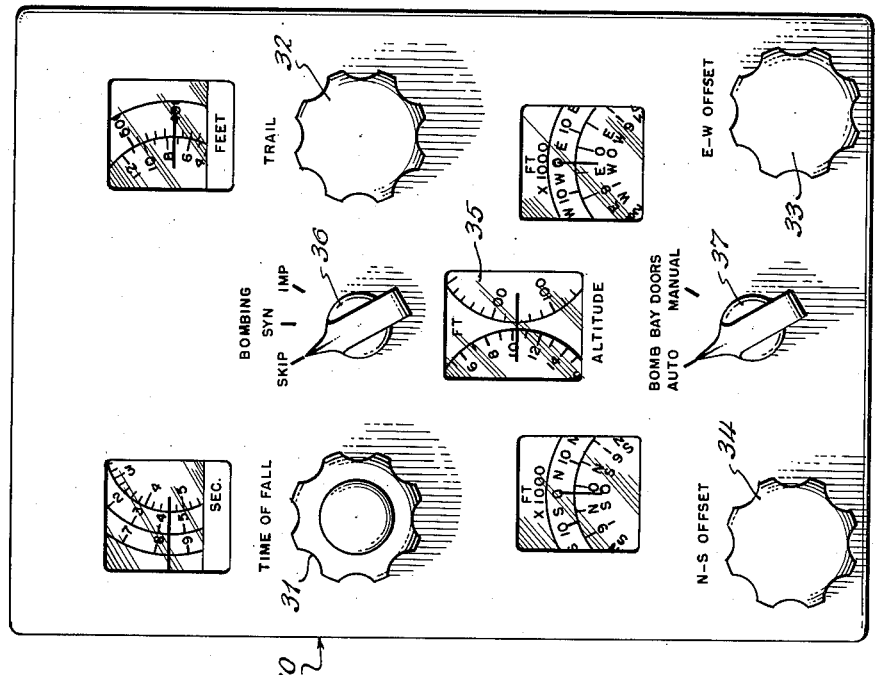
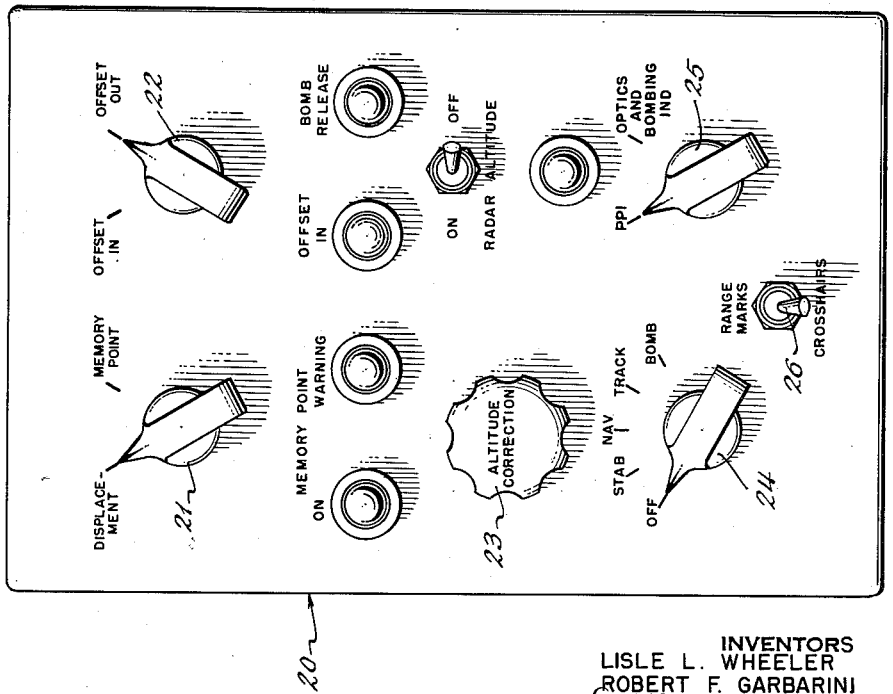
INVENTORS
LISLE L. WHEELER
ROBERT F. GARBARINI
BY
ATTORNEY

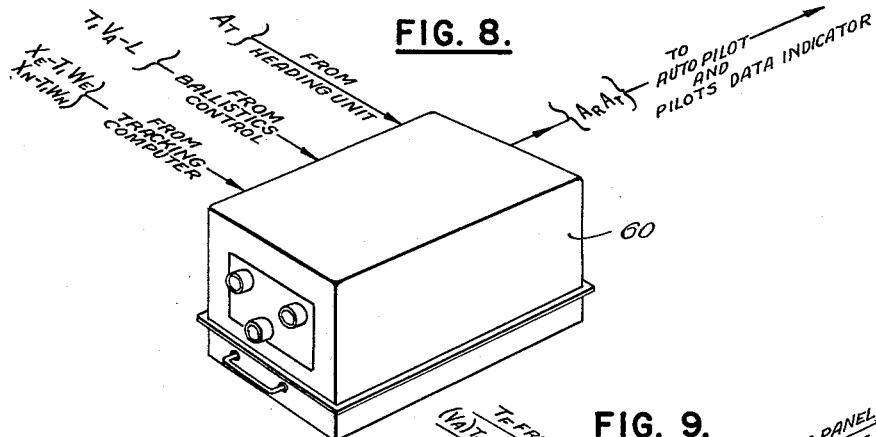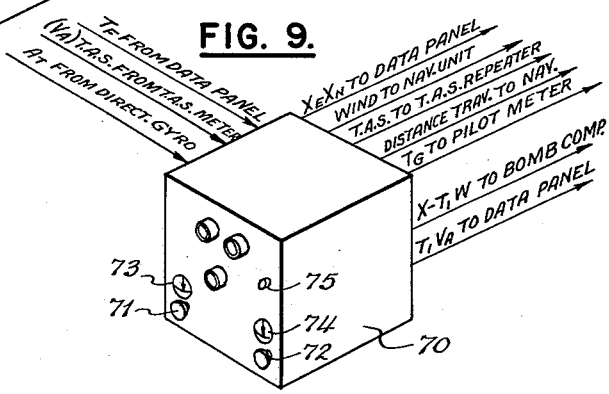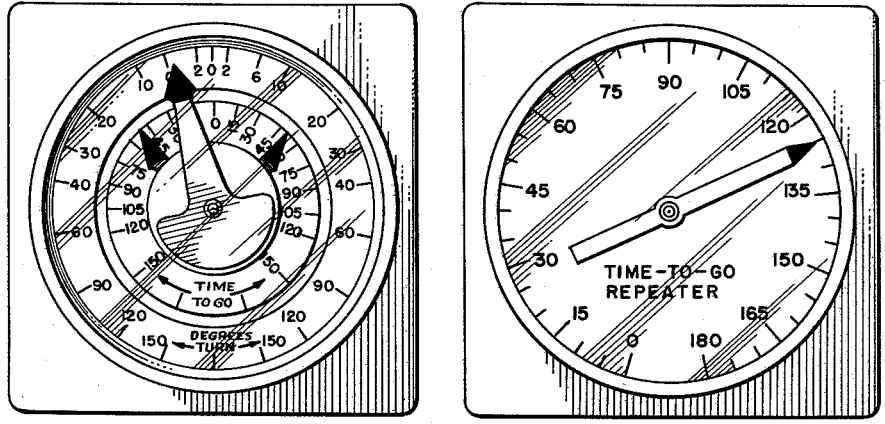

May 8, 1962 L. L. WHEELER ETAL 3,033,084
BOMBING-NAVIGATIONAL COMPUTER
Filed Nov. 1, 1949 27 Sheets-Sheet 7

INVENTORS
LISLE L. WHEELER
ROBERT F. GARBARINI
BY
ATTORNEY

May 8, 1962   L. L. WHEELER ETAL   3,033,084
BOMBING-NAVIGATIONAL COMPUTER
Filed Nov. 1, 1949                                    27 Sheets-Sheet 8

INVENTORS
LISLE L. WHEELER
ROBERT F. GARBARINI
BY
ATTORNEY

May 8, 1962 L. L. WHEELER ETAL 3,033,084
BOMBING-NAVIGATIONAL COMPUTER
Filed Nov. 1, 1949 27 Sheets-Sheet 9
FIG. 27.
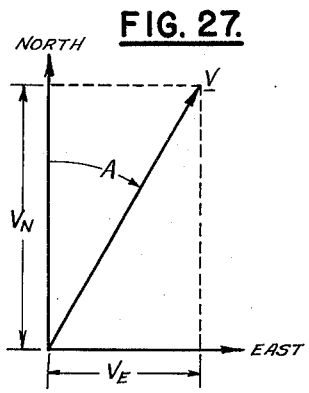
FIG. 31.
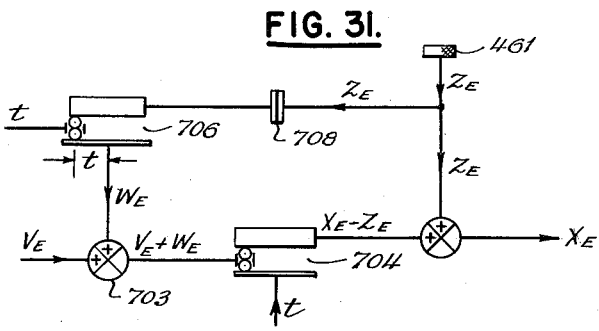
FIG. 28.
FIG. 29.
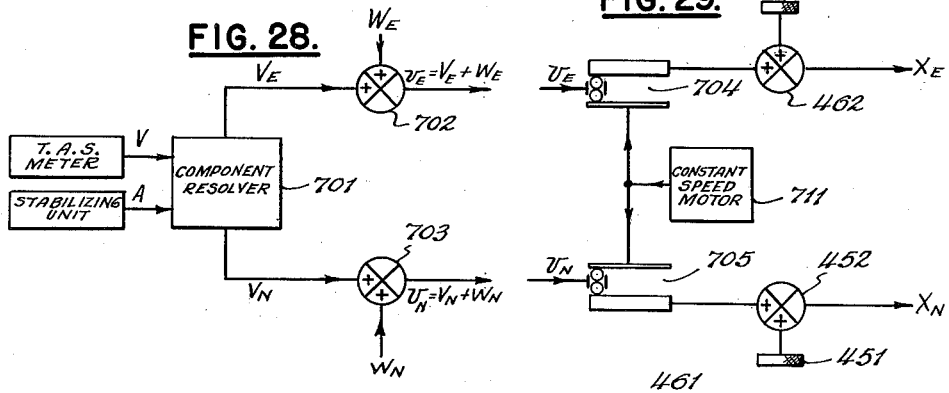
FIG. 30.
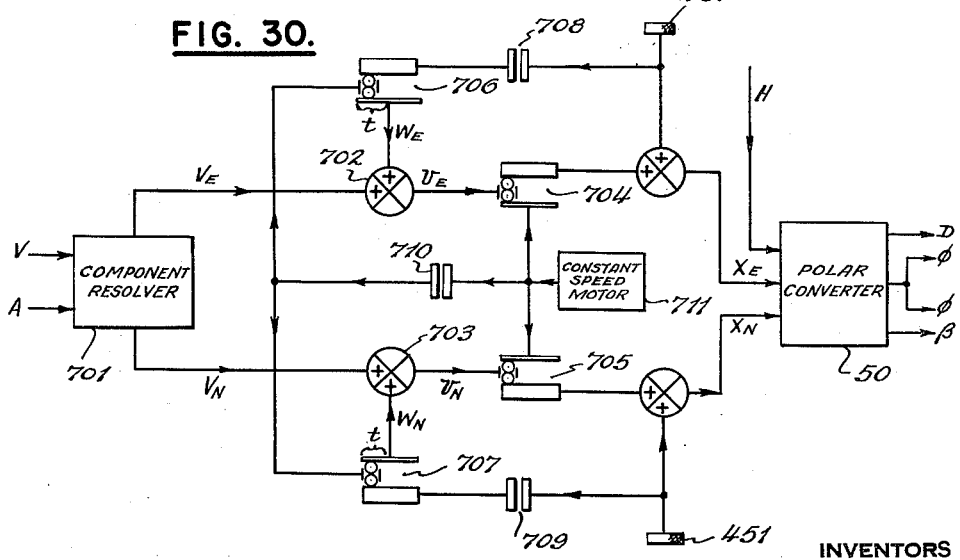
INVENTORS
LISLE L. WHEELER
ROBERT F. GARBARINI
BY
*Norman P. Schroeder*
ATTORNEY May 8, 1962   L. L. WHEELER ETAL   3,033,084
BOMBING-NAVIGATIONAL COMPUTER
Filed Nov. 1, 1949   27 Sheets-Sheet 10

INVENTORS
LISLE L. WHEELER
ROBERT F. GARBARINI
BY
ATTORNEY

INVENTORS
LISLE L. WHEELER
ROBERT F. GARBARINI
BY
ATTORNEY

May 8, 1962

L. L. WHEELER ETAL 3,033,084

BOMBING-NAVIGATIONAL COMPUTER

Filed Nov. 1, 1949

INVENTORS
LISLE L. WHEELER
ROBERT F. GARBARINI
BY

ATTORNEY

INVENTORS
LISLE L. WHEELER
ROBERT F. GARBARINI
BY
ATTORNEY

May 8, 1962  L. L. WHEELER ETAL  3,033,084
BOMBING-NAVIGATIONAL COMPUTER
Filed Nov. 1, 1949  27 Sheets-Sheet 16
FIG. 53.
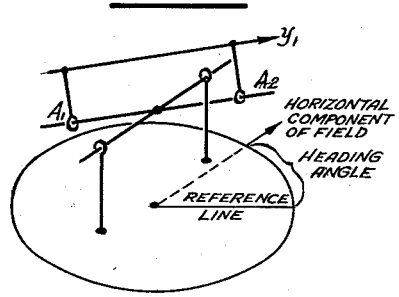
FIG. 54.
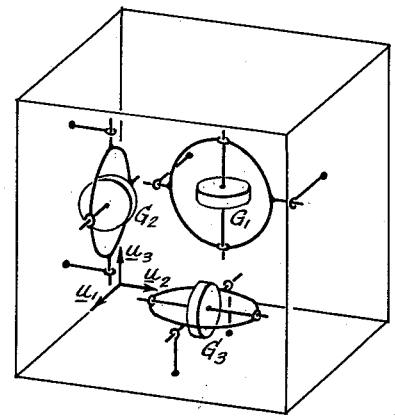
FIG. 55.
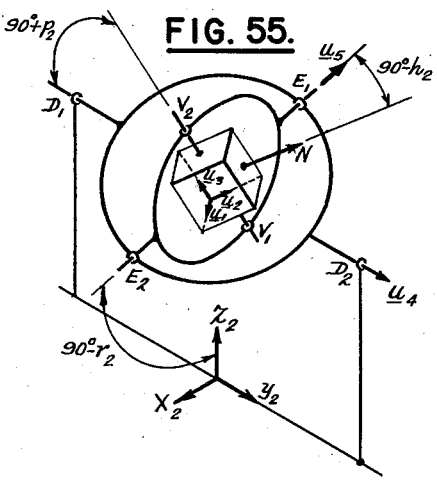
FIG. 56.
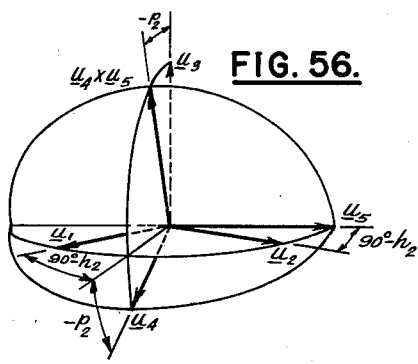
FIG. 57.
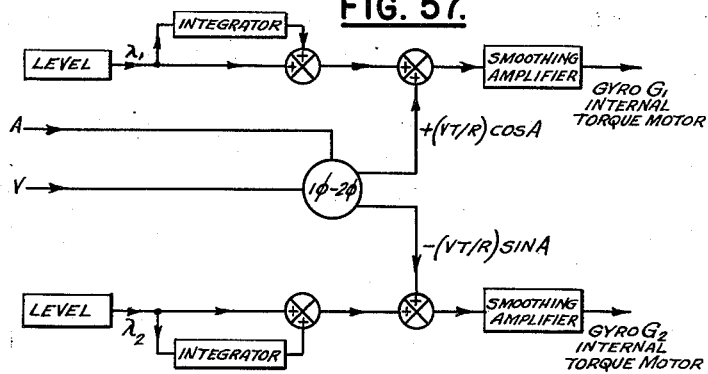
FIG. 66.
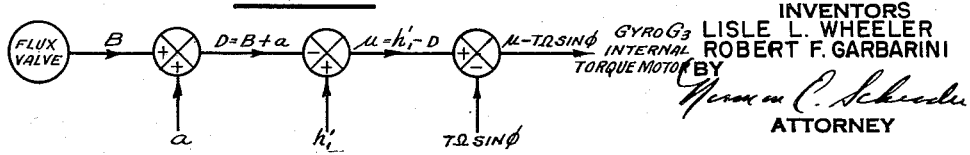
FIG. 58.
INVENTORS
LISLE L. WHEELER
ROBERT F. GARBARINI
BY
ATTORNEY

INVENTORS
LISLE L. WHEELER
ROBERT F. GARBARINI
ATTORNEY

May 8, 1962 L. L. WHEELER ETAL 3,033,084
BOMBING-NAVIGATIONAL COMPUTER
Filed Nov. 1, 1949 27 Sheets-Sheet 21

INVENTORS
LISLE L. WHEELER
ROBERT F. GARBARINI
BY
ATTORNEY

May 8, 1962

L. L. WHEELER ETAL 3,033,084

BOMBING-NAVIGATIONAL COMPUTER

Filed Nov. 1, 1949

NO EXTERNAL FIELD    WITH EXTERNAL FIELD

INVENTORS
LISLE L. WHEELER
ROBERT F. GARBARINI
BY
ATTORNEY

May 8, 1962 L. L. WHEELER ETAL 3,033,084
BOMBING-NAVIGATIONAL COMPUTER
Filed Nov. 1, 1949 27 Sheets-Sheet 23
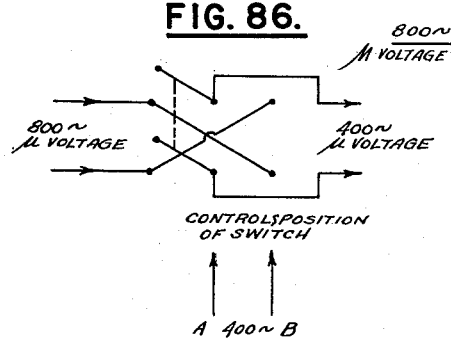
FIG. 86.
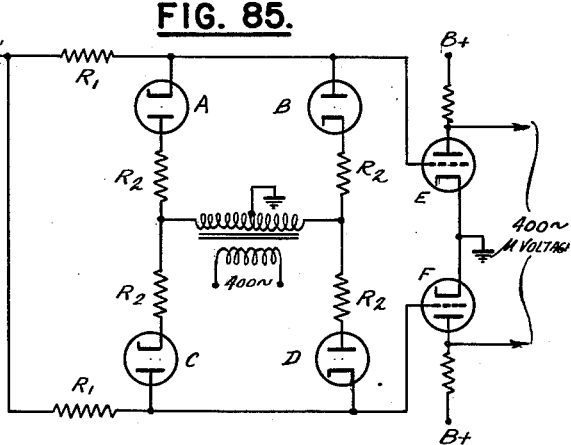
FIG. 85.
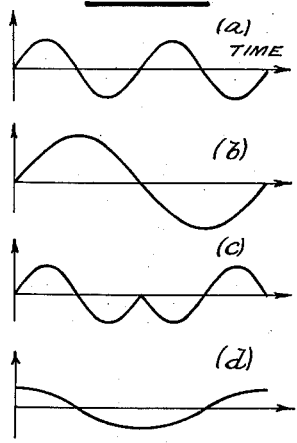
FIG. 87.
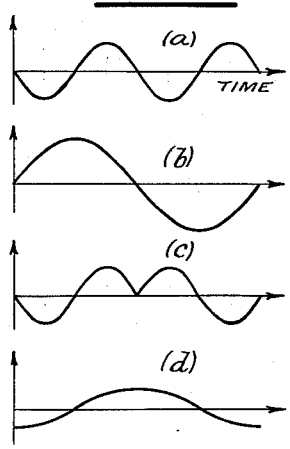
FIG. 88.
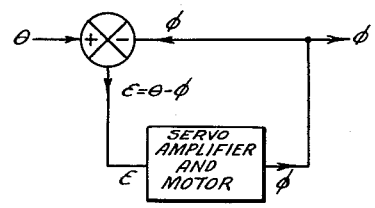
FIG. 89.
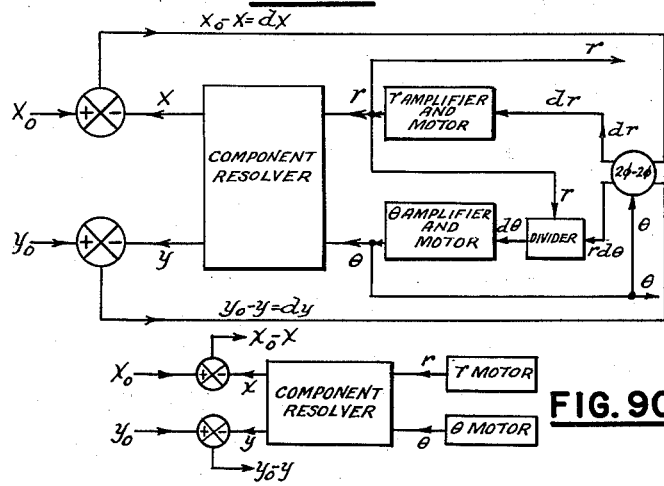
FIG. 91.
FIG. 90.
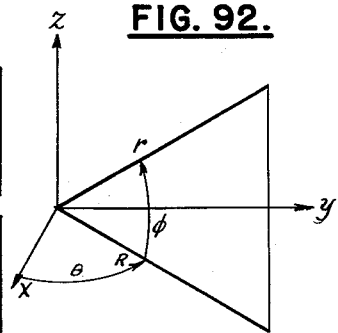
FIG. 92.
INVENTORS
LISLE L. WHEELER
ROBERT F. GARBARINI
BY
ATTORNEY May 8, 1962 L. L. WHEELER ETAL 3,033,084
BOMBING-NAVIGATIONAL COMPUTER
Filed Nov. 1, 1949 27 Sheets-Sheet 25

INVENTORS
LISLE L. WHEELER
ROBERT F. GARBARINI
BY
*James C. Schroder*
ATTORNEY

May 8, 1962 L. L. WHEELER ETAL 3,033,084
BOMBING-NAVIGATIONAL COMPUTER
Filed Nov. 1, 1949 27 Sheets-Sheet 26

INVENTORS
LISLE L. WHEELER
ROBERT F. GARBARINI
BY
ATTORNEY

United States Patent Office 3,033,084
Patented May 8, 1962

3,033,084
BOMBING-NAVIGATIONAL COMPUTER
Lisle L. Wheeler, Garden City, and Robert F. Garbarini, Woodside, N.Y., assignors to Sperry Rand Corporation, a corporation of Delaware
Filed Nov. 1, 1949, Ser. No. 124,907
9 Claims. (Cl. 89—1.5)

This invention relates to improvements in bombing and navigational computers and has as its principal object the computation of the data required accurately to navigate to and bomb long range objectives under combat conditions without the aid of external guidance.

The bombsights used during World War II were usually sufficiently accurate when employed under favorable conditions of operation. However, these conditions were so restricted that they were not realized on many bombing missions. The need for good visibility of the target was the most serious limitation, making precision bombing impossible at night, through an overcase, or even on days of generally good visibility if the target area was obscured by smoke. The development of radar presented the possibility of bombing targets which were invisible optically, and fairly satisfactory results were obtained by several more or less improvised adaptations of existing bombsights to the use of radar observations, and by the incorporation in radar sets of rudimentary forms of bombing computers. Another restriction was the need for a straight approach to the target for a period of about one minute prior to the instant of bomb release, thus making the bomber particularly vulnerable to anti-aircraft fire. Although methods of using conventional bombsights to allow limited evasive maneuvers were evolved during the course of the war, such methods complicated the operation of the sights without permitting appreciable freedom of action.

Although not a part of the bombing problem as such, accurate navigation to the target is as important to the success of a mission as is accurate bombing when the target area is reached. During the war many expedients were employed to guide bombers to their targets because of the inadequacy of the dead reckoning method of navigation when used in high speed combat planes. For the most part, these expedients consisted of flares or homing beacons, dropped by pathfinder planes or set by agents in enemy territory, or various types of radio guidance. However, the flares and beacons were extremely difficult to place accurately in heavily defended areas, and any sort of radio guidance was subject to jamming as soon as the enemy determined the particular method employed. Furthermore, such types of guidance required a degree of coordination between the bomber and guiding agent that was frequently difficult if not impossible to attain in combat. As a result many missions failed because of inability to locate the proper target.

The present invention was developed to overcome the restrictions incident to the use of conventional bombsights and guidance systems. To this end, in addition to its principal object, the invention has the following objects:

To determine wind velocity and wind direction for use in the solution of the bombing and navigation problems;

To compute either a synchronous or an impact solution of the bombing problem, as required;

To compute a solution of the bombing problem in a manner to permit unlimited maneuvering of the aircraft in azimuth and limited maneuvering in altitude until the moment of bomb release;

To compute the solution of bombing and navigation problems on the basis of data obtained either optically or by radar;

To compute the solution of "offset" bombing problems during either radar or optical operation;

To compute continuously the ground position of the aircraft in terms of latitude and longitude;

To compute magnetic variation data continuously in accordance with the geographic position of the aircraft and to use such data to correct the magnetic compass indication;

To compute wind data in a manner to maintain tracking stability regardless of the tracking-time interval;

To compute bomb release data in such manner that it may be refined during the bombing run, whereby bombing accuracy against stationary targets is improved and the bombing of moving targets is made practical;

To improve tracking controls so that the tracking operation is accomplished in the same coordinate system as that in which the target is observed by the operator;

To simplify the handling of bombing and navigation problems so that a single operator may act as bombardier, navigator and radar operator.

Other objects of the invention will become apparent in the course of the description.

To attain these objects in the present system (see FIG. 2) the position of the airplane relative to objects on the ground is determined by observations made by the operator through the optical periscope or on the screen of a radar indicator. A ground sweep plan position indicator (P.P.I.) presents to the operator, on the screen of a cathode ray tube, a radar map of objects on the ground beneath the airplane. The ground position of the airplane is represented by that point on the map at the center of the screen, and the map is oriented so that North is at the top of the screen. Superimposed on the map are a radial and a circular marker whose intersection defines some particular point on the ground. As an auxiliary to the P.P.I., a B-Scan "bombing indicator" provides a magnified image of the region surrounding the intersection of the markers on the P.P.I., together with corresponding superimposed markers. The field of view of the periscope contains crosshairs whose intersection lies on the same ground point as the intersections of the markers of the P.P.I. and bombing indicator, and all three intersections are controlled by the computer outputs.

In its principal mode of operation the system is a synchronous type of computer in which the intersections remain on a fixed ground point without attention from the operator once the correct wind components are set into the computer by a process of synchronization. The computer differs from conventional bombsights in permitting and retaining synchronization without regard to the motion of the airplane, whereas conventional bombsights require resynchronization whenever the airplane heading is changed. This advantage is gained through the use of automatic inputs of airplane heading and airspeed so that the synchronizing process need account only for that part of the airplane's ground speed that is due to the wind. The wind components determined by the synchronizing process are used in the continuous computation of the airplane's ground position during flight to and from a target and in the computation of bomb release data when the target area is reached.

In making a tracking run to synchronize the computer, the operator manipulates a universally pivoted control stick to bring the radar or optical intersection into coincidence with any prominent ground object. The direction of motion of the control stick corresponds to the direction of motion of the intersection, and the amount of displacement determines the speed of motion of the intersection. A three-position switch changes the mode of operation of the control stick to conform to the orientation of the field of view of the P.P.I., the bombing indicator, or the periscope. The tracking run consists of two successive settings of the intersection on the chosen object. The first setting is made with an auxiliary two-position switch in the "Displacement" position, and the switch is then thrown immediately to the "Memory Point" position to start the timing of the tracking run. At any time greater than fifteen seconds but less than five minutes after the start, the operator completes the tracking run by resetting the intersection on the chosen object and returning the switch to the "Displacement" position. If the switch is not returned before the expiration of the five-minute interval, the return takes place automatically at that time. When it is desired merely to shift the intersection from one object to another, the control stick is used to make the new setting and the switch is left in the "Displacement" position to avoid changing the wind components present in the computer.

For navigational purposes the computer adds the East and North components of wind (counted as negative if the wind is toward the West or South) to the corresponding components of air speed to produce the components of ground speed; and these, after a process of integration which takes into account the convergence of the meridians on the earth's surface, accumulate in counters which indicate continuously the latitude and longitude of the airplane. These counters are actuated only by the changes in the latitude and longitude and must be set initially to indicate the latitude and longitude when the airplane is at some known position. In order to make such an initial setting, the airplane's position is referred to some object on the ground having known values of latitude and longitude. To accomplish this the computer is provided with another pair of counters for displaying the latitude and longitude of such a reference point and setting knobs for entering the known values into the counters. The differences between the values shown on the two pairs of counters are displayed on dials which therefore indicate the component differences in position between the reference point and the integrated position of the airplane. The operation of setting the radar or optical intersection on the reference point sets up on another pair of dials the component differences in position between the reference point and the actual position of the airplane, and any discrepancy between the readings of the two pairs of dials is evidence that the integrated position of the airplane is incorrect. Setting knobs are provided for adjusting the integrated values of the airplane's latitude and longitude to bring the two pairs of difference dials into agreement, at which time the integrated values are correct.

A reversal of this process, starting from an integrated position which is assumed to be correct, enables the operator to determine the latitude and longitude of an object observed through the periscope or on the P.P.I. As an alternative to the method described above for making initial settings of latitude and longitude, a fix obtained by Loran, celestial observations, or by other means may be set into the counters which indicate the airplane's latitude and longitude.

To bomb a target the trail and time of fall of the bomb are manually set into the computer and the radar or optical intersection is set on the target when it comes within range. The pilot then receives meter indications of "Turn" and "Time-to-Go" before release. The "Turn" indication is the angle through which the airplane must be turned to put it on the proper heading for bomb release, and the "Time-to-Go" is the time that it is necessary to fly on this heading before releasing the bomb. A maneuvering approach is made possible by disregarding the "Turn" indication until the "Time-to-Go" is nearly zero and then turning the airplane to the release heading only a moment before the "Time-to-Go" reaches zero. The bomb release takes place automatically when the "Time-to-Go" reaches zero; and another signal, preceding bomb release by an interval of time adjustable between one-half and ten seconds, is available for automatic opening of the bomb bay doors. The Turn indication is also transmitted to the automatic pilot so that the final bombing approach may be made under its control. If the wind components are kept up-to-date during the flight to the target, it is necessary for the operator to make only one setting of the intersection on the target when it comes within range. As a matter of practice, it is desirable that he resynchronize the computer on the target itself whenever conditions permit.

Offset bombing is accomplished by setting on two dials the distances of the offset aiming point East and North of the target and placing the radar or optical intersection on the aiming point rather than on the target itself, but the operation is otherwise unaltered. In the arrangement disclosed the offset aiming point must be located within a square, approximately sixteen nautical miles on a side, centered at the target.

In addition to the synchronous mode of operation, the computer permits optical impact bombing at moderately low altitudes. In this operation the optical intersection does not remain fixed on the ground but moves over the ground so as to coincide at every instant with the point of impact of a bomb released at that instant. The airplane is flown in such a way as to bring the intersection into coincidence with the target, and the bomb release is operated manually when this coincidence is observed. The solution for impact bombing is exact and is carried out by the same parts of the mechanism that are used in synchronous bombing.

The computer system includes a stabilization unit for furnishing vertical and directional references. The directional reference is obtained from a gyroscope which smooths the indications of a compass transmitter (Flux Valve) mounted in the wing of the airplane. A correction for magnetic variation is made in such a way that the directional gyro lies in the geographic meridian rather than the magnetic meridian, and the indication of airplane heading obtained from it is true heading. The heading is used in the computation of navigational and bombing data and is also transmitted to a remote repeater for use by the pilot. The stabilization unit furnishes accurate roll and pitch signals to the periscopic optical system so that the direction of the line of sight is independent of the attitude of the airplane. It also furnishes signals of airplane roll and pitch for tilt stabilization of the radar antenna. The system also includes a pressure altimeter, which may be calibrated from time to time by means of radar observations of altitude for the automatic introduction of altitude.

The entire system of which this invention forms a part is an exceedingly complex and highly integrated arrangement to direct a high speed, heavy bomber for long distances over enemy or unfriendly territory and to control the release of one or more bombs on an objective. As such, it includes a good deal of equipment not pertinent to this invention. This description, therefore, is limited to that portion of the system required to provide a complete understanding of the present invention. The preferred embodiment of the invention is disclosed in the drawings, in which:

FIG. 3 is an isometric view of the tracking control;

FIG. 4 is a front elevation of the control box;

FIG. 5 is a front elevation of the ballistic control unit;

FIG. 6 is a front elevation of the navigation control unit;

FIGS. 7, 8 and 9 are block diagrams illustrating the inputs and outputs of the polar converter, bombing computer and tracking computer, respectively;

FIG. 10 is a front elevation of the time-to-go indicator;

FIG. 11 is a front elevation of the pilot's data indicator;

FIG. 27 is a diagram illustrating the components of the air speed vector;

FIGS. 28 and 29 are schematic diagrams illustrating the derivation of the components of ground speed and ground travel, respectively;

FIG. 30 is a schematic diagram of the memory point tracking mechanism;

FIG. 31 is a schematic diagram of a component of the memory point tracking mechanism;

FIG. 53 is a schematic diagram of a Flux Valve suspension;

FIG. 54 is an isometric diagram of a three-gyro stable element;

FIG. 55 is an isometric diagram illustrating the relationship of the stable element and the periscope axes;

FIG. 56 is a diagram illustrating unit vector relationships;

FIG. 57 is a schematic diagram illustrating the levelling circuit of the stabilization unit;

FIG. 58 is a schematic diagram illustrating the inputs to the internal torque motor of the directional gyro;

Figure 64:
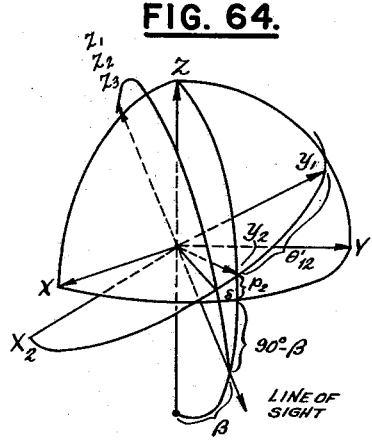
Figure 65:
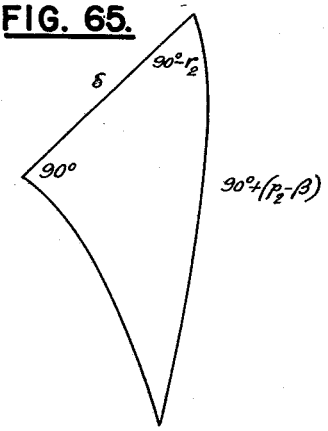
Figures 62, 63:
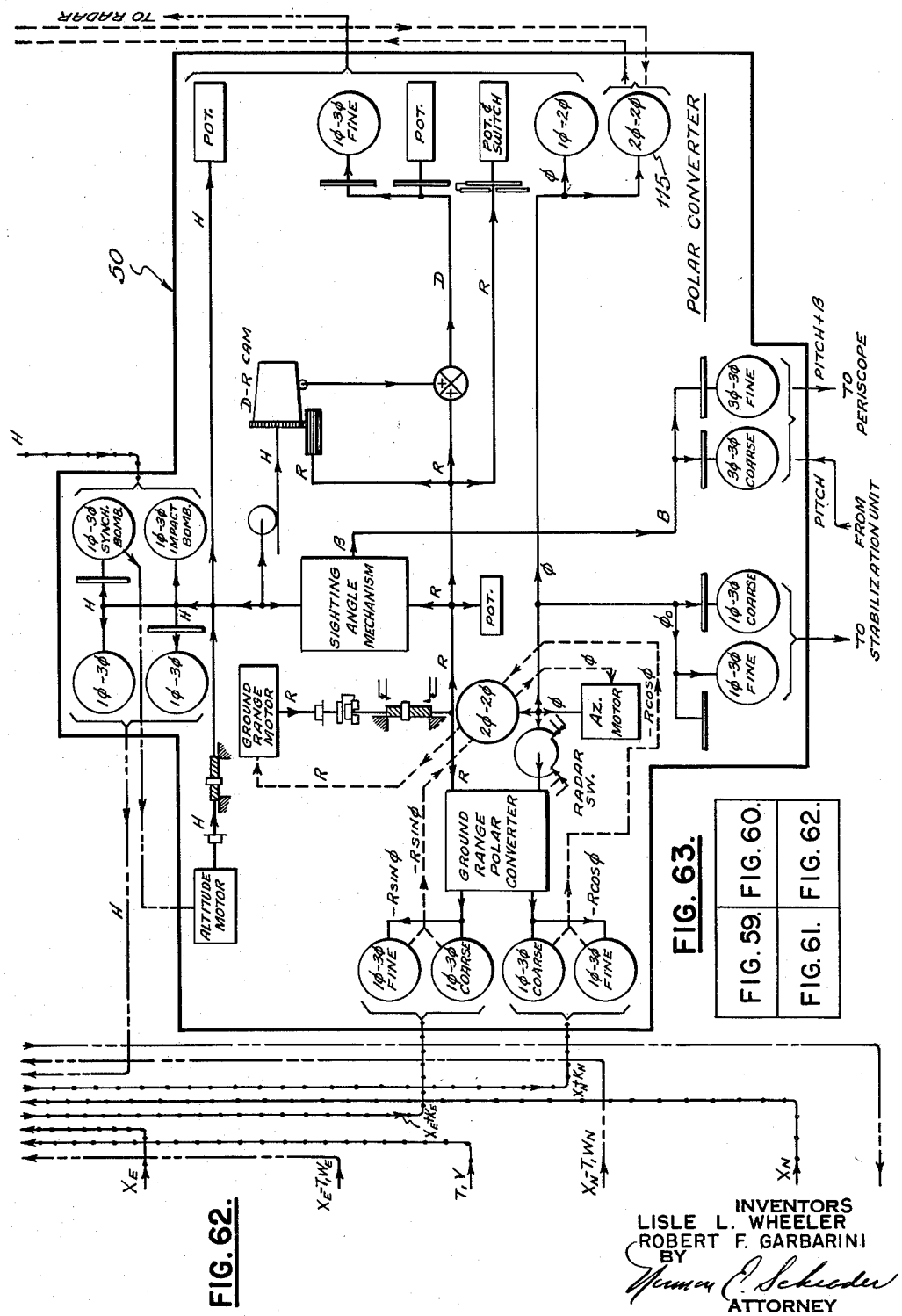
Figure 67:
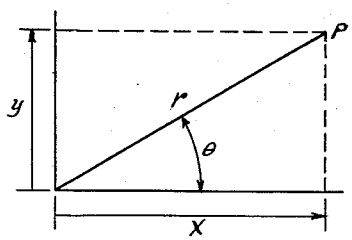
Figure 68:
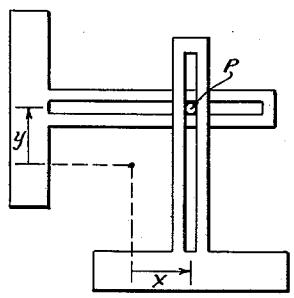
Figure 69:
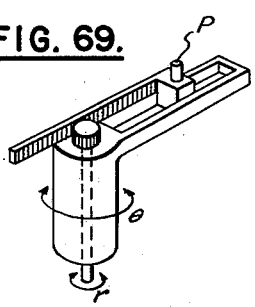
Figure 70:
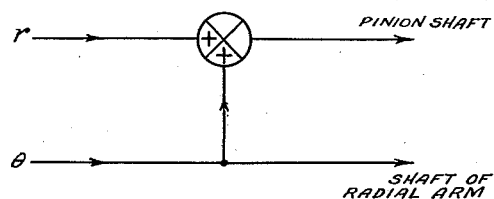
Figure 71:
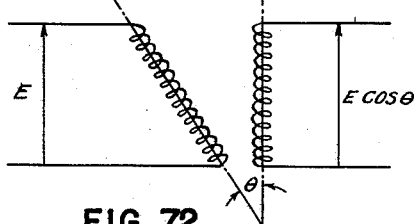
Figure 79:
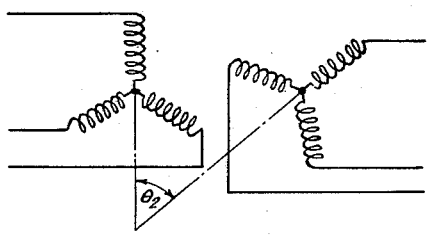
Figure 72:
Figure 80:
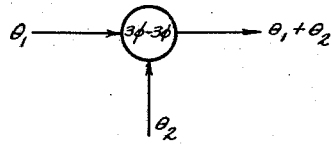
Figure 73:
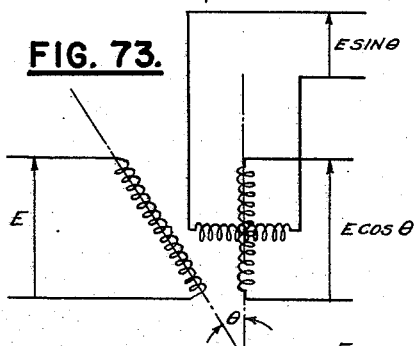
Figure 74:
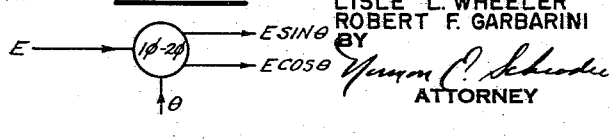
Figure 75:
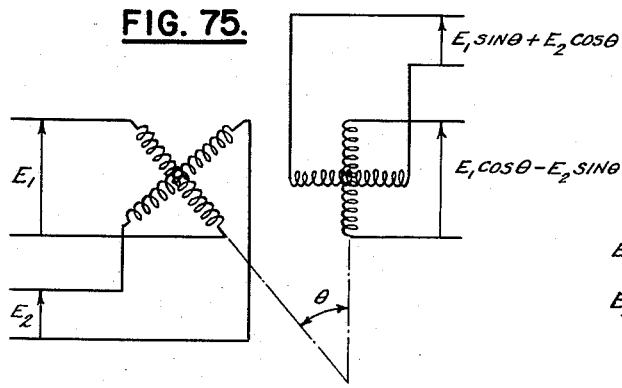
Figure 76:
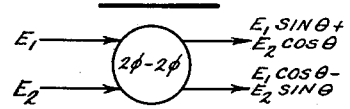
Figure 77:
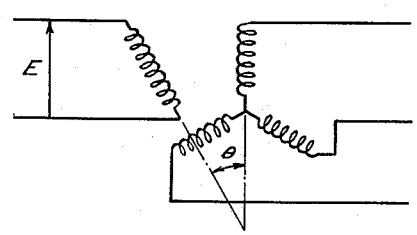
Figure 78:
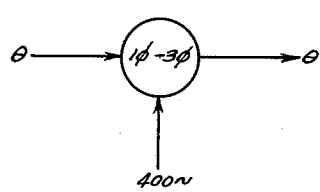
Figures 83, 84:
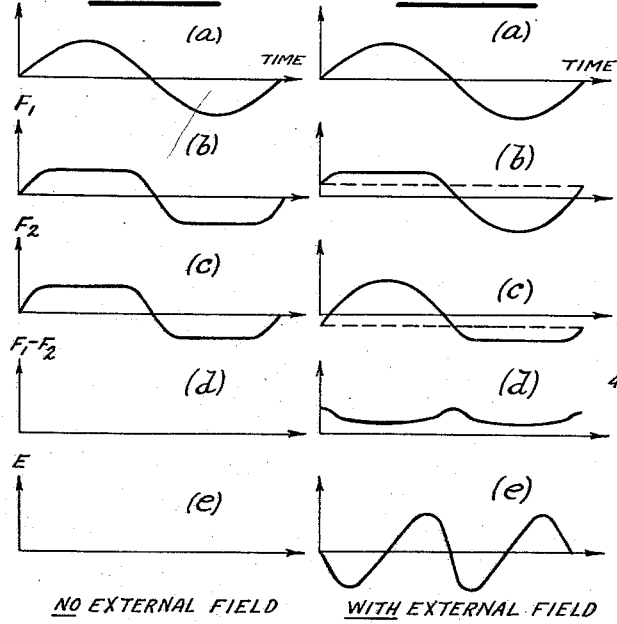
Figure 81:
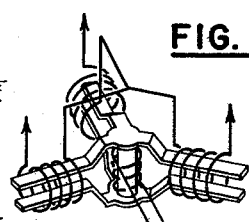
Figure 82:
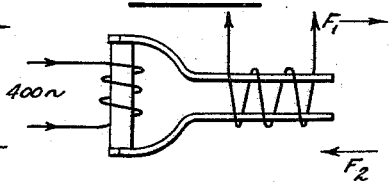
Figure 93:
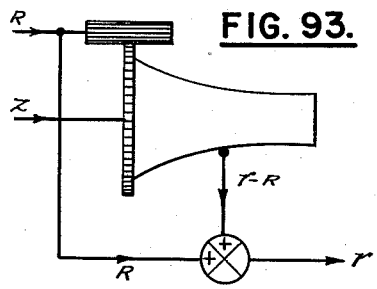
Figure 94:
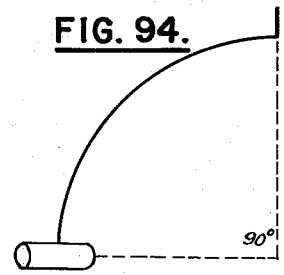
Figure 106:
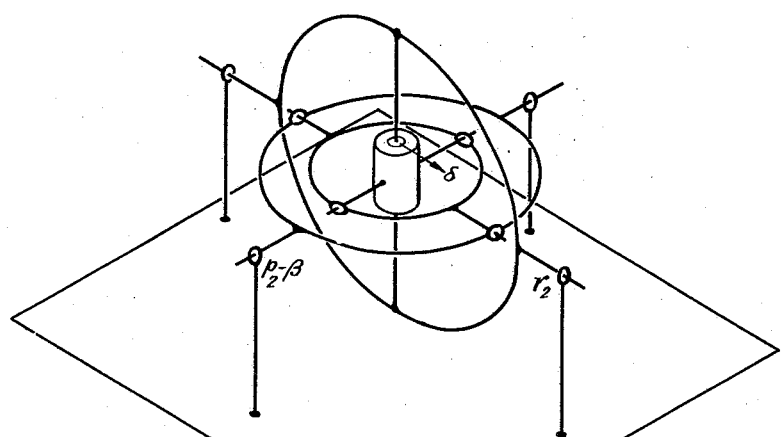
Figure 107:
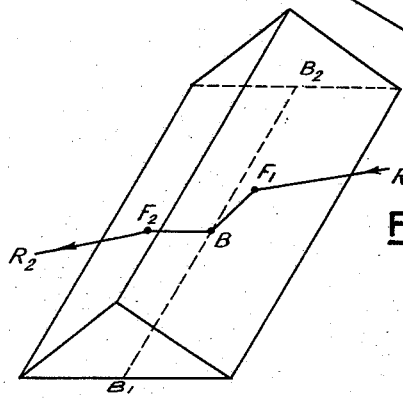
Figure 108:
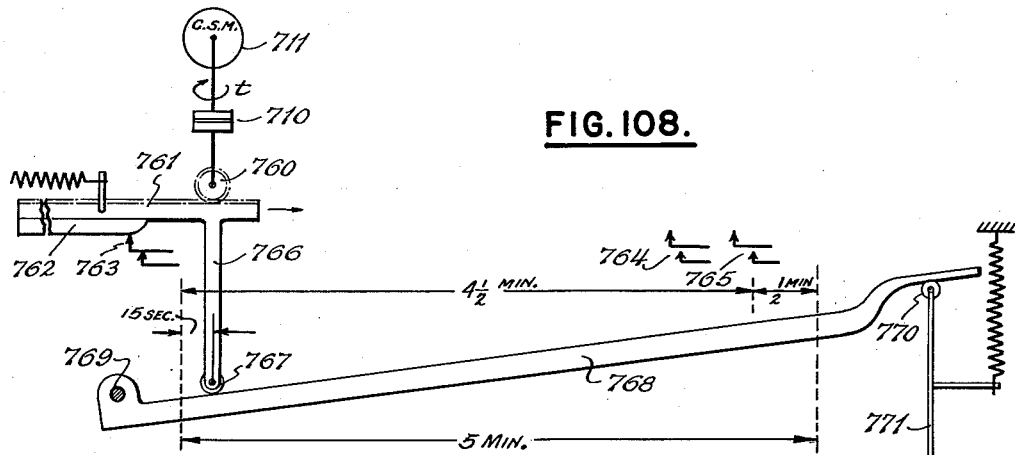
Figure 109:
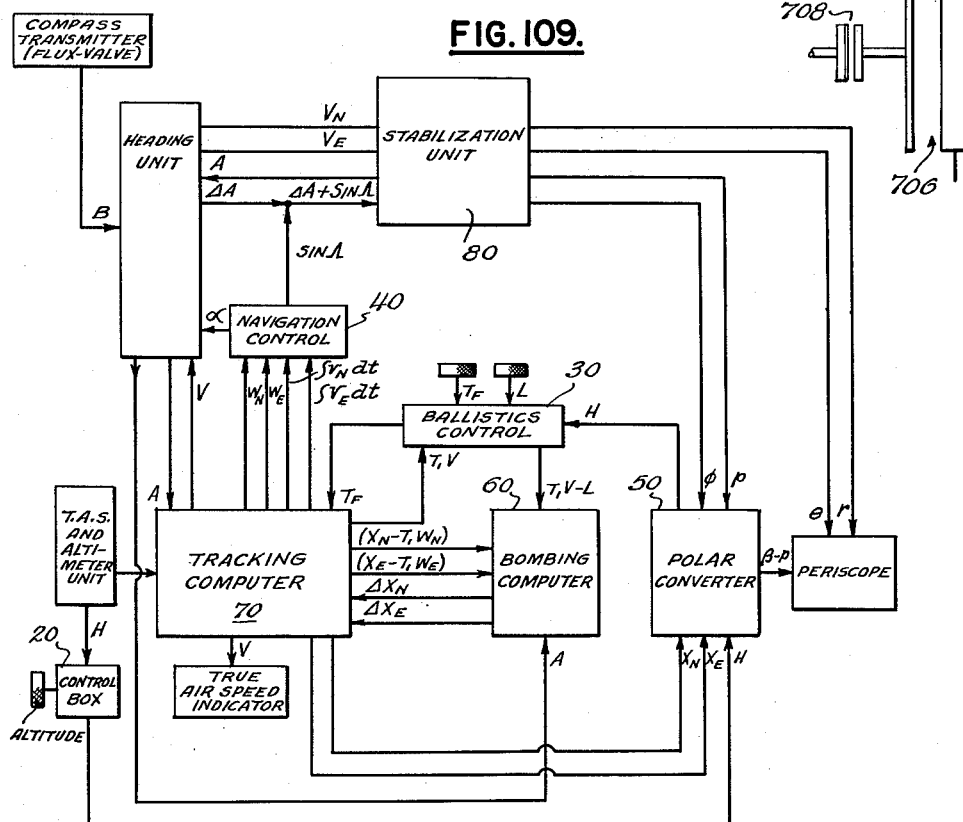
Figure 110:
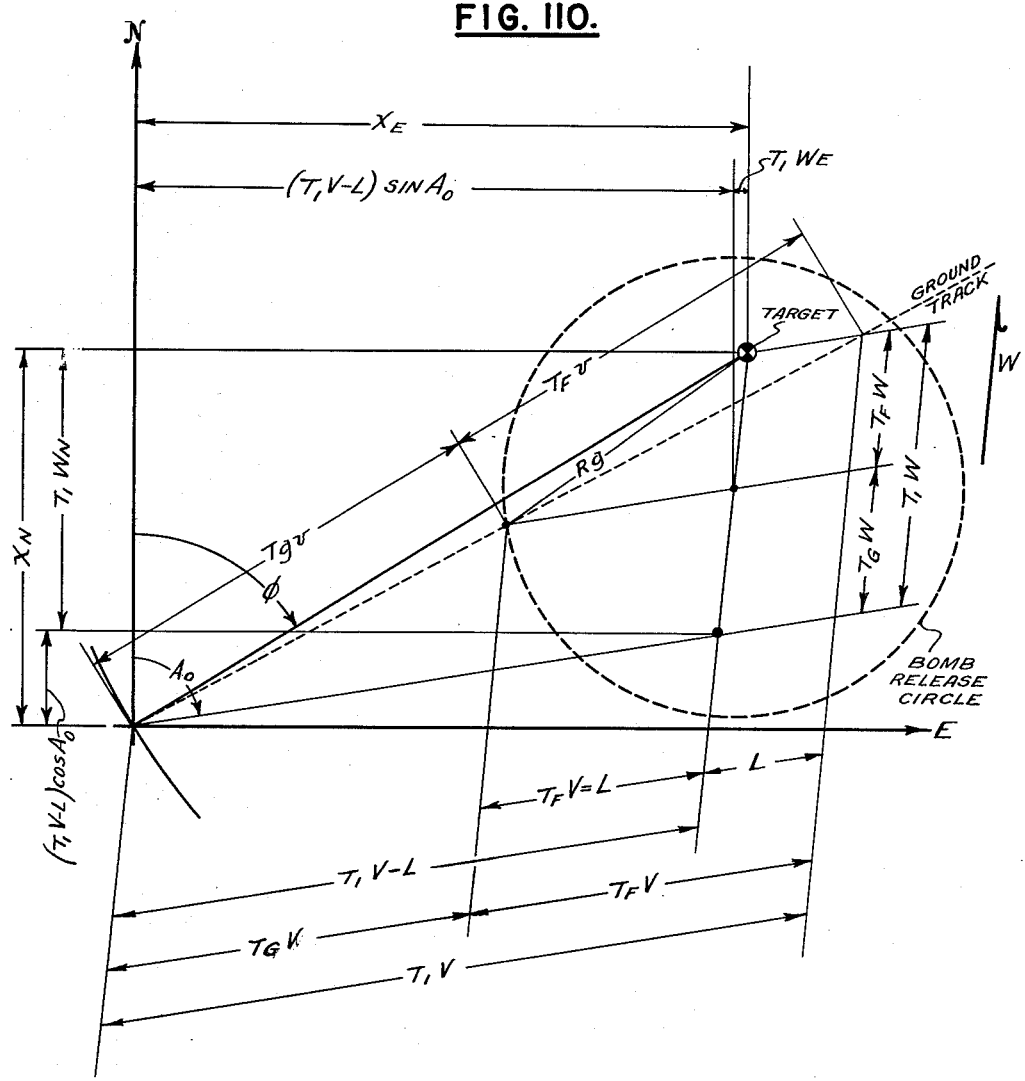

FIGS. 59, 60, 61 and 62, taken together, comprise a data flow diagram of the bombing-navigational computer of the present invention, when set for synchronous bombing;

FIG. 63 indicates the manner in which FIGS. 59–62, inclusive, are arranged to form a complete data flow diagram;

FIG. 64 is a diagram illustrating the relationship of the aircraft and stabilization unit axes;

FIG. 65 is a spherical triangle illustrating the scanner roll correction angle;

FIG. 66 is a schematic diagram illustrating the derivation of the signals to control the external torque motors of the stabilization unit;

FIG. 67 is a diagram illustrating the geometrical relationship of polar coordinates;

FIG. 68 is a schematic view of the rectangular coordinate slides of a component resolver;

FIG. 69 is a schematic view of the polar coordinate mechanism of a component resolver;

FIG. 70 is a schematic diagram of the compensating differential mechanism of a component resolver;

FIGS. 71 and 72 are schematic diagrams illustrating structure and function of a $1\phi$—$1\phi$ synchro;

FIGS. 73 and 74 are schematic diagrams illustrating the structure and function of a $1\phi$—$2\phi$ synchro;

FIGS. 75 and 76 are schematic diagrams illustrating the structure and function of a $2\phi$—$2\phi$ synchro;

FIGS. 77 and 78 are schematic diagrams illustrating the structure and function of a $1\phi$—$3\phi$ synchro;

FIGS. 79 and 80 are schematic diagrams illustrating the structure and function of a $3\phi$—$3\phi$ synchro;

FIG. 81 is a schematic view of the internal structure of a Flux Valve;

FIG. 82 is a schematic view of a single Flux Valve element;

FIGS. 83 and 84 are sets of graphs illustrating the electromagnetic relationships in a Flux Valve without, and with, an external field, respectively;

FIG. 85 is a diagram of the Flux Valve signal conversion circuit;

FIG. 86 is a diagram of an analogue of the circuit of FIG. 85;

FIGS. 87 and 88 are sets of graphs illustrating the functioning of the Flux Valve signal conversion circuits of FIGS. 85 and 86;

FIG. 89 is a schematic diagram illustrating the fundamental components of a servo system;

FIG. 90 is a schematic diagram of a means to derive rectangular coordinate error signals;

FIG. 91 is a schematic diagram of a polar converter;

FIG. 92 is a diagram illustrating three dimensional rectangular and polar coordinates;

FIG. 93 is a schematic diagram of the three dimensional cam mechanism used in the polar converter;

FIGS. 94–105, inclusive, are a series of schematic views of the elements of a gimbal computer;

FIG. 106 is a schematic view of the scanner roll computer gimbal system;

FIG. 107 is a schematic diagram of a prism;

FIG. 108 is a schematic view of the timing controls of the memory point tracking mechanism;

FIG. 109 is a flow diagram of the several elements of the invention when set for impact bombing;

FIG. 110 is a bombing diagram.

In the actual equipment, the division of the computing mechanism into separate units was dictated by the requirement that no one unit be of excessive size or weight. The particular division arrived at is that which would attain that objective with the least amount of equipment. In most cases, the separate units cannot be considered separately from a functional point of view. For example, the "tracking computer" contains not only certain mechanisms associated with the tracking operation, but also much of the mechanism needed for the solution of the bombing problem; whereas, the "bombing computer" consists primarily of a two-dimensional polar converter which is only one of the several mechanisms required for the solution of the bombing problem. Therefore, the physical divisions are disregarded in the body of the specification and no attempt should be made to place a strict interpretation on the names designating the various units. For the most part the specification is considered as reading on the flow diagrams of FIGS. 59–62, inclusive, which disclose the relationship of the essential elements of the invention to each other and to the related auxiliary devices; whereas, reference is also made to the accompanying schematic diagrams which emphasize the functions performed by various combinations of these elements. However, to facilitate an understanding of the relationship of the several major components of the system, a brief description of the actual functions performed by each follows.

Figure 1:
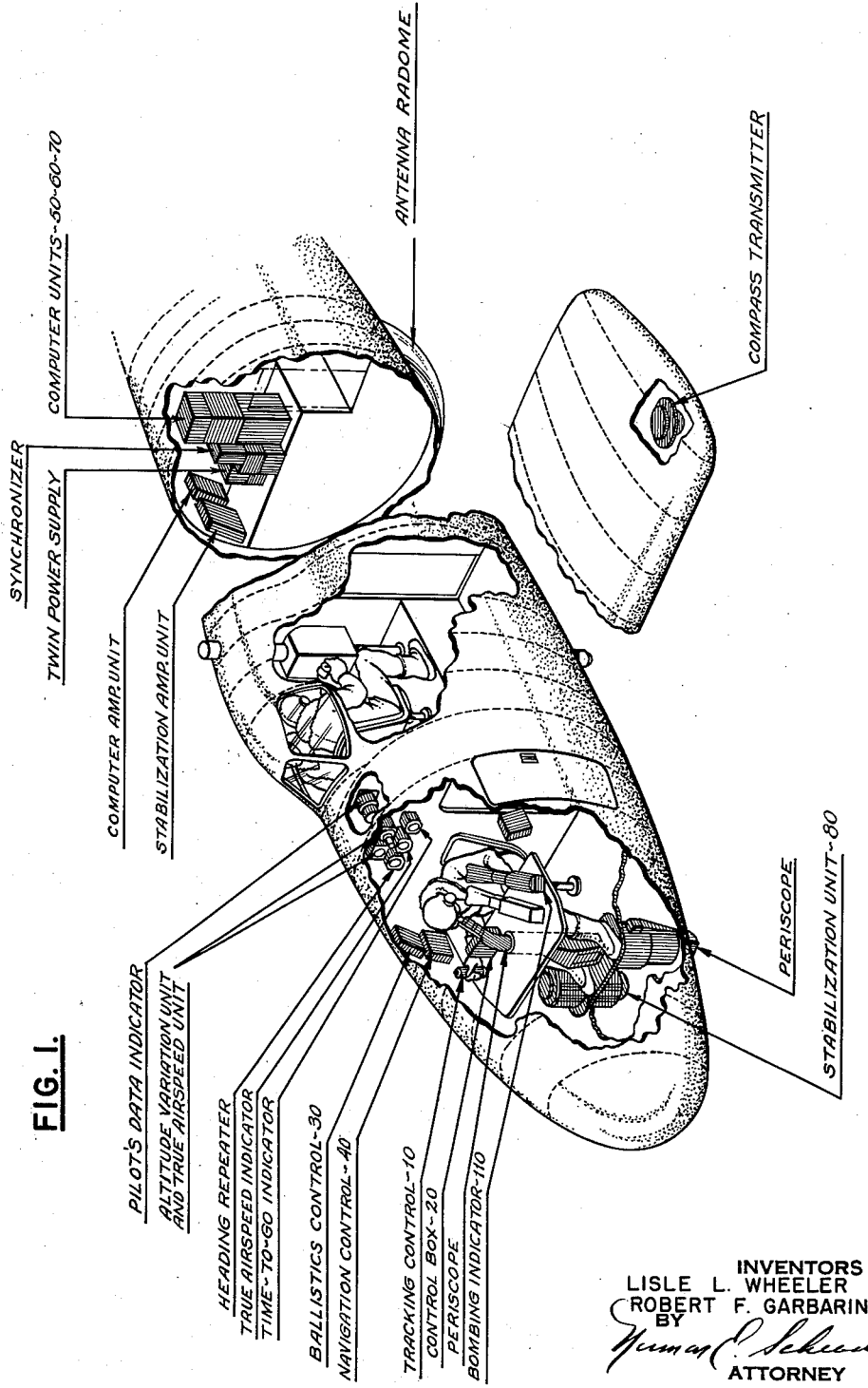
FIG. 1 illustrates the several components that comprise the bombing and navigational system of the present invention, as arranged in an aircraft.
Figure 2:
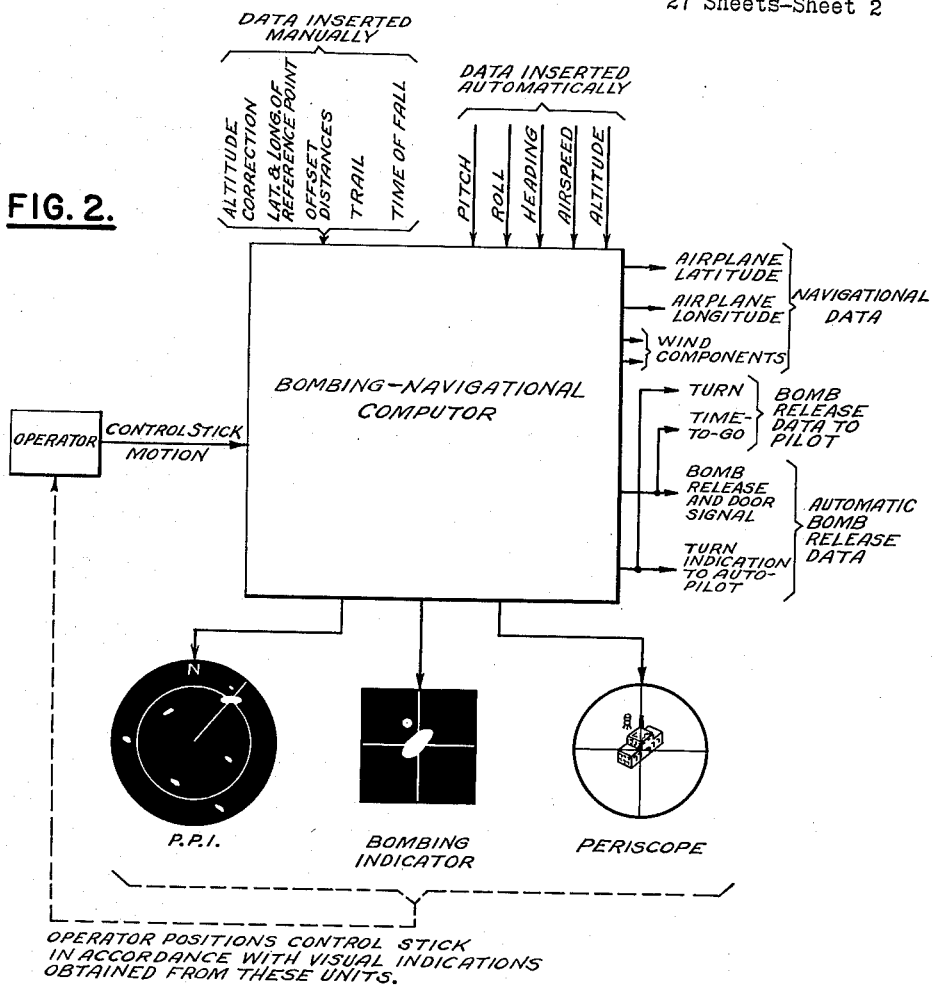
FIG. 2 is a block diagram illustrating the inputs to and outputs from the computer system.

The tracking control 10 (FIGS. 1 and 3) is used by the operator to bring the radar or optical intersection into coincidence with an object on the ground. This unit enables the operator to furnish the computing mechanism with data to determine wind, to determine the latitude and longitude of the airplane when the latitude and longitude of the object are known, or to bomb the selected object. Any suitable hand control device may be used for this purpose. For example, see Patent No. 2,414,-102, issued January 14, 1947, which provides a complete description of a device of this type.

The control box 20 (FIGS. 1 and 4) provides a central location for the primary controls for the computer. A "displacement-memory point" switch 21 is used in conjunction with tracking control 10 during a tracking run to determine wind. An "offset" switch 22 is provided for quick removal or introduction of the offset distances set on the ballistics control unit. An altitude knob 23 is provided for correcting the altitude indication furnished by the altimeter unit. A function switch 24 allows the operator to select the mode of operation desired, i.e., Stabilization, Navigation, Track, Bomb, or Off. A two-position sighting control switch 25 is provided for selecting the mode of presenting the tracking control operation, i.e. either on the plan position indicator, or on the bombing indicator and the periscope concomitantly. A two-position marker switch 26 is provided to select either the movable range and azimuth markers controlled by the computer or the fixed concentric range markers supplied by the radar set for presentation on the P.P.I. A two-position switch 27 allows the determination of altitude by radar. Suitable signal lamps are provided to indicate:

(1) That a tracking run is in progress;
(2) That 4½ minutes of the tracking run is completed;
(3) That offset distances are set in the computer;
(4) That bombs are released; and
(5) That the radar altitude calibration circuits are operative.

The ballistics control 30 (FIGS. 1 and 5) provides secondary dials and controls for the computer. A dual time-of-fall knob 31 and associated dials are provided for setting time-of-fall. A trail knob 32 and its associated dial are provided for setting trail. Knobs 33 and 34 and their associated dials are provided for setting respectively the East-West and North-South component distances from an offset aiming point to the target. Dials 35 are provided to indicate altitude so that the operator may determine the proper values of trail and time-of-fall from the bombing tables. A three-position bombing switch 36 permits the selection of synchronous, impact or skip bombing (the latter type is not considered in this description). A two-position switch 37 selects automatic or manual opening of the bomb bay doors. It should be noted that the foregoing controls when once set for a bombing run are not ordinarily changed until the run is completed.

The navigation control unit 40 (FIGS. 1 and 6) utilizes data transmitted to it from the tracking computer to determine continuously the latitude and longitude of the aircraft. This unit contains a three-dimensional cam for determining magnetic variation as a function of latitude and longitude. The value obtained from the cam is displayed on a dial 41 and is also transmitted to the stabilization unit where, in conjunction with the Flux Valve signal, it maintains the directional gyro of the stabilization unit in the geographic meridian. A knob 42 is provided to adjust the magnetic variation in cases where the value obtained from the cam is known to be incorrect. Knobs 43 and 44 and associated counters are provided for setting the latitude and longitude, respectively, of a reference point. Counters 45 and 46 are provided for displaying the aircraft's latitude and longitude, respectively. Associated knobs are provided to adjust these values when the aircraft's position is known. Wind dials 47, 48 display respectively the North-South and East-West components of wind determined by the tracking process.

The tracking computer 70 (FIGS. 1 and 9) contains a part of the mechanism for computing bomb release data and furnishing navigational data. The unit also contains the memory point tracking mechanism for determining wind, together with the controls for automatically opening the bomb bay doors and releasing bombs during synchronous bombing.

True air speed and true heading are obtained from the true air speed unit and stabilization unit, respectively. Time-of-fall and time-to-impact are obtained, respectively, from the ballistics control and the bombing computer. Tracking control signals are obtained from the tracking control directly or from a resolver in the bombing computer, depending upon the type of sighting used. From this information the tracking computer determines and transmits data to the several units of the system as follows:

The components of ground-range-to-target less wind drift components are transmitted to the bombing computer;

The navigation control is furnished with the components of ground travel, ground-range-to-target, and wind;

The "time-to-go" before bomb release is transmitted to the pilot's data indicator;

The components of ground-range-to-target are transmitted to the ballistics control where the offset components are added, if required, before transmission to the polar converter;

The product of time-to-impact and true air speed is also transmitted to the ballistics control where trail is added before transmission to the bombing computer.

The latter circuit is part of a time-to-impact servo system linking the tracking computer and bombing computer. The time base for all elements of the computer is furnished by a constant speed motor.

The tracking computer also includes knobs 71, 72 and dials 73, 74 for setting, respectively, the North-South and East-West wind components before take-off. Setting the wind components before take-off synchronizes the computer before a tracking run is made. However, since the first tracking run after take-off serves to synchronize the computer, presetting of the wind components is not necessary. A dial and screwdriver adjustment 75 is provided for calibrating the true air speed indication. It is intended that the air speed adjustment will be made only once at the time of installation of the equipment in an aircraft.

The bombing computer 60 (FIGS. 1 and 8) is employed in determining the turn angle necessary to bring the aircraft heading to the proper value for bomb release and also, in conjunction with the tracking computer, in determining the distance of the aircraft from the target. The stabilization unit provides the bombing computer with the instantaneous aircraft heading. The tracking computer and ballistics control furnish data from which the release heading and target distance are computed. The difference between the instantaneous heading and release heading is transmitted to the pilot's data indicator. A signal representing time-to-impact is transmitted to the tracking computer to control the computation of target distance which is used in the computation of time-to-go before bomb release. This unit has no external knobs or dials.

The major function of the polar converter 50 (FIGS. 1 and 7) is to determine the ground range, slant range, sighting angle, and bearing of the line of sight to the sighting point. The tracking computer and ballistics control furnish the rectangular coordinates of the distance from the aircraft to the aiming point. From this information the polar converter determines the ground range and line of sight bearing to the sighting point. An altitude signal is supplied from the control box. This data is used with the determined value of ground range to compute slant range and sighting angle. The sighting angle is corrected for errors caused by aircraft pitch by information obtained from the stabilization unit. This corrected value is transmitted to the periscope. The line of sight bearing to the sighting point is transmitted to the stabilization unit. These data, in the form of target bearing with respect to the aircraft, together with slant range and ground range data are transmitted to the radar set. The altitude signal is transmitted to the ballistics control to actuate the altitude dials. This unit has no external knobs or dials.

Figure 12:
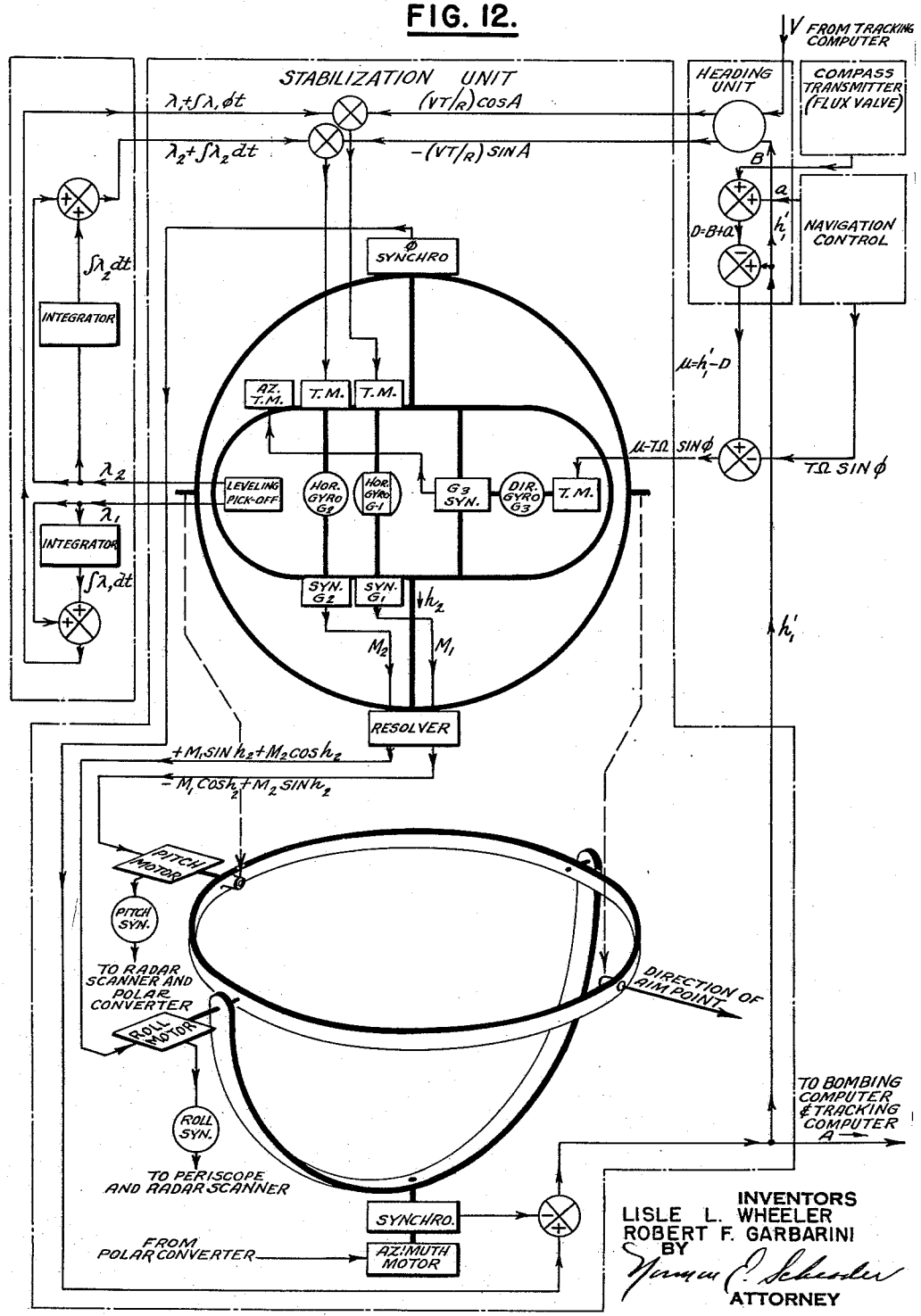
FIG. 12 is a schematic view of the stabilization unit.

The stabilization unit 80 (FIGS. 1 and 12) comprises a three-gyro stable element and its associated equipment and furnishes the vertical and directional references for the system. Although not actually a part of the stabilization unit, as such, the stabilizing system includes a heading unit in which the value of magnetic heading, obtained from the compass transmitter, and the magnetic variation correction, obtained from the navigation control, are combined to produce true heading. This value of heading is then compared to the heading that exists in the stabilization unit. The difference between these two values is applied to cause the directional gyro in the stabilization unit to precess in such a direction as to bring them into agreement. Thus, the directional gyro is slaved to the compass transmitter and acts as a stable directional reference. The stable value of true heading that results is transmitted to the tracking computer, the bombing computer, and to such other mechanisms, as required.

The stabilization unit also includes two horizon gyros and an erection system which serves to furnish a stable vertical reference. Any deviations that the aircraft makes with respect to the vertical serve to produce roll and pitch signals which are used to maintain the line of sight undisturbed by such deviations.

The system also includes a true air speed unit, a time-to-go unit (FIG. 10) and a pilot's data indicator (FIG. 11) among other auxiliary devices, that are discussed later. Also included are suitable power supplies and amplifier units to actuate the various servo loops in the system, and a synchronizer to coordinate the operation of the computer system with that of the radar set.

In explaining the system operation, the problems to be solved by the computer are first stated and are followed by an outline of the methods of obtaining the data required for the solution. The solution is then shown to depend on the performance of a number of fairly elementary mathematical operations. The block diagrams presented in this connection are to be regarded primarily as data flow diagrams which illustrate the operations and the sequence in which they are performed. In these diagrams both mechanical and electrical symbols are employed, the symbol chosen to represent a particular operation being that which is most concise or which suggests most readily the mathematical operation under consideration. The use of a conventional mechanical symbol to represent a particular operation does not imply that the corresponding computer operation must be performed mechanically. The general statement can be made that most of the computer operations which must be performed with a high degree of accuracy are performed mechanically, an exception occurring in the case of addition or subtraction, which can be carried out accurately through the use of electrical circuits employing differential synchros.

A great deal of the complexity of the entire system is a result of the need to transmit data from one to another of the separate units constituting the complete system. Obviously, for example, the radar antenna can not conveniently be mounted on a box which contains the computer mechanism. Therefore, electrical data systems are needed to transmit information from the antenna to the computer, and servo systems are necessary to transform the electrical signals into mechanical motions. These transformations in the mode of representing numerical quantities cause many practical complications without in any way affecting the general theory of operation of the system. In an attempt to explain the underlying principles as simply as possible, it is therefore necessary in most instances to omit many of the details regarding the transmission of data between units and its conversion from mechanical to electrical form. In some cases, as in the example above, it is quite obvious that the units considered are in different locations. It is convenient, therefore, to make explicit mention of the data transmission required, however, there is no attempt at consistency in this respect. In a few cases the servo systems are employed not merely to convert data from electrical to mechanical form but play an essential part in the computing process. In these instances suitable reference to the servo system is made.

THE DEAD RECKONING NAVIGATION PROBLEM

The dead reckoning method of navigation consists of inferring the present position of an aircraft by accounting for the distance and direction of ground travel from some known position of the aircraft at a previous time. A position obtained in this manner is referred to as a "dead reckoning position" of the aircraft. An accurate position of an aircraft which may be obtained by one of several other methods is called a "fix." In the past, the designation "fix" usually referred to a position determined by the methods of celestial navigation. More recently, a position determined by Loran or other similar methods is also called a fix. An even more general definition is used herein, a fix being regarded as the position of an aircraft obtained by any means which is believed to be more accurate than one obtained by dead reckoning. With this convention, the most frequent means of obtaining a fix is by simply observing ground objects near the aircraft, comparing them with a chart, and marking the position of the aircraft on the chart.

The development of radar made possible a similar process even when landmarks are obscured by atmospheric conditions or darkness. During World War II, many military aircraft were equipped with radar for use as a navigational aid. The use of radar has the further advantage that the aircraft need not be directly over the landmark which is used as a reference point. The ability to measure range and bearing by radar making it feasible to obtain a fix from a reference point twenty miles or more away from the aircraft. The navigational procedure on a long flight then consists of a sequence of steps of dead reckoning. At each step the aircraft departs from some fix and a record of its dead reckoning position is kept until another fix can be obtained. The dead reckoning position is then abandoned, and the fix serves as the starting point for a new step of the process.

The basic instruments of dead reckoning navigation are the compass, the air speed meter, and the clock. In the absence of wind, the compass and air speed meter respectively indicate the direction and speed of travel over the ground. If the aircraft is flown from a fix at a constant heading and speed, the dead reckoning position is obtained by first multiplying the ground speed by the time of travel from the fix to obtain the distance travelled, and then laying this distance off on a chart in the direction of the heading. If the air speed or heading changes from time to time, the flight is broken up into a number of intervals during each of which both of the quantities remain constant.

Throughout the specification, vector notation is used to explain certain of the problems. To simplify these explanations, all vectors are denoted by underlined symbols. The corresponding symbol without underlining denotes the magnitude or scalar value of the vector. In a few cases where this notation might be ambiguous, the magnitude is indicated by the use of vertical bars. Thus, if $\underline{V}$ is a vector, its magnitude may be indicated by V or $|\underline{V}|$.

Figure 13:
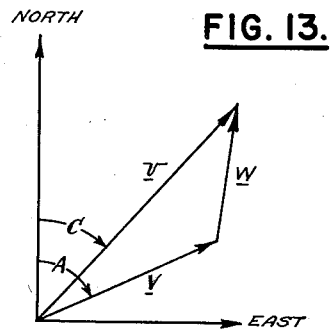
FIG. 13 is a wind triangle illustrating the effect of wind on ground speed.

The effect of wind in producing a ground speed different from the air speed is illustrated by the wind triangle of FIG. 13. Let $\underline{V}$ be a vector representing the air speed of the aircraft so that the magnitude of V of $\underline{V}$ is proportional to the air speed and the direction of $\underline{V}$ is the direction of the motion of the aircraft relative to the air mass. Assuming there is no side slip, the aircraft moves through the air mass in the direction of its longitude axis so that the direction of $\underline{V}$ specified by the heading angle A obtained from the compass. The magnitude V is supplied by the air speed meter. Similarly, wind can be specified by a vector $\underline{W}$ whose magnitude W is the speed of the air mass relative to the ground and whose direction is the direction of motion of the air mass relative to the ground. Then the ground speed vector $\underline{v}$ of the aircraft is represented by the vector sum $\underline{v}=\underline{V}+\underline{W}$ formed according to the rule of vector addition. The magnitude v of $\underline{v}$ is the ground speed of the aircraft, and the direction of $\underline{v}$ is specified by the course angle C between the North direction and the direction of motion of the aircraft relative to the ground. If the wind vector is known in magnitude and direction and the air speed vector is determined, the ground speed vector may be constructed. If the vectors $\underline{V}$ and $\underline{W}$ remain constant in magnitude and direction, the ground travel of the aircraft during an interval of time t is represented by the vector $\underline{X}=\underline{v}t=(\underline{V}+\underline{W})t=\underline{V}t+\underline{W}t$. If the vectors $\underline{V}$ and $\underline{W}$ change from time to time, the total ground travel vector may be expressed as a sum of ground travel vectors for the intervals during which $\underline{V}$ and $\underline{W}$ remain constant. This is the procedure customarily used in graphical methods of dead reckoning when changes in the air speed vector are made infrequently. For the limiting case in which the air speed and wind vectors change continuously, the ground travel is given by integral $\underline{X}=\int_0^t \underline{v}dt = \int_0^t \underline{V}dt + \int_0^t \underline{W}dt$.

The method of determining the wind vector by means of observations made from the aircraft may now be considered. Suppose that after a fix is obtained the aircraft flies for an interval of time t and then obtains another fix. The ground travel of the aircraft during the interval is therefore a known vector $\underline{X}$. Since the air speed vector can be continuously determined by instruments carried in the aircraft, the integral $\int_0^t \underline{V}dt$ may be evaluated, and hence $\int_0^t \underline{W}dt = \underline{X} - \int_0^t \underline{V}dt$ can be found. It is not possible to obtain the instantaneous wind vector from this equation. However, if it is assumed that $\underline{W}$ remained constant during the interval t, then $\int_0^t \underline{W}dt = \underline{W}t$ and the wind vector is obtained by dividing $\underline{W}t$ by the known time interval t. If the wind vector does not remain constant during the interval t, the vector obtained by this process is the averge value of the vector $\underline{W}$ during the time t. By taking a small enough value of t, this average value can theoretically be made to approach an instantaneous value. In taking a small value of t, however, the unavoidable errors in determining the end-points of the ground travel vector $\underline{X}$ become more serious so that in practice an average value is more useful than a supposedly instantaneous value.

It should be pointed out that only the relative positions of the two fixes used in determining the ground travel vector need be known. The position of the second fix relative to the first is, in fact, the desired ground travel vector $\underline{X}$. This fact is of importance in the operation of this system because it makes possible the determination of the wind vector from two observations of any object on the ground, whether or not its position is known.

In the preceding discussion it is assumed that the earth is flat. This assumption is justified in determining wind because any region of the earth over which the wind can be regarded as constant is small enough so that the surface of the earth can be regarded as a plane. It is not necessary to take explicit account of the curvature of the earth during a flight on which fixes can be obtained frequently, since any slight error in a dead reckoning position due to curvature is eliminated when the dead reckoning position is relaced by a fix. During long flights on which fixes cannot be obtained, special charts may be used to minimize the error caused by earth curvature. In this system, the earth is regarded as flat for the purpose of wind determination, but its curvature is automatically taken into account in computing latitude and longitude, as described below.

THE BOMBING PROBLEM

In the bombing problem it is usually assumed that the wind is constant in magnitude and direction at all altitudes, or that the air mass moves as a whole over the surface of the earth. In addition, it is usually assumed that the bomb is released from an aircraft in level flight. Since the aircraft moves through the air mass in the direction of its longitudinal axis, the motion of any particular type of bomb with respect to the air mass is completely specified by prescribing the altitude and speed of release. The characteristics of the motion which are ultimately of interest in the practical solution of the bombing problem are the time-of-fall $T_F$ and the range of the bomb.

Figure 14:
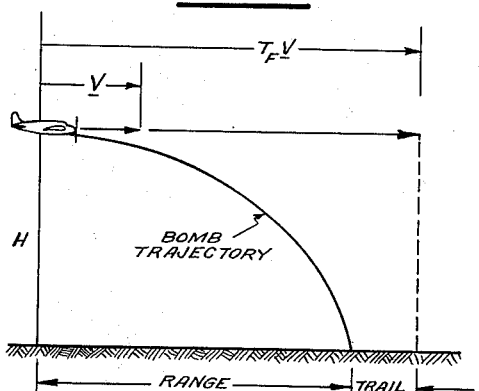
FIG. 14 is a diagram illustrating the elements of the bombing problem.

In FIG. 14 it is assumed that there is no wind so that the air mass is stationary with respect to the ground. The trajectory of the bomb then lies in the fixed vertical plane containing the air speed vector $\underline{V}$ of the aircraft. The time-of-fall $T_F$ of the bomb depends largely upon the altitude H of the release point and, to a lesser extent, upon the air speed V at release. If there were no air resistance and the aircraft maintains its course and speed, the bomb would remain directly below the aircraft as it falls. However, the resistance of the air causes the bomb to lag behind the aircraft with the result that, during the time-of-fall $T_F$, the travel of the aircraft is $T_F V$ while the horizontal travel (range) of the bomb is less than $T_F V$ by the amount of the trail L. Because the trial is smaller, it is a more suitable quantity than the range for tabulation in the bombing tables. As is the case with the time-of-fall, the trail also depends on both the altitude and the air speed. For every type of bomb, the bombing tables exhibit time-of-fall and trail in tabular form with arguments H and V. Although present bombing tables give the "trail" ratio in mils=1000 $L/H$ instead of L, the trail in feet, the latter quantity is given in tables prepared for use with this system.

In order to account for the wind, it may now be supposed that the vertical plane of FIG. 14, instead of remaining fixed with respect to the ground, remains fixed with respect to the moving air mass. The vertical line H, which marks the position of the aircraft at the instant of bomb release, also moves with the air mass in such a way that the distance designated simply as "Range" now becomes "Range in the Air Mass" and is different in magnitude and direction from the "Ground Range." In the following derivation of the bombing equation there is no occasion to consider the latter quantity.

To determine the conditions that must be satisfied to obtain a bomb hit on a specified target, the following assumptions are made:

(1) That the aircraft is in level flight at altitude H with air speed vector $\underline{V}$;
(2) That it flies for an interval of time $T_G$, the "time-to-go" (before release); and
(3) That at the end of the interval $T_G$ a bomb is released, the time-of-fall $T_F$ and trail L of the bomb having known values depending on H and V.

During the interval $T_G$ the bomb is carried with the aircraft so that its travel with respect to the air mass is represented by the vector $T_G\underline{V}$. After release, the bomb falls for an interval of time $T_F$. During this time the travel of the aircraft with respect to the air mass is $T_F\underline{V}$ but, as illustrated, the bomb lags behind the aircraft by the amount of the trail L. To indicate direction, the trail may be expressed in the vector form $-L\underline{V}/V$, where $\underline{V}/V$ is a unit vector in the direction of $\underline{V}$. During the time-of-fall the horizontal travel of the bomb with respect to the air mass is therefore $T_F\underline{V}-L\underline{V}/V$. During the whole interval $T_I=T_G+T_F$, the "time-to-impact," the horizontal travel of the bomb with respect to the air mass is $T_G\underline{V}+T_F\underline{V}-L\underline{V}/V=(T_I-L/V)\underline{V}$. During this same interval, the travel of the air mass with respect to the ground is $T_I\underline{W}$, where $\underline{W}$ is the wind vector. The horizontal travel of the bomb with respect to the ground during the interval $T_I$ is, therefore, (1) $\underline{Y}=(T_I-L/V)\underline{V}+T_I\underline{W}$ The vector $\underline{Y}$ is then a vector from the ground position of the aircraft, at a time $T_G$ before bomb release, to the point of impact of the bomb. Equation 1 is referred to as the "bombing equation." It expresses the relation that must be satisfied by the quantities entering the bombing problem in order to obtain a hit on the target. The solution of Equation 1 depends upon which of its quantities are regarded as known and which as unknown. Certain of these quantities are definitely fixed, and others are so prescribed by tactical considerations that they may also be ragarded as fixed in advance. There is a choice as to which of the remaining quantities shall be ragarded as known. The practical choices lead to two types of solution of the bombing equation and to two corresponding types of bombing; impact and synchronous.

In every case the direction and magnitude of the wind vector are prescribed by external circumstances and cannot be arbitrarily chosen. For tactical reasons the altitude H and the magnitude V of the air speed are also fixed within narrow limits and cannot be chosen merely to satisfy the bombing equation. Since H and V are determined and the type of bomb is known, $T_F$ and L are also prescribed. The remaining quantities in the bombing equation are the vector $\underline{Y}$ from the ground position of the aircraft to the target, the time-to-impact $T_I$, and the direction of the air speed vector $\underline{V}$. The vector $\underline{Y}$ is determined by two scalar quantities; either the magnitude and direction of $\underline{Y}$, or its two components. These two quantities, together with $T_I$ and the direction of $\underline{V}$, make a total of four quantities which are not yet fixed. Since Equation 1 involves vectors in the horizontal plane, it is equivalent to two scalar equations. These two equations determine two of the four quantities mentioned when the other two quantities are given arbitrary values.

In impact bombing the direction of $\underline{V}$ is taken as the instantaneous heading of the aircraft and $T_I$ is made equal to $T_F$, i.e., $T_G$ is made equal to zero. Then, at any instant Equation 1 determines the vector $\underline{Y}$ from the present position of the aircraft to the point of impact of a bomb released at that instant. In a bombing system operating on this principle, the vector $\underline{Y}$ computed from Equation 1 controls the optical components of the system in such a manner that the line of sight falls on that point on the ground having a position $\underline{Y}$ relative to the instantaneous ground position of the aircraft. The aircraft is then flown in such a way that the line of sight moves across the intended target, and the bomb is released at the moment of coincidence of the line of sight and the target.

In the synchronous type of solution of the bombing equation, the line of sight remains continuously on the target. The vector $\underline{Y}$ in Equation 1 is therefore known at all times and the unknown quantities are the time-to-impact $T_I$ and the direction of the air speed vector $\underline{V}$ which is necessary to obtain a hit on the target. The latter quantity is the "release heading" $A_0$. The difference $\Delta=A_0-A$ between the computed release heading and the actual heading of the aircraft is the angle through which the aircraft must be turned before the bomb is released. The value of $T_I$ obtained from the solution of Equation 1 gives the time-to-go before bomb release through the relation $T_G=T_I-T_F$, and the bomb is released when $T_G=0$. A knowledge of the instantaneous values of the changing quantities $\Delta$ and $T_G$ allows the aircraft to be flown so that $\Delta=0$ when $T_G=0$. If this condition is satisfied and the bomb is released when $T_G=0$, Equation 1 shows that a hit on the intended target will be obtained.

Synchronous bombing possesses several advantages over impact bombing. Primarily, although it is not evident from Equation 1, the line of sight can be caused to remain automatically on the target. The bombardier is consequently required to make only infrequent adjustments in order to refine the placement of the line of sight on the target. As a result, the bomb release depends on an average coincidence between the line of sight and the target over a considerable period of time, rather than on the observation of a single coincidence as the line of sight passes through the target, as is the case in impact bombing. A second advantage is the greater ease with which the aircraft can be flown in order to satisfy the conditions for bomb release, since the pilot is required only to turn the aircraft until $\Delta=0$, as indicated on a meter, rather than to fly the aircraft until the line of sight is brought into coincidence with the target. Furthermore, in synchronous bombing it is possible to have the aircraft controlled through an automatic pilot to bring the actual heading into coincidence with the computed release heading and to have the bomb release take place automatically when $T_G=0$.

Occasionally, at low altitudes, the target is not visible from the aircraft until a moment before the bomb release point is reached. Under these circumstances synchronous bombing is not possible because there is not sufficient time to complete the adjustments mentioned previously and, therefore, impact bombing must be used.

FEATURES COMMON TO THE NAVIGATION AND BOMBING PROBLEMS

From the foregoing it is apparent that a knowledge of the wind vector is necessary in both dead reckoning navigation and in bombing. Both problems also require some means of referring the position of the aircraft to objects on the earth to obtain a fix during navigation or to bomb a selected target. For both purposes, optics and radar are equally useful. In developing this system it was desired to avoid duplication of the equipment needed for bombing and navigation. In achieving this end it proved possible to make the dead reckoning process almost completely automatic and to free the operation of the bombing computer from many of the restrictions that were necessary in the operation of other types of bombsights. Thus, for navigational purposes, the latitude and longitude of the aircraft can be displayed on counters which are kept continuously up to date while, in bombing, the aircraft has complete freedom to maneuver at constant altitude until a moment before bomb release.

DETERMINATION OF THE GROUND POSITION OF THE AIRCRAFT

Figure 15:
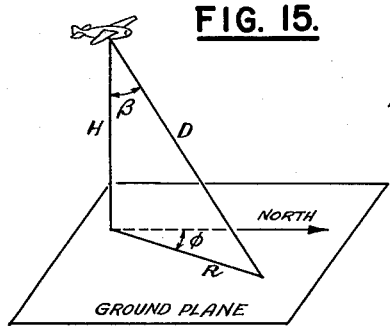
FIG. 15 is a diagram illustrating the elements involved in determining the ground position of the aircraft.

One of the most fundamental operations in a navigational and bombing computer is the accurate determination of the ground position of the aircraft with respect to some object on the ground. More precisely, if a ground object is observed by means of optics or radar, it is necessary to determine the ground range and bearing of that object. The ground range is the distance from the point on the ground directly beneath the aircraft to the object, while its bearing is the angle between the North direction and the line joining the ground position of the aircraft to the observed object. FIG. 15 illustrates the vertical triangle whose vertices are the aircraft, the point on the ground directly beneath the aircraft, and the ground object under observation. The sides of this triangle are the altitude H of the aircraft, the slant range D of the object, and the ground range R of the object. The angle $\phi$ between the North direction and the ground range line is the bearing of the ground object. The angle $\beta$ between the vertical and a line of sight to the object is the sighting angle. In both optical and radar operation, the altitude of the aircraft is assumed as a known quantity. Optical observations are capable of determining $\beta$ and $\phi$ while radar observations are capable of determining D and $\phi$ and, therefore, R can be found in either case.

In order to arrive as rapidly as possible at a description of the overall operation of this computing system, it is assumed at first that the aircraft always maintains a level attitude in flight. This assumption simplifies the description of the methods of determining the ground position of the aircraft. The stabilization features of the system, which permit the attainment of this end without regard to the attitude of the aircraft, are described under the heading "The Geometry of the Stabilized Optical System."

When the aircraft is in level flight, it is assumed that the floor plane is horizontal. If the material floor plane is not actually horizontal when the aircraft is in level flight, the floor plane is then defined as that imaginary plane, fixed in the aircraft, which is horizontal when the aircraft is in level flight. The longitudinal axis of the aircraft is defined as the intersection of this plane and the plane of lateral symmetry of the aircraft. If a telescope is mounted so that its optical axis is normal to the floor plane and if the focal plane of the telescope contains a reticle pattern, then the ground object whose image falls on the center of the reticle pattern is the point on the ground directly beneath the aircraft.

Figure 16:
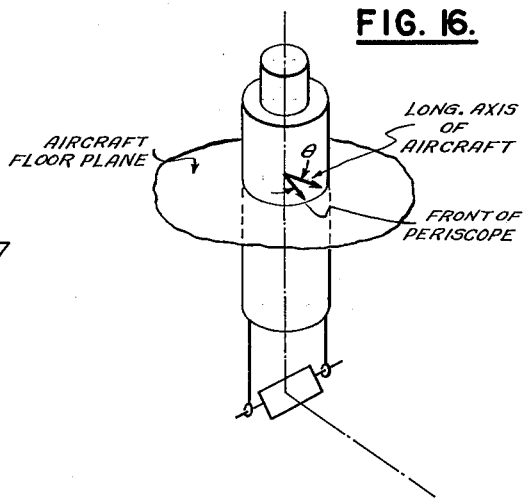
FIG. 16 is a schematic view of a simplified form of periscope.

Now suppose that a mirror is placed beneath the telescope, as illustrated in FIG. 16, and that the mirror is mounted in such a manner that it can be rotated about an axis contained in its reflecting surface, and that this axis is parallel to the floor plane. In describing the action of this mirror, and of the stabilizing mirrors to be described later, it is convenient to reverse the path of the rays through the optical system. The line of sight established by the optical system is then the path of a ray which issues from the center of the reticle pattern in the direction of the optical axis of the telescope and is reflected by the mirror beneath the telescope. The point at which such a ray strikes the ground is the point whose image falls at the center of the reticle pattern. If the normal to the reflecting surface of the mirror just described lies 45° above the horizon, it is clear that the line of sight will be horizontal. If the mirror is turned through some angle from this position, it is equally apparent that the line of sight will be turned through twice this angle. As a limiting case, when the normal to the mirror lies in the horizontal plane, the line of sight will just graze the mirror without being deflected by it and will strike the ground at the point directly beneath the aircraft. In practice such a mirror would have to be extremely large, and even then would not allow the line of sight to be directed exactly vertically.

In an actual optical system used with this invention the mirror is therefore replaced by a suitable form or prism which does not suffer from these defects. The action of such a prism is described under the heading "Computer Components," where it is shown that it deflects the line of sight in the same manner that it would be reflected by the mirror described above. Since the action of a mirror is more familiar, it seems desirable to retain it for a theoretical discussion.

As the normal to the mirror is turned from the horizontal to an angle 45° above the horizontal, the line of sight traces out on the ground a radial line emanating from the point directly beneath the aircraft. In order to change the direction of this radial line, the entire periscope, consisting of the telescope and the mirror pivoted with respect to it, can be rotated about an axis normal to the floor plane of the aircraft. Thus, it is possible to bring the line of sight into coincidence with any object on the ground by a suitable rotation of the whole periscope and a suitable rotation of the sighting angle mirror. If $\theta$ denotes the relative bearing of the line of sight, i.e., the angle between the front of the periscope and the longitudinal axis of the aircraft, then the true bearing of the line of sight is $\phi = A + \theta$, where A is the heading of the aircraft, or the angle between the North direction and the longitudinal axis of the aircraft. The sighting angle is evidently twice the angle of elevation above the horizontal of the normal to the sighting angle mirror. If the aircraft heading is available from a compass, then the sighting angle and bearing of any ground object can be determined by directing the line of sight toward that object and reading the angles of the sighting angle mirror and of the periscope rotation. When the altitude of the aircraft and the sighting angle are known the ground range R of the object can be determined.

In describing the method of obtaining the bearing and ground range of an object by means of radar, the assumption is again made that the aircraft is in level flight, the modifications necessary when this condition is not satisfied are described under the heading "The Geometry of Radar Data Stabilization." The basic principles of radar are so familiar that it is unnecessary to explain them here. However, it is desirable to describe briefly the special characteristics which distinguish an airborne search radar set from other types of radar equipment.

Figure 17:
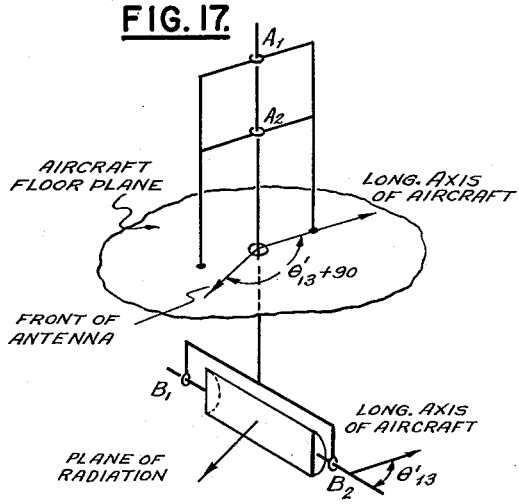
FIG. 17 is a schematic view of a radar antenna that may be used in determining the ground position of the aircraft.

While some radar antennas are designed to concentrate the radiated energy in the narrowest possible beam, the antenna of a typical airborne search set that may be used with the present system is designed to concentrate its energy in a plane. The antenna mount consists of an azimuth axis perpendicular to the floor plane of the aircraft and supported in bearings $A_1$ and $A_2$, as illustrated in FIG. 17. The azimuth axis carries bearings $B_1$ and $B_2$ whose line of centers is perpendicular to $A_1A_2$ and is therefore parallel to the floor plane. Bearings $B_1$ and $B_2$ support the tilt axis of the antenna proper which consists of a cylindrical section somewhat wider than it is high.

Figure 18:
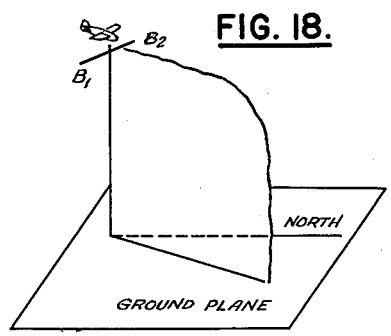
FIG. 18 is a diagram illustrating a radar antenna radiation plane.

The radiation pattern from such an antenna lies almost entirely in a plane which contains the azimuth axis $A_1A_2$ and is perpendicular to the tilt axis $B_1B_2$. Since it is intended that the radar set detect objects on the ground, the cross section of the antenna is designed so that the radiation in the plane just described is confined largely to the quarter plane included between the downward extension of the $A_1A_2$ axis and a perpendicular to the $A_1A_2$ and $B_1B_2$ axes in the direction of the front of the antenna. This quarter plane intersects the ground in some line, as illustrated in FIG. 18.

When the antenna emits a pulse of radiation, the pulse spreads out in the quarter plane and strikes the ground along this line of intersection. Any reflectors which lie on this line return a part of the energy which they receive to the antenna. The reflected energy received by the antenna is transmitted from the antenna to the receiver. If the radiation were of uniform intensity in all directions in the quarter plane of radiation, it is evident that objects nearly beneath the aircraft, being closer to the antenna, would receive a greater amount of energy than those at a greater distance. This effect would be exaggerated by the fact that reflected radiation from nearby objects would produce a greater effect at the antenna than that from more distant objects. In order to eliminate this unequal "illumination" of the ground, the antenna is usually designed with a so-called "cosecant squared" cross section which produces a greater intensity of radiation in the horizontal direction than in the downward direction. With the present assumption that the aircraft remains in a level attitude, it is not necessary to give these effects further consideration. However, it may be stated that the purpose of the tilt axis $B_1B_2$ is to allow this uniformity of illumination to be maintained even when the aircraft does not remain level.

In an airborne search set, the indicator usually employed for displaying reflected pulses is a cathode ray tube of the "Plan Position Indicator" type, or P.P.I. In such a tube the electron beam, in its undeflected position, strikes the center of the tube face. Deflection of the beam along a radius of the tube face is produced magnetically by a coil surrounding the neck of the tube. In the simplest form of P.P.I., the electron beam is undeflected just before the transmitter emits a pulse of radiation, and the current in the deflection coil is controlled in such a way that the electron beam leaves the center at the instant that a pulse is transmitted. The beam then traces out a radius of the tube face at constant speed. Because of the normal bias condition of the tube, the trace is ordinarily invisible. When a reflected pulse is received from some object on the ground, the electron beam is momentarily intensified, producing a bright spot on the face of the tube. This bright spot represents the reflecting object located on the ground. Therefore, when a single pulse is transmitted, all reflecting objects on the ground which also lie in the plane of the emitted radiation return reflected pulses to the receiver. These pulses reach the receiver at time intervals, counted from the instant that the original pulse was transmitted, proportional to the distances of the corresponding objects from the aircraft. The pulses appear on the P.P.I. as bright spots whose distances from the center of the tube are proportional to the slant ranges of the corresponding ground reflectors from the aircraft.

In the radar set used with the present invention, pulses are transmitted at the repetition rate of 800 cycles per second, with a new radial sweep of the electron beam beginning with each transmitted pulse. In order to present a P.P.I. map of objects on the ground beneath the aircraft, the antenna is rotated about the axis $A_1A_2$ of FIG. 17 at a rate of about 6 r.p.m. so that successive pulses illuminate different ground lines, all of which radiate from the point on the ground directly beneath the aircraft. The deflecting coil of the P.P.I. is rotated about the neck of the tube in synchronism with the rotation of the antenna so that successive sweeps of the electron beam take place along different radii of the face of the tube. The screen of the tube is coated with a fluorescent material of long persistence with the result that the images formed on one sweep do not decay appreciably before the sweep makes a complete revolution on the face of the tube and renews the images. The deflection coil of the P.P.I. is maintained in synchronism with the antenna by means of a servo system.

For the simplest type of P.P.I. display, this servo system is aligned in such a manner that the sweep is toward the top of the tube face when the antenna is facing directly ahead of the aircraft. There are two disadvantages to this type of display. If the aircraft turns, the relative bearings of objects on the ground change by the amount of the turn, and their images smear as they move around the face of the tube. Furthermore, the operator usually compares the face of the tube with a map which is conventionally viewed with North at the top, and the difference between the orientations of the P.P.I. and the map increases the difficulty of identifying images on the P.P.I. with objects shown on the map.

Figure 19:
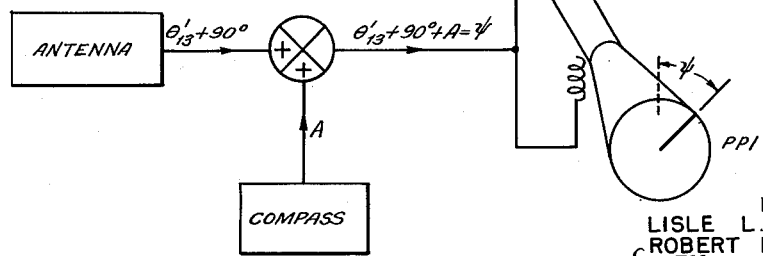
FIG. 19 is a schematic view of a North stabilized plan position indicator.

Both of these difficulties are overcome in the present system by the use of a North stabilized P.P.I. in which the heading of the aircraft is taken into account by the method illustrated in FIG. 19. Let $\theta_{13}'$ denote the angle measured in the floor plane of the aircraft between the longitudinal axis of the aircraft and the direction of the tilt axis $B_1B_2$ (see also FIG. 17), so that the relative bearing of the plane of radiation is $\theta_{13}'+90°$. This angle can be obtained as a rotation at one of the bearings $A_1$ or $A_2$. The aircraft heading A is added to $\theta_{13}'+90°$, as indicated schematically by the differential in FIG. 19, and the resulting angle $\psi$ is used to rotate the P.P.I. deflection coil so that the radial sweep takes place at a position angle $\psi$ measured from the top of the tube. By this arrangement images of ground objects are formed on the P.P.I. at position angles equal to their true bearings (measured from North) and therefore are not shifted on the P.P.I. by changes in the heading of the aircraft.

Figure 20:
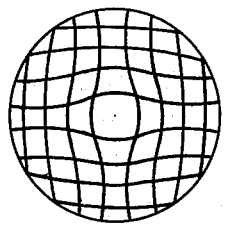
FIGS. 20, 21 and 22 are illustrations of plan position indicator patterns.
Figure 21:
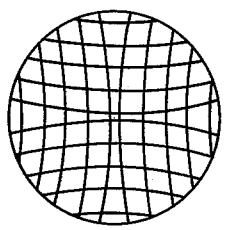
Figure 22:
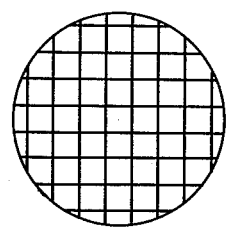

In the type of P.P.I. sweep just described, the radial distance on the tube face is proportional to slant range. The map obtained with this type of sweep is greatly distorted as illustrated in FIG. 20 which shows how a network of squares on the ground would appear on the face of the tube. The map of FIG. 20 has a blank area or hole in the center because there are no ground objects having a slant range less than the altitude of the aircraft. For the purpose of improving the appearance of the map, it is possible to delay the start of the slant range sweep by an interval of time proportional to the altitude of the aircraft. This moves all the images which appear on the screen toward the center of the screen by a distance equal to the radius of the hole and produces the delayed slant range sweep pattern illustrated in FIG. 21. If the sweep is not only delayed but is also caused to occur with a non-uniform speed, starting rapidly from the center of the tube and slowing down as it approaches the edge, it is possible to eliminate the remaining distortion and obtain a true map as illustrated in FIG. 22. Such ground range sweep circuits are in general use and, while the varying sweep speed is not exactly that prescribed by the geometry of the situation, the method is sufficiently accurate to produce a satisfactory map.

Figure 23:
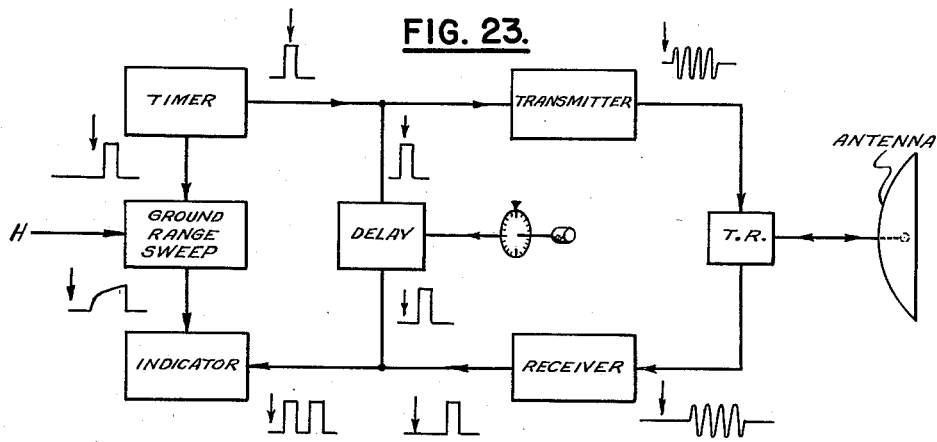
FIG. 23 is a schematic view of a slant range measuring circuit.

As described thus far, the P.P.I. presents a radar map of the ground, giving information comparable to that which would be obtained by visual observation from the aircraft. By the addition of circuits for the measurement of range and bearing, the P.P.I. becomes comparable to the periscope described above. For slant range measurement a circuit is used which can accept a pulse from the transmitter and produce a pulse at a later time. The amount of the delay can be controlled by a shaft rotation, the shaft being calibrated in slant range D and the time delay of the output pulse being the time required for a radar pulse to travel a distance 2D in space. This delayed pulse is introduced into the indicator channel as indicated in FIG. 23 and acts on the P.P.I. as an artificial reflector having slant range D from the aircraft. These delayed pulses appear on the P.P.I. after every transmitted pulse, regardless of the azimuth of the antenna, and build up a circular range mark as the sweep moves around the face of the tube. To measure the slant range of an object whose image is seen on the P.P.I., the shaft controlling the time delay is turned until the range mark falls on the image. The rotation of the shaft is then a measure of slant range.

Figure 24:
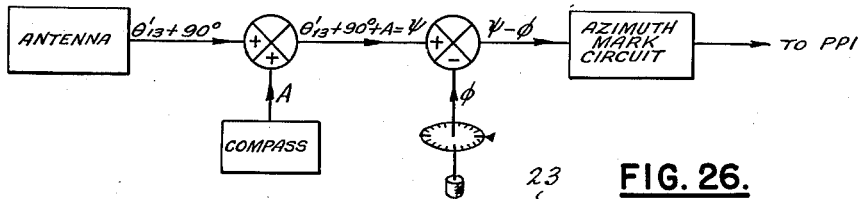
FIG. 24 is a schematic illustration of a simplified bearing measuring circuit for the plan position indicator.

A method of measuring the bearing of an object whose image is seen on the P.P.I. is illustrated in FIG. 24. The angle $\psi = \theta_{13}' + 90° + A$ is formed in the same way as in FIG. 19 and the bearing angle $\phi$ subtracted from it. The quantity $\psi - \phi$ is the input to the azimuth mark circuit which is so desired that a pulse is emitted when the value of the input passes through zero, i.e., when $\psi = \phi$. This pulse serves to intensify the electron beam of the P.P.I. in the same manner as the range pulse, but in this case the pulse is of sufficient duration to intensify the beam for at least one complete sweep and thus produces a bright radial azimuth mark on the face of the tube. Since the angle $\psi$ is at all times the bearing of the plane of radiation of the antenna, the azimuth mark occurs when the plane of radiation has a bearing equal to the angle $\phi$ introduced in FIG. 24 and, therefore, lies on the images of those objects on the ground which are at bearing $\phi$ from the aircraft. To measure the bearing of any object whose image is seen on the P.P.I., the $\phi$ shaft is turned until the azimuth mark coincides with the image. The angular position of the shaft is then the bearing of the object.

From the foregoing it is apparent that the bearing and sighting angle of any object on the ground can be determined optically by means of the periscope and that the bearing and slant range of any object can be determined by means of radar. The following description relates to the manner in which these data are combined with the altitude of the aircraft to determine its ground position.

In this system altitude is determined continuously with an aneroid type altimeter equipped with a data transmission system. The electrical altitude data operates a servo system in the computer so that a mechanical motion proportional to altitude is obtained.

Figure 25:
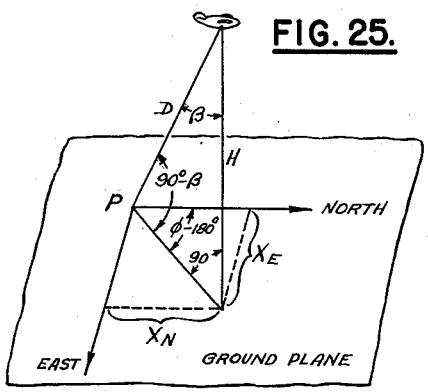
FIG. 25 is a diagram illustrating the elements involved in determining the ground position of the aircraft.
Figure 26:
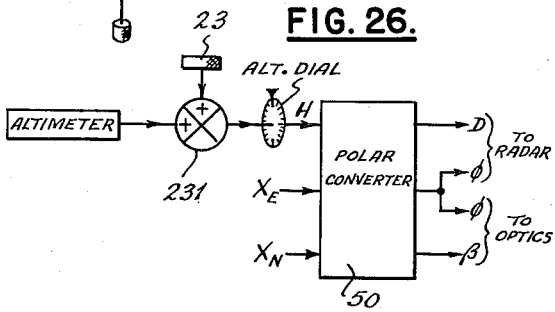
FIG. 26 is a schematic diagram of the ground position computer and altitude adjustment mechanism.

As explained above, the object of making optical or radar observations of a sighting point on the ground is that of accurately determining the ground position of the aircraft relative to that sighting point. In FIG. 25 the distances of the aircraft East and North of the sighting or reference point P are indicated by $X_E$ and $X_N$, respectively, and the altitude of the aircraft is indicated by H. Then $X_E$, $X_N$, and H are rectangular coordinates of the aircraft with respect to the reference point, while D, $90° - \beta$, and $\phi - 180°$ are spherical (or three dimensional polar) coordinates of the aircraft with respect to the reference point. The values of $X_E$, $X_N$, and H are then sufficient to determine D, $\phi$, and $\beta$. This conversion can be carried out mechanically, and the unit which performs this function in the system is polar converter 50, mentioned above. In FIG. 26 the polar converter is indicated simply as a box having inputs H, $X_E$, and $X_N$ and outputs D, $\phi$, and $\beta$.

The outputs D and $\phi$ of the polar converter are transmitted to the radar circuits where they establish the slant range and azimuth marks in the way already described, and the outputs $\phi$ and $\beta$ are transmitted to the periscope where they set up a line of sight having bearing $\phi$ and sighting angle $\beta$. Since it is assumed that the altitude input H to the polar converter is automatically kept up to date, it is clear that by varying the $X_E$ and $X_N$ inputs the values of D and $\phi$ can be changed. If the slant range and azimuth marks on the P.P.I. are placed on the image of some ground object by this process, the values of $X_E$ and $X_N$ producing this setting are the coordinates of the aircraft's ground position relative to the object under observation. A similar statement is true when the ground object is observed through the periscope instead of on the P.P.I.

When the reference point under observation is one which can be identified and marked on a chart, a knowledge of the quantities $X_E$ and $X_N$ allows the position of the aircraft to be marked on the chart, and a fix is thereby obtained. If the ground object cannot be identified, two successive observations of it nevertheless determine a ground travel vector which allows the wind vector to be found.

It is convenient to mention here that although the altitude input to the computer is kept continuously up-to-date by the pressure altimeter, provision is made to correct the altimeter indication by radar observations of altitude. The possibility of making such observations is a result of the fact that the ground or water surface directly beneath the aircraft is capable of reflecting some energy back to the aircraft even though no good radar reflectors are present. By removing the initial sweep delay mentioned in connection with FIGS. 20, 21 and 22, the "first ground return" at the edge of the circular area which contains no images whatever is quite easily distinguishable on the P.P.I. and a measurement of the slant range to the edge of this area by the method previously described gives the altitudes of the aircraft.

To allow the correction of the pressure altimeter indication, the connection from the altimeter to the polar converter contains a differential 231 and adjusting knob as indicated in FIG. 15. By throwing radar altitude switch 27 of control box 20 (FIG. 4), the values of $X_E$ and $X_N$ within the polar converter are set to zero so that, as indicated by the geometrical relationships of FIG. 25, the slant range output D of the polar converter is equal to its altitude input H. The same switch removes the sweep delay and allows the first ground return to be observed on the P.P.I. If the altitude input to the polar converter is correct, the circular range mark coincides with the first ground return, and no altitude correction is necessary. If the range mark does not coincide with the ground return, the operator adjusts the altitude by means of adjusting knob 23 until coincidence is obtained. Returning switch 27 to its original position restores $X_E$ and $X_N$ to their previous values and reinserts the sweep delay into the P.P.I. display.

In describing most of the functions of this computer, it is unnecessary to specify whether optical or radar observations are being used. In the subsequent discussion, when mention is made of the operation of setting the line of sight on a reference point, it will be understood that this phrase usually includes the possibility of setting the P.P.I. mark intersection on the image of the reference point. Since both the mark intersection and the periscope line of sight are controlled by the inputs to the polar converter, and since optical or radar observations are useful principally in determining the values of $X_E$ and $X_N$, it is ordinarily unnecessary to distinguish between the two modes of operation.

WIND DETERMINATION

An important function of this computer in both navigation and bombing is the determination of the wind vector. As previously indicated, the need for determining wind in the solution of both navigational and bombing problems is one of the principal reasons for combining in a single computer the mechanisms necessary for the performance of both of these functions.

It was explained above that the velocity of the aircraft with respect to the ground is represened by the ground speed vector $\underline{v} = \underline{V} + \underline{W}$ and that instruments are available for indicating the magnitude and direction of $\underline{V}$. Instead of specifying the vectors $\underline{v}$, $\underline{V}$, and $\underline{W}$ by their magnitudes and directions, they may be specified by their components along rectangular axes directed toward the East and North. In FIG. 27 the East and North components, $V_E$ and $V_N$, of the air speed vector $\underline{V}$ are illustrated. The aircraft heading A obtained from the compass is the angle between the vector $\underline{V}$ and the North direction, and it is supposed that the compass indication is corrected for magnetic variation so that A is measured from true North. By means of a component resolver 701 (FIG. 28), which provides a mechanical representation of the relations of FIG. 27, it is possible to convert the values of A and V obtained from the compass and air speed meter into the values of the components $V_E$ and $V_N$. The vector equation $\underline{v} = \underline{V} + \underline{W}$ is equivalent to the two scalar equations $v_E = V_E + W_E$ and $v_N = V_N + W_N$ relating to the East and North components. With the vector $\underline{V}$ continuously determined, the method of determining $\underline{W}$ is, as explained below, to adjust the components of the vector $\underline{W}$ present in the tracking mechanism until the computed vector $\underline{v}$ agrees with the actual ground speed as determined by observations of an optical or radar reference point on the ground.

At the outset, therefore, it is assumed that the wind components $W_E$ and $W_N$ are known. It will be shown how the correctness of $W_E$ and $W_N$ can be verified by observations of a reference point and how any error disclosed by these observations can be removed. FIG. 28 shows how the wind components are added by means of differentials 702, 703 to the components of true air speed to produce the components $v_E$ and $v_N$ of the ground speed. If $v_E$ and $v_N$ are integrated with respect to time by means of variable speed drives 704, 705 (FIG. 29) the outputs of these variable speed drives are the East and North components $X_E$ and $X_N$ of the ground travel of the aircraft. In order that these distances may be counted from an arbitrarily placed origin, differentials 452, 462, are placed at the outputs of the variable speed drives. FIG. 29 shows setting knobs 451, 461 connected to these differentials by means of which the values of $X_E$ and $X_N$ can be set to zero, or to any other values, by the operator. This setting operation amounts to choosing the origin of the coordinate system in which the distances $X_E$ and $X_N$ are measured. If the operator sets the values of $X_E$ and $X_N$ to zero at any instant, then the ground position of the aircraft at that instant is taken as the origin of coordinates, and the subsequent values of $X_E$ and $X_N$ are the coordinate distances of the aircraft with respect to that origin. In practice, however, the origin of coordinates is taken as some prominent object, not ordinarily directly beneath the aircraft, on which the line of sight can be precisely set. The values of $X_E$ and $X_N$ are transmitted by suitable means to polar converter 50 (FIG. 26) where they are used to derive signals to control the positioning of the periscope and radar antenna, and to the navigation control unit 40 (FIG. 6) where they are used to indicate ground position.

As explained above, the line of sight can be set on any chosen object by adjusting the values of $X_E$ and $X_N$ entering the polar converter and, when this setting is made, the resulting values of $X_E$ and $X_N$ are the coordinates of the aircraft with respect to the reference point. This setting can be accomplished by means of the setting knobs and differentials included between the variable speed drives and the polar converter. If the setting knobs are not changed after this initial setting is made, the subsequent motion of the line of sight depends entirely on the values of the components of ground speed entering the variable speed drives. Assuming then that the wind components set into the tracking mechanism are correct, the component of ground speed will also be correct, and the line of sight will remain on the chosen reference point after being initially set. If the line of sight is placed on the reference point by means of the setting knobs but subsequently moves away from it, the wind components in the computer must be incorrect.

It will now be shown how the motion of the line of sight away from the reference point gives information about the errors in the values of $W_E$ and $W_N$ and allows them to be corrected. For this purpose let $\underline{W}'$ be the incorrect wind vector whose components are set up in the computer, while $\underline{W}$ is the true wind vector. The true ground speed of the aircraft then is $\underline{v} = \underline{W} + \underline{V}$ while the incorrect ground speed vector whose components are present in the computer is $\underline{v}' = \underline{V} + \underline{W}'$. Suppose that the line of sight is placed on some object by adjusting the setting knobs, and then consider its position relative to the object after an interval of time T. The actual travel of the aircraft during this interval will be represented by the vector $T\underline{v}$ while the computed ground travel will be $T\underline{v}'$. If the computed ground travel were correct, the line of sight would remain on the object. However, the error in computed ground travel causes an equal error in the position of the line of sight. This error is $$\epsilon = T\underline{v} - T\underline{v}' = T(\underline{v} - \underline{v}') = T[(\underline{V} + \underline{W}) - (\underline{V} + \underline{W}')] = \underline{T}(\underline{W} - \underline{W}')$$

If at the end of the interval T the line of sight is instantaneously replaced on the reference point by a second adjustment of the setting knobs, the required displacements of the knobs are $$\epsilon_E = T(W_E - W_E')$$

and $$\epsilon_N = T(W_N - W_N')$$

Dividing these displacements by T gives $W_E - W_E'$ and $W_N - W_N'$, and these are exactly the errors in the wind components $W_E'$ and $W_N'$ which are present in the computer.

The preceding discussion is based on the assumption that the air speed vector $\underline{V}$ and the wind vector $\underline{W}$ remain constant during the interval T. An extension of the argument in which the multiplications by T are replaced by integrations with respect to t over the interval $0 \leq t \leq T$ shows that the result is equally valid when $\underline{V}$ and $\underline{W}$ are variable. The component wind errors determined by the process in this case being the differences between the average values of the true wind and components during the interval T and the fixed components $W_E'$ and $W_N'$ initially present in the computer.

The component wind errors determined by the process just described could automatically be applied as corrections to the wind components originally set up in the computer by connecting setting knobs 451, 461 to the wind component inputs through gear ratios of values 1/T. If these connections were made, the second setting of the line of sight on the reference point would simultaneously make the proper corrections in the wind components. However, a fixed gear ratio 1/T would require that the same interval of time T always elapse between the two settings of the line of sight.

To eliminate this restriction, a variable gear ratio is obtained by means of a variable speed drive. FIG. 30 shows variable speed drives 706, 707 for the two components added to the mechanism of FIGS. 28 and 29. A tracking system of this kind is called a "memory point" system, the mechanism effectively "remembering" the first setting of the line of sight for the purpose of determining the wind components. The variable speed drives which furnish the variable gear ratios are referred to as "memory point variable speed drives" to distinguish them from the tracking variable speed drives which integrate the components of ground speed.

At the time of the first setting of the line of sight on the chosen reference point, the ball carriages of the two memory point variable speed drives are at the centers of the disks, and clutches 708, 709 between the setting knobs and the variable speed drives are disengaged to prevent any change in the wind components during the first setting. When the first setting is satisfactory, the operator throws a switch which engages these clutches and also engages another clutch 710 between the ball carriages of the variable speed drives and the constant speed motor 711, causing the ball carriages to move away from their central positions at a constant rate. At any time T after the first setting each ball carriage is at a distance from the center proportional to T, and the value of the gear ratio between the setting knob and the wind component shaft is 1/T. The second setting of the line of sight may therefore be made at any arbitrary interval T after the first setting. In FIG. 30 the memory point variable speed drives are shown with the drums connected to the setting knobs and the disks connected to the wind shafts. In the actual mechanism (see FIG. 61), in order to increase the torques available from the variable speed drives, the disk is connected to the setting knob, the drum to the wind shaft, and the ball carriages driven through a linkage from the constant speed motor in such a way that their distances from the center are proportional to 1/T.

Theoretically, the component wind errors may be determined over any period of time T from zero seconds on. However, from an operating standpoint, it was found to be impractical to make corrections based on very small values of T. Furthermore, it was found that there is little, if any, occasion to make tracking runs in excess of five minutes duration. Therefore, the actual mechanism is provided with suitable automatic switching arrangements so that for 15 seconds after the memory point switch is thrown it is impossible to make a setting of the line of sight and, after a tracking interval of five minutes, the memory point switch is automatically returned to its original position. By this arrangement, during the first 15 seconds of a tracking run, the ball carriages of the memory point variable speed drives 706, 707 remain at the positions corresponding to T=15 seconds. At the end of five minutes the ball carriages are returned to the positions corresponding to T=15, and the clutches between the setting knobs and the memory point variable speed drives are disengaged. The performance of the equivalent mechanism in the actual equipment is the same as that of FIG. 30, the simpler mechanism being used for the purpose of illustration in the present discussion. It should be noted that the values T=15 seconds and T=5 minutes are preferred values for use in the present embodiment and are not to be considered as limiting. Different values may be used if the tracking mechanism is used in a different application.

In the previous explanation it is assumed that the second setting of the line of sight is made instantaneously at the expiration of the time interval T. Since, in practice, the setting cannot be made instantaneously, it is next shown that this does not invalidate the wind correction obtained. It is apparent that after the first setting is made the wind correction obtained depends only on the position of the line of sight at the end of the interval T and is independent of any motions it may have during the interval. As a result, the operator may spend a considerable time in order to make an accurate setting, the interval T being considered terminated when a satisfactory setting is achieved. As an alternative procedure, the operator may choose to manipulate the knobs in such a manner that the line of sight is kept continuously on the reference point during the interval T.

To demonstrate these statements, FIG. 31 shows the memory point mechanism associated with the East components of the vectors involved. Similar statements apply to the North components. The ball carriage of the memory point variable speed drive 706 is indicated as being at a distance t from the center of the disk, t representing the time since the first setting of the line of sight. The air speed component $V_E$ is assumed to be an arbitrary function $V_E(t)$ of the time. Let $Z_E$ represent the position of the setting knob, $W_E$ the position of the wind shaft, and $X_E$ the position of the ground travel shaft. By means of the setting knob, some arbitrary motion $X_E = X_E(t)$ is impressed on the ground travel shaft.

From the figures, $d(X_E - Z_E)/dt = V_E + W_E$, and $dZ_E/dt = t(dW_E/dt)$. Eliminating $dZ_E/dt$ between these equations gives $t(dW_E/dt) + W_E = (dX_E/dt) - V_E$, and the solution of this differential equation is $$W_E = 1/t[X_E - X_{E0} - \int_0^t V_E dt]$$

where $X_{E0} = X_E(O)$ is the value of $X_E$ at $t=0$. At the termination of the tracking interval, $t=T$ and the value of $W_E$ is $W_E(T) = 1/T[X_E(T) - X_{E0} - \int_0^t V_E dt]$. This equation shows that the value $W_E(T)$ depends on the value of $X_E(T)$ but is quite independent of the functional values $X_E(t)$ assumed for $0 < t < T$. This is the mathematical statement of the assertion that the value of $W_E$ obtained at the termination of the tracking interval does not depend on the intermediate position of the line of sight, but only on its position at the end of the tracking interval.

Up to this point it was assumed that settings of the line of sight on a reference point are made by means of the knobs illustrated in FIG. 30. In the actual computer these knobs are replaced with tracking motors controlled by the hand operated tracking control (FIG. 3). This consists of a rod universally pivoted at one end and spring centered to a vertical position. By means of pick-offs contained in the unit, electrical signals are produced which indicate the displacement, backward or forward and right or left, of the hand control from its central position. For use with the P.P.I., the pick-offs indicating forward or backward displacement are connected to a North-South tracking motor 712 (FIG. 61) while the pick-offs indicating right or left displacement are connected to an East-West tracking motor 713. Thus, motion of the stick toward or away from the operator moves the marker intersection on the P.P.I. down or up, and motion of the stick to the left or right moves the intersection to the left or right. The speed of each motor is proportional to the corresponding component of displacement of the hand control. Displacement of the stick in both components simultaneously is possible so that a very natural correlation exists between the displacement of the stick from its central position and the direction and rate of motion of the marker intersection.

The P.P.I. displays a rather large ground area on the face of the cathode ray tube. To provide a larger scale presentation there is provided a bombing indicator 110 (FIG. 1) of the type disclosed in copending application S.N. 30,611, filed in the names of John M. Lester and Richard L. Hinchey on June 2, 1948, now Patent 2,716,234, dated August 23, 1955. Essestially, this is a smaller cathode ray tube, having a B-scan, on which is displayed a magnified image of the area surrounding the marker intersection on the P.P.I. A vertical line on the bombing indicator corresponds to the radial azimuth mark on the P.P.I., and a horizontal line on the bombing indicator corresponds to the part of the range mark in the vicinity of the intersection. Thus, the map displayed on the bombing indicator is turned through an angle $\phi$ relative to the corresponding part of the map on the face of the P.P.I. In order to retain the correspondence between hand control motion and marker motion that was described when the P.P.I. is used, the mode of operation of the hand control is changed when the bombing indicator is in use. With this mode of operation, motion of the stick backward or forward moves the horizontal mark while motion of the stick to the right or left moves the vertical mark (more accurately, the marks remain fixed on the face of the tube and the map moves across them). In order to accomplish this, a $2\phi - 2\phi$ synchro 115 (see FIG. 62), rotated by the computer in the angle $\phi$, is interposed between the tracking control 10 (see FIG. 59) and the two tracking motors 712, 713 (see FIG. 61) in order to combine the components of hand control motion and re-resolve them in directions appropriate to the orientation of the field of view of the bombing indicator.

The same connections of the hand control to the tracking motors are used when the periscope is in use. In the previous description of the optical system, the direction of the line of sight was considered, but no mention was made of the resulting orientation of the field of view. In the periscope, a derotation prism is introduced in such a way that the field of view normally has the same orientation as the presentation on the bombing indicator, and the same connections of the hand control to the tracking motors are used as were described for use with the bombing indicator. The mode of operation of the hand control is selected by sighting control switch 25 of the control box 20 (FIG. 59) at the operator's position.

It should be emphasized that clutches 708, 709 and 710 (FIG. 30) are normally disengaged and are engaged only during the process of wind determination. The tracking motors, however, are always responsive to movements of the hand control, except during the first 15 seconds of a wind determination tracking run. This allows the operator to set the line of sight on any object without disturbing the wind components present in the computer and to decide whether or not a new wind determination is necessary.

SOLUTION OF THE NAVIGATION PROBLEM

It was explained above how it is possible, by means of optics or radar, to determine the coordinates of the aircraft with respect to any ground object and how, if the wind components are correct, these coordinates are automatically kept up to date by the action of the tracking variable speed drives. It would be possible to display the values of $X_E$ and $X_N$ on dials or counters visible to the operator, but there are several objections to presenting this information. In the first place, it might not be possible to identify the reference point under observation. Such an object would nevertheless be acceptable for the purpose of determining wind, but the distances of the aircraft East and North of such a reference point would be valueless in specifying the position of the aircraft in any absolute sense. Even in cases where all points sighted upon during the course of a flight can be identified, a great deal of labor is required to convert coordinate distances measured from these different origins into some more universal coordinate system. Finally, the coordinates $X_E$ and $X_N$ are meaningful when the distance of the aircraft from the reference point is not very great, but they do not specify the position of the aircraft uniquely when the distance of the aircraft from the reference point is so great that the surface of the earth cannot be regarded as a plane.

Figure 32:
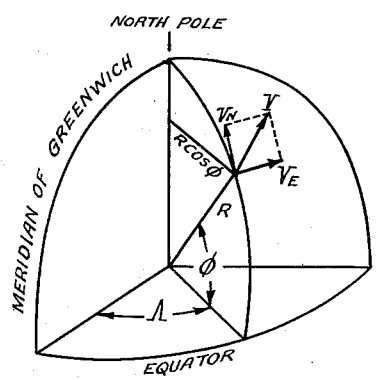
FIG. 32 is a diagram illustrating the aircraft position and velocity components.
Figure 33:
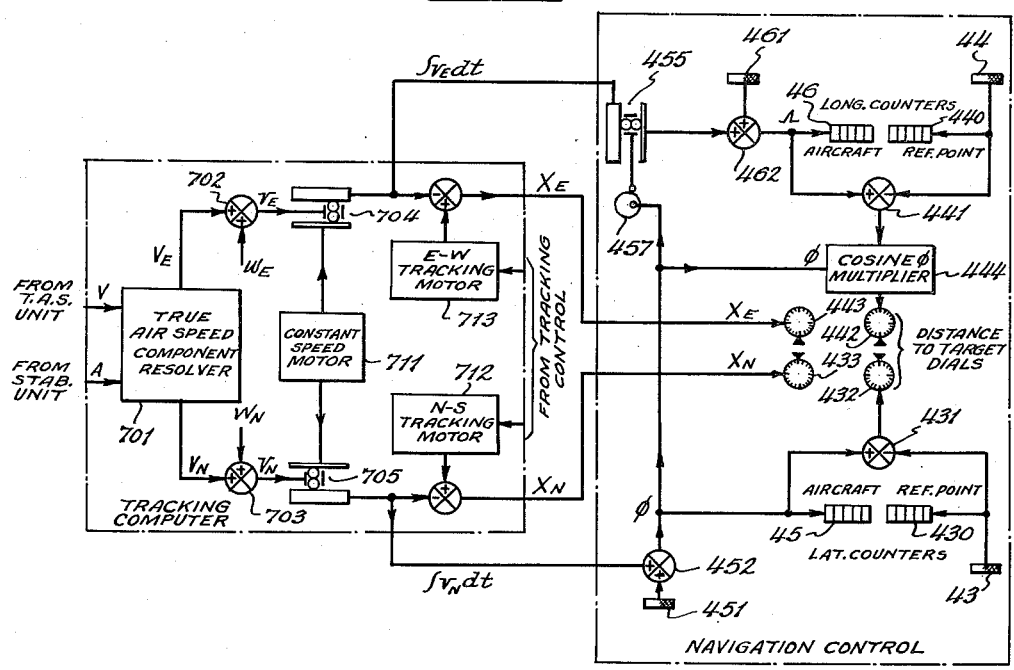
FIG. 33 is a schematic diagram of the navigation unit mechanism.

These difficulties are avoided by introducing such additional equipment as is needed to furnish indications of latitude and longitude. These coordinates are, of course, of universal application and, in computing them, the curvature of the earth is necessairly taken into account. FIG. 32 illustrates the relationship of the East and North components of ground speed to the rates of change of longitude and latitude. The earth is regarded as a sphere of radius R. The longitude of the aircraft is denoted by $\Lambda$, East longitude being taken as positive, and the latitude is denoted by $\Phi$. Using dots above the symbols $\Lambda$ and $\Phi$ to indicate rates of change, the figure gives the relations $v_N = R\dot{\Phi}$ and $v_E = (R \cos \Phi)\dot{\Lambda}$. It was explained that the drum of the variable speed drive 705 (FIG. 61) which integrates the North component of ground speed, rotates at a rate proportional to ground speed so that the total number of revolutions turned through by the drum in any interval of time is proportional to the North component of the ground travel of the aircraft in that interval. As a result of the constant factor of proportionality between $v_N$ and $\dot{\Phi}$, the number of revolutions turned through by the drum in any interval is also proportional to the change in the latitude of the aircraft during that interval. FIG. 33 shows the drum of the tracking variable speed drive 705 connected through differential 452 to the plane's latitude counter 45. A latitude adjustment knob 452 is also connected to this differential and allows the operator to set the counter to any desired initial value, after which setting changes in latitude are furnished to the counter by variable speed drive 705.

The mechanism of the plane's longitude counter 46 is somewhat more complicated as a result of the presence of the variable factor $\cos \Phi$. Since $v_e = (R \cos \Phi)\dot{\lambda}$, the rate of change of the output of variable speed drive 704 for the East component must be $\cos \Phi$ times as great as the rate of change of the longitude counter reading, disregarding the constant factor R. This is accomplished by means of another variable speed drive connected to the output of variable speed drive 704. The ball carriage of this variable speed drive is driven from the latitude shaft in such a way that the distance of the ball carriage from the center of the disk is proportional to $\cos \Phi$. Any suitable device, such as a cosine cam 457 or a Scotch yoke mechanism may be used for deriving the $\cos \Phi$ motion from the $\Phi$ shaft. As in the case of the latitude counter, a differential 462 and adjusting knob 461, allows the longitude counter 46 to be set by the operator to any desired initial value.

If the aircraft is directly above some reference point whose latitude and longitude are known and the operator adjusts counters 45, 46 to these values of latitude and longitude, then the mechanism described automatically keeps the counter indications up to date providing that the wind components entering the computation always have the correct values. It will be noted that the data required for operating the latitude and longitude counters are obtained directly from the drums of the tracking variable speed drives 704, 705 rather than from the $X_E$ and $X_N$ shafts, which enter the polar converter. The purpose of this arrangement is to allow the line of sight to be placed on any object suitable for wind determination without disturbing the indications of the latitude and longitude counters.

The navigational procedure followed on an extended flight is for the operator to set the counters indicating the latitude and longitude of the aircraft at the start of the flight. During the course of the flight, tracking runs for the purpose of wind determination are made by sighting optically, or by means of radar, on any prominent ground objects. Because of errors in wind determination and to small cumulative errors in the mechanism of the computer, the integrated values of latitude and longitude displayed on the counters will eventually be in error. Whenever a fix can be obtained either by direct observation from the aircraft, or by celestial observations, Loran, etc., the operator can reset the latitude and longitude counters to remove the accumulated errors. This is equivalent to the usual procedure in dead reckoning navigation, the dead reckoning position being abandoned whenever a fix becomes available.

According to the above description, it is necessary for the aircraft to be directly above a point having known values of latitude and longitude before those values can be set into the counters which indicate the position of the aircraft. If the ground position of the aircraft were within a few miles of a reference point whose latitude and longitude are known, it would not be difficult to estimate the latitude and longitude of the aircraft itself with sufficient accuracy for most navigational purposes. With the addition of certain other equipment, however, it is possible to obtain accurate values of the latitude and longitude of the aircraft through the use of any reference point within range of the optical or radar systems. For this purpose, another pair of counters 430, 440 is provided into which the latitude and longitude of any identified reference point can be manually set by means of knobs 43, 44. Each of the counters 430, 440 is connected through a differential 431, 441 to the corresponding counter 45, 46 for the position of the aircraft. The outputs of these differentials are the differences in latitude and longitude between the position of the reference point and the integrated position of the aircraft.

Since there is a fixed ratio between latitude difference in angular measure and North-South distance in linear measure, the latitude difference can be interpreted as the distance North of the reference point of the dead reckoning position of the aircraft. By setting the line of sight on the reference point, there is set up in the computer a mechanical representation of distance $X_N$ of the actual position of the aircraft North of the reference point, and these two distances should agree if the dead reckoning position of the aircraft is correct. By means of dials 432, 433 on which these differences are displayed, it is possible for the operator to observe any discrepancy and to remove it by adjusting the counter 45 which indicates the integrated value of the latitude of the aircraft.

In the case of longitude, it is not possible to compare the difference in longitude between dead reckoning and reference point positions directly with the value of $X_E$. In this case the difference in longitude must be multiplied by cos $\Phi$ in a suitable cosine multiplier 444 to convert the angular measure of the difference in longitude to linear units suitable for comparison with $X_E$. This method of conversion is theoretically correct only if the difference in latitude is zero but is always sufficiently accurate for practical purposes. After this multiplication the comparison proceeds by means of dials 442, 443 in the manner described for latitude.

To summarize this method of obtaining a fix: when the operator is able to identify an optical or radar reference point, he sets the latitude and longitude of the reference point into the reference point position counters 430, 440. Then, by means of the hand control 10, the operator sets the line of sight on the reference point. If the dead reckoning position of the aircraft is correct, the difference dials for latitude and longitude will be in agreement. If the difference dials are not in agreement, they can be made to agree by adjusting the counters which indicate the integrated position of the aircraft. When this adjustment is accomplished, the dead reckoning position is thereby replaced with a fix.

It is worth while to mention how a reversal of this procedure can be used to determine the latitude and longitude of an object observed optically or by radar. This situation might arise if poor resolution of the radar equipment makes it impossible to identify an image observed on the P.P.I., or the operator may wish to determine the position of a ship at sea. For this puhpose the dead reckoning position of the aircraft is assumed to be correct. The line of sight is then set on the object in question by means of the hand control, and the reference point counters 43, 44 are adjusted until the difference dials are brought into agreement. When this is accomplished the latitude and longitude displayed on the reference point counters are the latitude and longitude of the object under observation.

Figure 34:
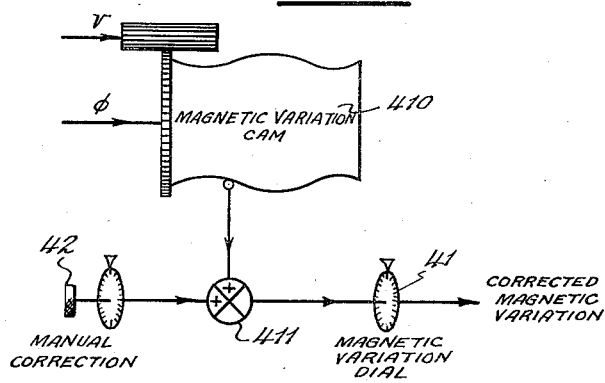
FIG. 34 is a schematic diagram of the magnetic variation mechanism.

Another function closely related to the determination of the latitude and longitude of the aircraft is the automatic provision of magnetic variation. In the earlier explanation of the need for knowledge of the value of aircraft heading in the operation of the computer, it was assumed that the magnetic heading obtained from the compass was corrected for magnetic variation. The magnetic variation depends on the latitude and longitude of the aircraft. At any fixed point on the earth's surface, the magnetic variation changes slowly with time, but can be regarded as constant for a period of a year or more. Values of the magnetic variation for all points on the earth are furnished by the Hydrographic Office in the form of a map of the world bearing curves joining points of equal magnetic variation. These values were used to form a three dimensional cam 410 (FIG. 34) in the navigation control unit 40 (FIG. 6) from which the values of magnetic variation can be obtained mechanically. The cam is translated according to the latitude of the aircraft and rotated according to its longitude, the lift of the cam being the value of magnetic variation. The latitude and longitude drives for the cam are obtained from the same shafts that operate the aircraft position latitude and longitude counters.

It will be necessary from time to time to replace the magnetic variation cam with another cam containing more recent data. Furthermore, since magnetic surveys are constantly being conducted, especially in regions of military activity, it will sometimes happen that the navigator has available magnetic variation data more recent than those used in the manufacture of the cam contained in the computer. To allow the utilization of such information, a knob 42 is provided to allow the value of magnetic variation obtained from the cam to be corrected. The correction is added to the cam output by means of differential 411. The total magnetic variation obtained from the cam and corrected by the knob is displayed on a dial 41. The knob is provided with a zero index and, by inspection, it is possible to tell whether or not a manual correction is included in the value of magnetic variation displayed on the dial. It will be convenient to postpone a description of the method of using this value of the magnetic variation until the stabilization features of the system are described.

THE SOLUTION OF THE BOMBING EQUATION

Previously, the bombing equation (1) $\quad \underline{Y} = (T_I - L/V)\underline{V} + T_I\underline{W}$ was derived, and the impact and synchronous types of solution were outlined. In this section the method of solving the bombing equation is explained.

The principal mode of operation is the synchronous and, in the present embodiment, may be used at altitudes from 4,000 to 50,000 feet. Impact bombing may be used at altitudes from 400 to 5,000 feet. Obviously, these values may be varied as desired by suitable proportioning of the scale factors of the several elements of the system. The desired mode of operation is selected by the operator by means of bombing type switch 36 of ballistics control 30 (FIG. 5).

As stated above, $\underline{Y}$ is a vector from the ground position of the aircraft to the point of impact of the bomb. The vector $\underline{X}$ is used to denote a vector from any reference point on which the line of sight is set to the ground position of the aircraft. If this reference point is the target which it is desired to bomb, then $\underline{Y} = -\underline{X}$ and Equation 1 becomes (2) $\quad -\underline{X} = (T_I - L/V)\underline{V}_0 + T_I\underline{W}$ where $\underline{V}_0$ is used instead of $\underline{V}$ to indicate that the direction of the air speed vector is not arbitrary but is in the direction required for a hit on the target. The direction of $\underline{V}_0$ is specified by the release heading $A_0$. For the synchronous solution, the vector $\underline{X}$ in Equation 2 is determined by setting the line of sight on the target, $\underline{W}$ is determined by making a memory point tracking run on the target or any other reference point, V is supplied by the true air speed meter, and L is given by the bombing tables as a function of V and altitude H. The unknowns in Equation 2 are therefore the time to impact $T_I$ and the direction of the true air speed vector $\underline{V}_0$ required for release. When $T_I$ is found, the time-to-go before release $T_G = T_I - T_F$ where time of fall $T_F$ is obtained from the bombing tables. The solution of Equation 2 therefore leads to the required quantities $T_G$ and $A_0$.

For the convenience of the pilot, the difference $\Delta = A_0 - A$ between the computed release heading and the actual heading of the aircraft is computed and the value of $\Delta$ displayed to the pilot on dials, as previously described. The value of $T_G$ is similarly presented to the pilot. To obtain a hit on the target, $\Delta$ must be equal zero when $T_G = 0$. The pilot flies the aircraft on an arbitrary course, using evasive maneuvers if desired, and observes the data indicator (FIG. 11). As $T_G$ approaches zero, the pilot must turn the aircraft to make $\Delta = 0$ when $T_G$ reaches zero, but the flight of the aircraft, is otherwise unrestricted.

To solve Equation 2 it may be written in the form $$(3) \quad (T_I - L/V)\underline{V}_0 = -\underline{X} - T_I\underline{W}$$

From FIG. 27, $V_{0E} = V \sin A_0$ and $V_{0N} = V \cos A_0$, so that Equation 3 can be written in the form of two scalar equations, $$\begin{bmatrix} (T_I - L/V)V \sin A_0 = -X_E - T_I W_E \\ (T_I - L/V)V \cos A_0 = -X_N - T_I W_N \end{bmatrix}$$

or $$(4) \quad \begin{bmatrix} (T_I V - L) \sin A_0 = -X_E - T_I W_E \\ (T_I V - L) \cos A_0 = -X_N - T_I W_N \end{bmatrix}$$

The left members of Equations 4 are the components of a vector of magnitude $\rho = T_I V - L$ in the direction of the release heading $A_0$, and the equations may be written $$(5) \quad \begin{bmatrix} \rho \sin A_0 = -X_E - T_I W_E \\ \rho \cos A_0 = -X_N - T_I W_N \end{bmatrix}$$

These equations may be solved by an iteration process. In the right members, the values of $X_E$, $X_N$, $W_E$, $W_N$ are known, so that if a tentative value of $T_I$ is selected the right members are completely known. The equations can then be solved for $\rho$ and $A_0$. The value of $\rho$ gives a new value of $T_I$ through the relation $T_I = (\rho + L)/V$, and this new value is substituted in the right members of (5). The process is continued until two successive values of $T_I$ are the same and this value of $T_I$, together with the value of $A_0$ obtained from the last step, constitutes the solution of the equations for $T_I$ and $A_0$. It may be noted that the same equations can be derived from the geometrical relationship of the several elements of the bombing problem disclosed in FIG. 110.

Figure 35:
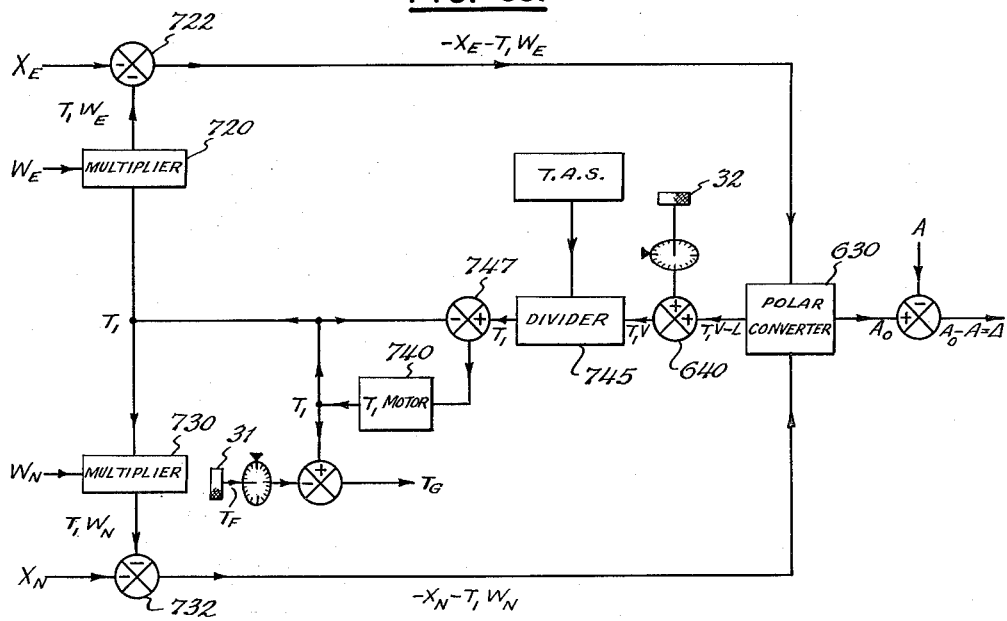
FIG. 35 is a schematic diagram of an alternate form of synchronous bombing mechanism.

A mechanism for carrying out the solution of Equations 4 can be based on the numerical process just described. FIG. 35 shows how the values of $W_E$, $W_N$ obtained from the tracking mechanism are combined with a tentative value of $T_I$ in multipliers 720, 730 and the products thereof are added to the values $X_E$, $X_N$ in differentials 722, 732 to produce $-X_E - T_I W_E$ and $-X_N - T_I W_N$. These quantities are the components of a vector of magnitude $\rho$ forming an angle $A_0$ with the North direction, and are used as inputs to a polar converter 630 to produce the magnitude and direction of the vector. By means of a differential 640 and a divider 745, the value of $T_I$ can be computed from $\rho$ according to the relation $$T_I = (\rho + L)/V$$

A knob 32 can be used to set the value of L obtained from the bombing tables, and V is supplied by the true air speed meter. The computed value of $T_I$ is compared with the tentative value by means of a second differential 747 and the difference between the two values energizes a motor 740 which causes the tentative value of $T_I$ to approach the value computed from $\rho$.

With fixed input values $X_E$, $X_N$, $W_E$, $W_N$, L and V, the mechanism remains in operation until the two values of $T_I$ become equal and the follow-up system ceases to operate. This process takes place with extreme rapidity so that in the actual operation of the system, even when the inputs are changing, the value of $T_I$ produced by the mechanism at any instant is essentially the solution of Equations 4 for the instantaneous values of the various inputs.

FIG. 35 also indicates how the value of $T_G$ is derived when $T_F$, obtained from the bombing tables, is set in on dial 31, and how the value of $A_0$ is combined with the actual heading A obtained from the compass to produce the turn indication $\Delta = A_0 - A$. The values of $T_G$ and $\Delta$ are transmitted to the pilot's position where they are displayed on the pilot's data indicator. The value of $T_G$ alone is displayed on the time-to-go indicator which is visible to the operator of the equipment.

Visual indications of the time-to-go and the turn indication are provided primarily for the purpose of informing the operator and pilot on the progress of solution of the bombing problem. The bomb release taking place automatically when $T_G = 0$, and the aircraft heading being controlled automatically through the automatic pilot just before bomb release. The automatic bomb release is accomplished through a contact 780 (see FIG. 61) in the computer which closes when $T_G = 0$ and functions in the same manner as a manual bomb release, i.e., to energize appropriate circuits in the aircraft bomb releasing devices which are preset to effect the type of bombing desired when energized.

The details of the automatic control of aircraft heading depend on the particular automatic pilot used in the aircraft and do not form part of this invention. With the Sperry E-4 Automatic Pilot the turn indication acts in such a way as to bank the aircraft at an angle equal to three times the indicated turn angle. The usual functioning of the automatic pilot then produces a rate of turn of the aircraft coordinated with this bank angle in such a way that the aircraft does not side slip. The result of this sequence of operations is that the aircraft approaches the computed release heading exponentially. The pilot retains manual control of the aircraft until a short time before bomb release and then throws a switch which places the aircraft under the control of the computer acting through the automatic pilot. The values of time-to-go and turn indication presented to the pilot are then chiefly of value in indicating when the aircraft should be put under automatic control.

Figure 36:
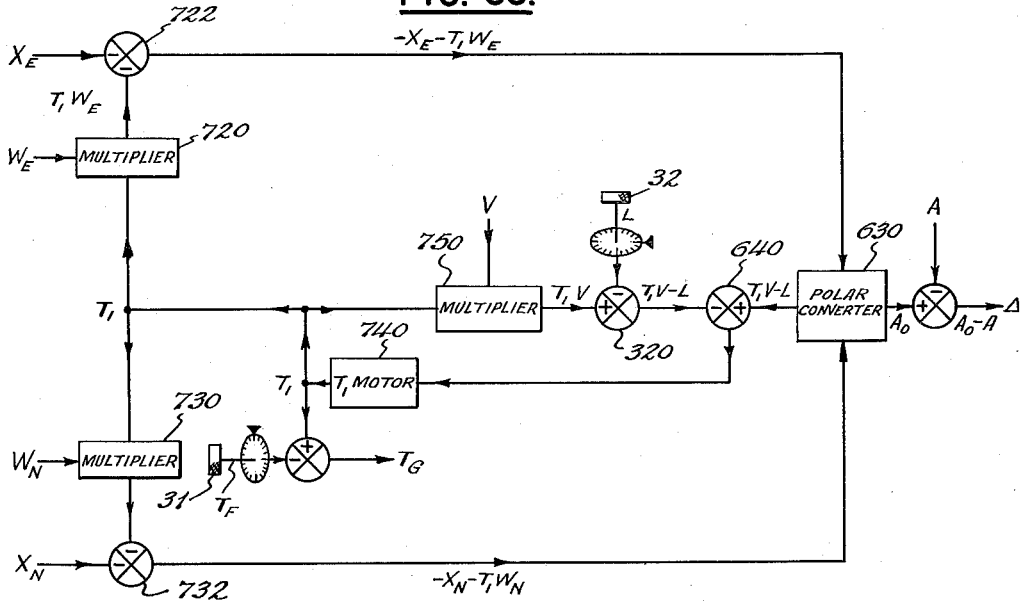
FIG. 36 is a schematic diagram of the preferred form of synchronous bombing mechanism.

Inasmuch as the division by V in the arrangement just described cannot conveniently be carried out with the accuracy required, the mechanism actually employed in the computer for the solution of the bombing problem is slightly different from that shown in FIG. 35. FIG. 36 shows schematically how the follow-up system is rearranged to allow the division by V to be replaced by a multiplication. Here, the value of $T_I V - L$ obtained from polar converter 630 is compared with the value of $T_I V - L$ computed, in multiplier 750 and differential 320, from the tentative value of $T_I$. The difference between the two values controls $T_I$ motor 740 to bring the two values into agreement. The circuits required to effect this computation in the actual system are shown in more detail in FIGS. 59, 60 and 61.

The impact solution of the bombing equation is carried out by the same computer elements that are used in the synchronous solution, but their interconnections are changed, by suitable switching devices, to obtain the arrangement indicated in FIG. 109 to permit the impact mode of operation. At the same time, since impact bombing is to be used only at low altitudes, the scale factors of the mechanical elements representing time and distance are multiplied by ten in order to obtain the benefit of the increased accuracy that is possible when the maximum altitude is limited.

As stated above, in the impact solution of the bombing equation a release heading is not computed, but instead the point of impact is computed for a bomb released with the actual heading of the aircraft. For the impact solution the equations corresponding to (4) are $$(6) \quad \begin{bmatrix} (T_I V - L) \sin A = -X_E - T_I W_E \\ (T_I V - L) \cos A = -X_N - T_I W_N \end{bmatrix}$$

where A is the actual heading of the aircraft. Also, for the impact solution, $T_I = T_F$, but $T_I$ is retained in Equations 6 with the understanding that $T_G = 0$. In Equations 6, $W_E$, $W_N$, V, and L are regarded as known, $T_G = 0$, and $X_E$ and $X_N$ are to be determined so that the equations are satisfied. The line of sight is to be positioned in accordance with these values.

Figure 37:
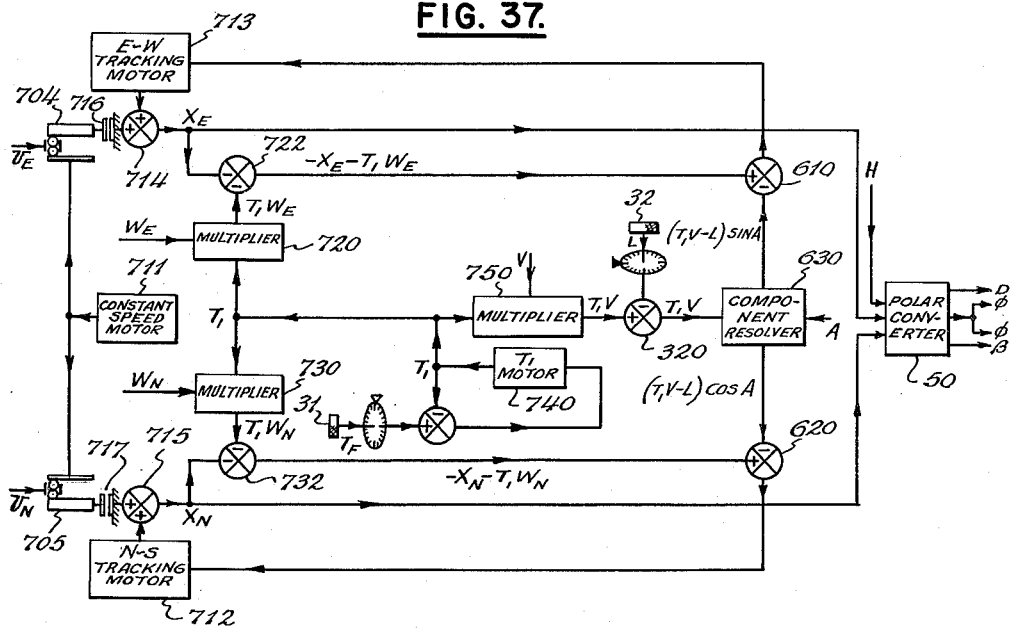
FIG. 37 is a schematic diagram of the impact bombing mechanism.

The mechanism for carrying out the impact solution is illustrated in FIG. 37. As in the synchronous solution, $T_G$, is obtained by forming the difference $T_G=T_I-T_F$, where $T_F$ is obtained from the bombing tables and is set manually. In the impact solution, however, the value of $T_G$ is used as a signal to $T_I$ motor 749. The motor therefore continues to run until $T_G=0$, and then $T_I=T_F$. The wind components from the tracking mechanism are multiplied by this value of $T_I$ in multipliers 720 and 730, and the quantities $-X_E-T_I W_E$ and $-X_N-T_I W_N$ are formed, as before, in differentials 722, 732. These two quantities are the right members of Equations 6. At the same time, the value of $T_I$ is multiplied by V in multiplier 750, and L is subtracted from the product in differential 320 to produce $T_I V-L$. This is resolved in the East and North directions by the same basic mechanism 630 that is used in the synchronous solution but now functions as a component resolver, and the components are $(T_I V-L)$ sin A and $(T_I V-L)$ cos A. The value of A required to perform this resolution is obtained from the compass. The components $(T_I V-L)$ sin A and $(T_I V-L)$ cos A are the left members of Equations 6. To produce the equality required by the equations, the left members are subtracted from the corresponding right members, in differentials 610, 620, and the differences are used as signals to operate the two tracking motors 712, 713. The tracking motors continue to run until the differences between the right and left members are equal to zero, and the resulting values of $X_E$ and $X_N$ satisfy Equations 6. These values position the line of sight on the computed point of impact through the mechanism previously described. It should be noted that in this mode of operation, clutches 716, 717, which during synchronous bombing transmit the outputs of tracking variable speed drives 704, 705 to differentials 714, 715, are disengaged and the right hand member of each clutch is locked to the frame. By this arrangement the outputs of tracking motors 712, 713 represent the components of the ground range to the target and are transmitted to polar converter 50 where they are converted to the corresponding polar coordinates and are then used to position the sight line on the target.

During impact operation the flight of the aircraft is controlled to cause the line of sight to pass over the target. The bomb is released by the manual bomb release at the instant that the line of sight passes through the target. This operation could not be accomplished effectively if it were necessary for the operator to transmit instructions to the pilot for controlling the aircraft. In order to avoid this requirement, the operator himself controls the aircraft through the automatic pilot during impact bombing. This is accomplished through the use of a manual turn control at the operator's position, and the operator is provided with a switch with which he can select whether turns of the aircraft are to be determined by means of the manual turn control for impact bombing or by means of the computer operated turn control for synchronous operation. The pilot's switch, described above, allows the pilot to relinquish control of the aircraft for the bombing run while the operator's switch selects the turn control appropriate to the synchronous or impact mode of operation.

Figure 39:
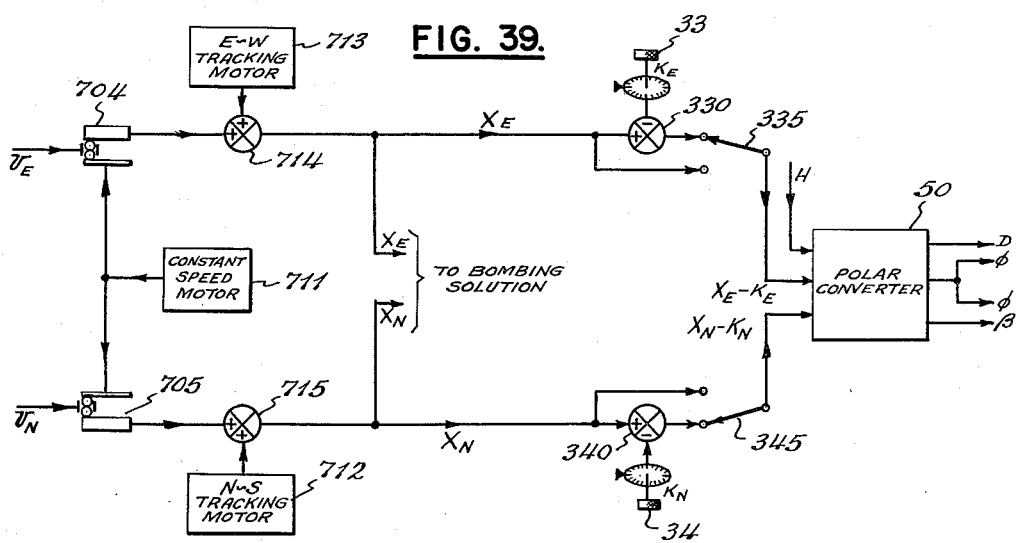
FIG. 39 is a schematic diagram of the offset bombing mechanism.
Figure 38:
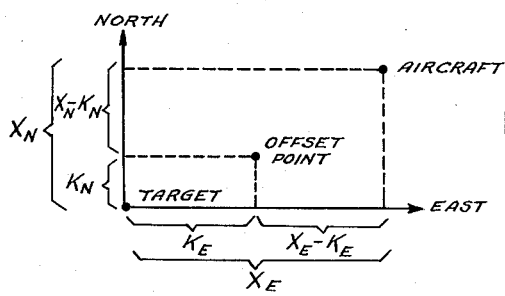
FIG. 38 is a diagram illustrating the geometry of offset bombing.

Up to this point no mention was made of offset bombing. The primary purpose of this type of bombing is to allow radar bombing of a target which is a poor radar reflector. This can be accomplished by performing the sighting operations on an offset aiming point which has a known geographical position relative to the target and which is a good radar reflector. Referring to FIG. 38, let $K_E$ and $K_N$ be the distances of the aiming point East and North of the target. If $X_E$ and $X_N$ are the distances of the aircraft East and North of the target, then its distances East and North of the aiming point are $X_E-K_E$ and $X_N-K_N$. In order to bomb the target, the coordinate distances on which the bombing solution is based must be $X_E$ and $X_N$, while in order to have the intersection of the radar marks fall on the image of the offset point, the coordinate distances entering polar converter 50 must be $X_E-K_E$ and $X_N-K_N$. These requirements can be satisfied by introducing $K_E$ and $K_N$ through differentials 330, 340, as illustrated in FIG. 39. In the computer (see FIG. 59), the offset distances are introduced electrically through the use of differential synchros. This makes it possible to switch the offset distances in or out without resetting the offset dials, as indicated schematically in FIG. 39.

Although offset bombing is particularly necessary during some radar bombing missions, it is also useful in optical bombing if the target area is obscured by smoke or clouds. Since the position of the optical line of sight, as well as the position of the radar marks, is determined by the values of the quantities entering polar converter 50, the operation during optical offset bombing is the same as that during radar offset bombing. Offset bombing with either radar or optics is expected to be useful only during synchronous operation, but it is evident from the manner in which the offset distances are introduced that it could, in principle, be used during impact operation. It will be recalled that the scale factors of the computing components are multiplied by a factor of ten in changing from the synchronous to the impact mode of operation. No provision is made for changing the scale factor of the offset dials, however, so that it would be necessary to take account of the change of scale factor in setting the offset distances if offset impact bombing were attempted.

On a synchronous bombing run using an offset optical aiming point, it may happen that the target becomes visible. It is then desirable to transfer the line of sight from the offset point to the target. This is the purpose of the offset insertion switches 335, 345 indicated in FIG. 39 which are actuated by switch 22 of control box 20. These switches make it possible to alternate the line of sight rapidly between the target and the offset point without resetting the offset dials. Whether or not the offset distances are in use is indicated by a signal light visible to the operator.

THE GEOMETRY OF THE STABILIZED OPTICAL SYSTEM

The quantities to be supplied to the optical system are the sighting angle and the bearing of the line of sight. The sighting angle $\beta$ is defined above as the angle between the line of sight and a vertical line directed downward from the aircraft, while the bearing $\phi$ of the line of sight is the angle between the meridian and the vertical plane containing the line of sight. The stabilized optical system is required to stabilize these quantities in the sense that the sighting angle and bearing of the line of sight actually produced by the optical system are to depend only on the values of $\beta$ and $\phi$ supplied by the computer and are to be independent of the attitude of the aircraft. Since the bearing of the line of sight is defined with reference to the North direction, it is necessary to consider the fundamental directional reference of the equipment and how the value of aircraft heading is obtained.

Figure 40:
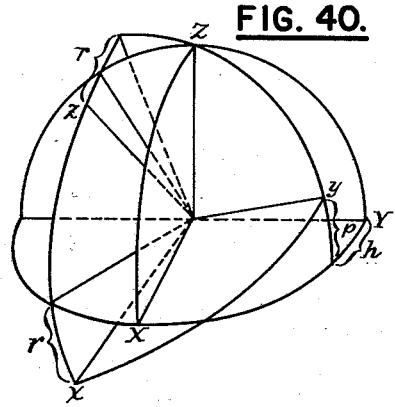
FIG. 40 is a diagram illustrating roll, pitch and heading angles.

It will be convenient at the outset to give precise definitions of roll, pitch, and heading angles, since these quantities are used frequently in the following discussion. In FIG. 40, let XYZ be a system of reference axes having a fixed orientation with respect to the earth. The Z-axis is vertical, the X-axis is directed toward the East, and the Y-axis is directed toward the North. Let xyz be a second system of axes having the same origin as the first but a different orientation, this orientation being completely specified by the roll, pitch, and heading angles to be described. The heading h is defined as the angle between the meridian or the YZ-plane, and the vertical plane yZ containing the y-axis. The heading h is measured from the North toward the East, usually through 360°. The pitch p is the angle between the y-axis and the horizontal XY-plane, counted as positive when the y-axis is above the horizontal plane. The roll r is the angle between the intersection of the XY- and zx-planes and the x-axis. Of the two half lines of intersection, the definition of r involves that one at which a positive rotation in the zx-plane (a rotation from the z-axis toward the x-axis) passes from the upper to the lower side of the horizontal plane, and r is the directed rotation in the zx-plane required to pass from this half line to the x-axis. Throughout the specification, a positive rotation about a directed line is a rotation in the sense which would advance a right hand screw along the line, and a positive rotation in one of the coordinate planes is a positive rotation about the coordinate axis perpendicular to that plane.

Another way of defining h, p, and r is in terms of the successive rotations required to carry a set of axes from the XYZ position to the xyz position. For this purpose, let the xyz-axes coincide initially with the XYZ-axes. First, the xyz-axes are turned through an angle h about the common Z- and z-axes. Next, these axes are turned through an angle p about the new position of the x-axis, and finally they are turned through an angle r about the pitched position of the y-axis. The p and r rotations are to be in the senses corresponding to the signs of p and r respectively, while the h rotation is to be in the sense opposite to the sign of h. FIG. 40 shows that the two definitions of h, p, and r are equivalent.

Figure 41:
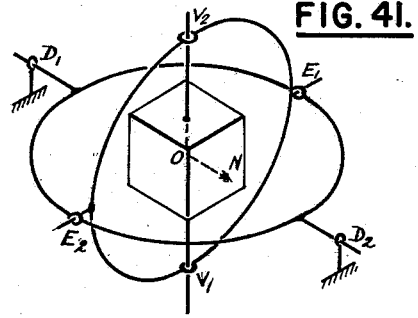
FIG. 41 is a schematic diagram illustrating the measurement of roll, pitch and heading angles.

Roll, pitch, and heading of a system of axes are measured practically by some such mechanism as that shown in FIG. 41. A gimbal ring is supported by bearings $D_1$ and $D_2$ whose line of centers is parallel to the y-axis of the system of axes whose attitude is to be determined. Perpendicular to $D_1D_2$ the ring has bearings $E_1$ and $E_2$ in which an inner gimbal ring is pivoted, and perpendicular to $E_1E_2$ on the inner ring are bearings $V_1$ and $V_2$ which support a box centered at O. This box contains gyros in one of several possible arrangements which function, as described below, to maintain the axis $V_1V_2$ vertical and to maintain the line On, which is fixed in the box normal to one of the faces, in the meridian.

With this mechanism the roll, pitch, and heading of the xyz-axes may be measured as shaft rotations at bearings $D_2$, $E_2$, and $V_2$ respectively. To demonstrate this, let the xyz-axes coincide initially with the XYZ-axes. The roll, pitch, and heading angles are zero, and the shaft rotations are to be counted as zero. Now, recalling the three successive rotations used in the second definition of the angles, it is evident that in the first rotation, through the heading angle h about the z-axis, a rotation through angle h takes place at bearing $V_2$ while at bearings $D_2$ and $E_2$ no rotations occur. Similarly, during the pitch motion through angle p about the x-axis, a rotation through angle p takes place at $E_2$ while no rotations occur at $D_2$ and $V_2$. In the last rotation about the y-axis through angle r, a rotation through angle r takes place at $D_2$ while no rotations occur at $E_2$ and $V_2$. The total rotations at the three bearings $V_2$, $E_2$, and $D_2$ are therefore h, p, and r, as asserted.

Figure 42:
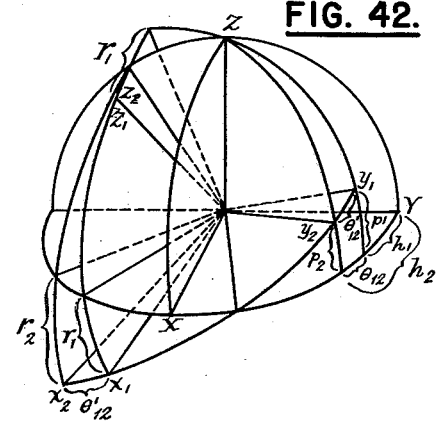
FIG. 42 is a diagram illustrating the relationship of the aircraft, periscope and antenna axes.

In addition to the fixed XYZ-axes, it will frequently be necessary to consider three other sets of axes. These will be called aircraft axes $x_1y_1z_1$, periscope axes $x_2y_2z_2$, and radar antenna axes $x_3y_3z_3$. The roll, pitch, and heading of the three sets of axes will be indicated by attaching the corresponding subscript to the symbols r, p, and h. The aircraft axes are fixed in the aircraft with the $z_1$-axis perpendicular to the floor plane, the $y_1$-axis directed toward the nose along the longitudinal axis, and $x_1$-axis directed along the right wing. The periscope axes $x_2y_2z_2$ are related to the optical parts in a manner to be described presently and are derived from the aircraft axes by a rotation through a variable angle $\theta'_{12}$ (these subscripts which should be read "one, two," refer to the two sets of axes, whose relative orientation is specified by the angle) about the $z_1$-axis. The $z_1$- and $z_2$-axes therefore coincide so that the $x_1y_1$- and $x_2y_2$-planes also coincide, but the $x_2y_2$-axes are rotated through an angle $\theta'_{12}$ from the $x_1y_1$-axes. $\theta'_{12}$ is counted as positive when the rotation from the $y_1$-axis to the $y_2$-axis is negative. An angle such as $\theta'_{12}$ which is measured in the floor plane of the aircraft is referred to as an azimuth angle, to distinguish it from a heading or bearing angle which is measured in a horizontal plane. FIG. 42 is similar to FIG. 40 but shows both the aircraft and periscope axes. The angle between the vertical plane containing the $y_1$-axis and the vertical plane containing $y_2$-axis is denoted by $\theta_{12}$.

Figure 43:
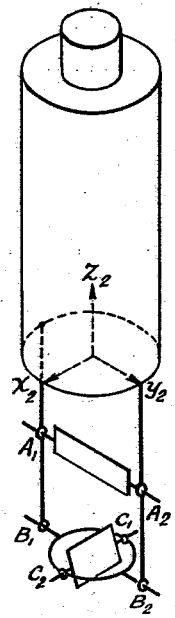
FIG. 43 is a schematic diagram of a form of periscope used with the invention.

FIG. 43 is a schematic representation of the periscope used with the invention. The upper part consists of a telescope mounted in the aircraft with its optical axis perpendicular to the floor plane. Extending downward from the telescope are two members which support the deflecting prisms and allow them to rotate in the manner indicated. To simplify this portion of the description, however, the prisms are regarded as mirrors, as above.

The upper mirror is movable about an axis $A_1A_2$ perpendicular to the optical axis of the telescope, while the lower mirror is movable about the axis $C_1C_2$ of a gimbal ring which is itself pivoted with respect to the telescope about an axis $D_1D_2$, parallel to $A_1A_2$ and perpendicular to the axis $C_1C_2$ of rotation of the lower mirror. Also shown are the periscope axes $x_2y_2z_2$ for use in defining the roll, pitch, and heading of the periscope in accordance with the conventions previously adopted. The $z_2$-axis coincides with the optical axis of the telescope, and the $y_2$-axis is in the same plane as and parallel to the axes $A_1A_2$ and $B_1B_2$. The whole periscope consisting of the telescope and mirror assembly is mounted in the aircraft in such a way that it can be rotated about the $z_2$-axis in order to change the bearing of the line of sight. The angle of rotation measured from the $y_1$-axis fixed in the aircraft to the $y_2$-axis fixed in the periscope is the angle $\theta'_{12}$ previously mentioned.

In order to explain the stabilizing motions of the two mirrors, it will be supposed first that the optical axis of the telescope is truly vertical and that the axis $C_1C_2$ of the lower mirror is horizontal. Continuing the convention used above, in which the line of sight is regarded as the path of the ray which issues from the center of the reticle pattern in the direction of the optical axis, it is clear that if it is desired to place the line of sight on a point directly beneath the aircraft the two mirrors must be brought to the positions where the axial ray just grazes them and continues undeflected along the extension of the optical axis of the telescope. These positions of the two mirrors will be called the undeflected positions. With the telescope remaining vertical, suppose now that it is desired to place the line of sight on a reference point having sighting angle $\beta$. This can be accomplished by rotating the lower mirror through an angle $\beta/2$ in the positive sense about the axis $C_1C_2$, since the line of sight will then turn from the vertical position through the required sighting angle $\beta$. Next suppose that the periscope assembly as a whole is tilted through an angle $p_2$ about the horizontal line $C_1C_2$. The line $C_1C_2$ is parallel to the $x_2$-axis so that this angle is actually the pitch of the periscope axes, as implied by the designation $p_2$. Since the telescope and mirrors are tilted through the angle $p_2$ as a rigid assembly, the line of sight is also moved through this angle and forms an angle $\beta+p_2$. To bring the line of sight back to its previous position while leaving the telescope in its pitched position it is necessary to turn the lower mirror about $C_1C_2$ through an angle $p_2/2$ in the negative direction. This rotation of the mirror through an angle $p_2/2$ rotates the line of sight through an angle $p_2$ so that the sighting angle again equals $\beta$. The total rotation of the mirror from its undeflected position, with respect to the gimbal ring, is then $(\beta-p_2)/2$.

Now suppose that the gimbal ring and lower mirror are held fixed, with $C_1C_2$ horizontal and $B_1B_2$ making an angle $p_2$ with the horizontal, and that the telescope and upper mirror are rotated as a whole through an angle $r_2$ about the pitched position of $B_1B_2$. Since the $y_2$-axis is parallel to $B_1B_2$, this angle $r_2$ is the roll angle of the periscope axes. The axial ray which grazes the upper mirror in its still undeflected position does not lie in the vertical plane containing $B_1B_2$. However, if the upper mirror alone is turned through an angle $r_2/2$ about $A_1A_2$ in the negative direction, the ray between the upper and lower mirrors resumes the direction it had before the rolling motion took place. The line of sight is therefore reflected from the lower mirror in the same direction that it had before the rolling motion took place.

To summarize these statements: If the desired sighting angle is $\beta$, if the pitch of the periscope axes is $p_2$, and if the roll of the periscope axes is $r_2$; then the sighting angle produced by the periscope will have the proper value $\beta$ if the lower mirror is turned through an angle $(\beta-p_2)/2$ with respect to the gimbal ring, if the gimbal ring is turned through an angle $-r_2$ with respect to its supports, and if the upper mirror is turned through an angle $-r_2/2$ with respect to its supports, these angles being measured from the undeflected positions.

It should be noted that pitching and rolling motions alone do not cause the axis $B_1B_2$ to depart from a vertical plane and with the proper stabilizing motions, the line of sight will lie in this (or a parallel) vertical plane. The $y_2$-axis being parallel to $B_1B_2$, the heading of the periscope axes is the same as the bearing of the line of sight defined under the heading "Determination of the Ground Position of the Aircraft." It is convenient, however, to make a distinction between $\phi$ and $h_2$ by defining $\phi$ as the bearing of the line of sight called for by the computer and continuing to use $h_2$ as the bearing of the line of sight actually produced by the periscope. By turning the whole periscope assembly about the optical axis of the telescope, i.e., by changing $\theta'_{12}$, the bearing of the line of sight may be changed. However, if the optical axis is not vertical, a given change in $\theta'_{12}$ does not produce an equal change in $h_2$, as is evident from FIG. 42. For convenience in representing the vertical periscope in the drawings, it is shown as a box with inputs $p_2-\beta$, $r_2$ and $\theta'_{12}$, the output of which is the line of sight.

It is necessary next to consider how the pitch and roll angles required for positioning the stabilizing mirrors are obtained and how the periscope is rotated to produce the required bearing of the line of sight. The vertical and directional reference for the system are obtained from a stabilization unit containing a three-gyro stable element. Since this portion of the description is concerned only with the geometrical aspects of the stabilization problem, it is convenient here to regard the stable element simply as a box which retains the proper orientation with respect to the earth while the aircraft undergoes random changes in attitude. The gyroscopic action by which this behavior is achieved is explained later.

Figure 44:
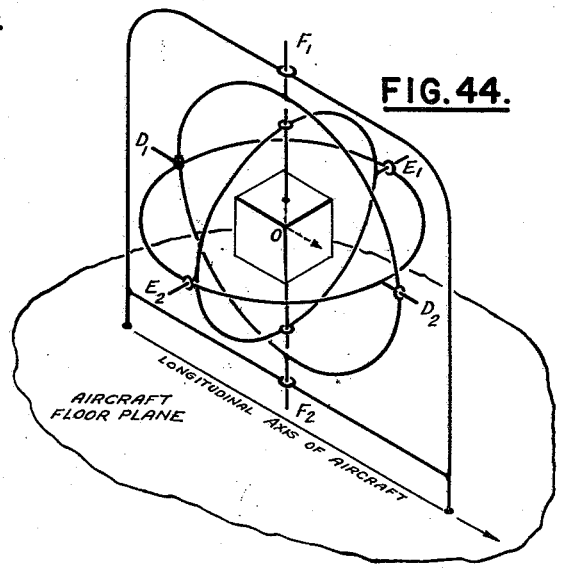
FIG. 44 is a schematic diagram of a stable element gimbal system.

Previously it was explained how such a stable element can be gimbaled with respect to a set of axes in order to furnish shaft rotations equal to the roll, pitch, and heading of the axes. Since the roll and pitch of the periscope axes are required for controlling the stabilizing mirrors, it is natural to consider the possibility of mounting the stable element gimbals on the periscope axes in order to obtain the required angles directly. Because of the size and complexity of the stable element, it is not possible to accomplish this object directly. Instead, the stabilization unit contains axes which, by means of servos, are maintained parallel to the periscope axes (see FIG. 44). The line of centers of bearings $F_1$ and $F_2$ is perpendicular to the floor plane of the aircraft and is therefore parallel to the $z_2$-axis. Supported in these bearings is a gimbal ring which is provided with another pair of bearings lying on an axis perpendicular to $F_1F_2$. This pair of bearings supports the axis $D_1D_2$ of FIG. 41. The remainder of the gimbal system of FIG. 44 is identical with that of FIG. 41.

Figure 45:
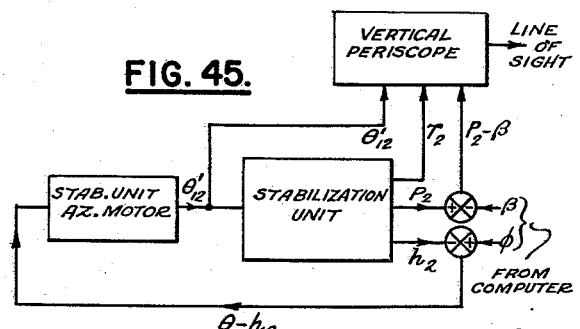
FIG. 45 is a schematic diagram of the relationship of the stabilization unit and periscope.

The stabilization unit axes are maintained parallel to the periscope axes by introducing a rotation $\theta'_{12}$ at the bearing $F_1$, and this angle is to be regarded as an input to the stabilization unit. From the discussion of FIG. 41, the angles measured at bearings $E_2$, $D_2$, and $V_2$ of FIG. 44 are $p_2$, $r_2$, and $h_2$, respectively. The stabilization unit can therefore be represented by a block diagram, as indicated in FIG. 45. In addition to the input $\theta'_{12}$ which is indicated in the figure, the attitude of the aircraft influences the values of the output angles $p_2$, $r_2$, and $h_2$, and might be regarded as an input to the stabilization unit. However, this input is not indicated in the block diagram because it is not introduced by electrical or mechanical data transmission but is "felt out" by the stable element of the unit.

It should be noticed in this discussion that only the angular relationships between the axes $x_2y_2z_2$ and the fixed $XYZ$ axes are considered. These relationships are the same for all sets of axes parallel to the $x_2y_2z_2$ axes illustrated in FIG. 42 as having a common origin with the $XYZ$ axes. It is unnecessary, therefore, to distinguish between the stabilization unit axes and the periscope axes, and both sets are indicated by $x_2y_2z_2$.

If the stabilization unit axes are maintained parallel to the periscope axes by introducing the same rotation $\phi'_{12}$ to both, then the value of $h_2$ obtained from the stabilization unit is to have a value equal to the value of $\phi$ produced by the computer. This is accomplished by forming the difference $\phi-h_2$ and using this as an error signal to energize a motor which drives $\theta'_{12}$, the motor running until $h_2=\phi$ and then stopping, as indicated in FIG. 45. The value of $r_2$ produced by the stabilization unit is transmitted electrically to the periscope and there is reproduced mechanically by means of a servo motor which positions the gimbal ring and upper mirror of FIG. 43 in the manner already described. The value of $p_2$ obtained from the stabilization unit is combined electrically with the value of $\beta$ produced by the computer. The difference $p_2-\beta$ is transmitted to the periscope where it produces a corresponding motion of the lower mirror. Thus, the periscope is controlled to produce a stabilized line of sight having sighting angle $\beta$ and bearing $\phi$, regardless of the attitude of the aircraft.

The method of obtaining aircraft heading from the stabilization unit is next considered. In the sections dealing with the bombing and navigation problems, aircraft heading was denoted by the symbol A. To obtain a consistent notation when various sets of axes are being considered, it is convenient to designate aircraft heading by the symbol $h_1$ in the present discussion. Referring to FIG. 42, the aircraft heading is $h_1=h_2-\theta_{12}$, but it is not possible to use this expression to compute the value of $h_1$ because a mechanical representation of the angle $\theta_{12}$ appears nowhere in the mechanism just described. While it would be possible to construct a mechanism which would produce the value of $h_1$ with theoretical accuracy, it is apparent from FIG. 42 that the value of $\theta_{12}$ will not differ greatly from the value of $\theta'_{12}$ provided the aircraft does not pitch or roll through large angles. In obtaining aircraft heading for the computer, the discrepancy between $\theta_{12}$ and $\theta'_{12}$ is neglected, and an approximate value $h'_1$ of aircraft heading is computed from the expression $h'_1=h_2-\theta'_{12}$. The error $$\epsilon=h_1-h'_1=\theta'_{12}-\theta_{12}$$

in the value of aircraft heading computed in this way is referred to as the "gimbal error" from its similarity to an error encountered in a conventional directional gyro. The value of the gimbal error depends on the pitch and roll of the aircraft and on the angle $\theta'_{12}$ through which the periscope axes are displaced from the aircraft axes. To give an indication of the maximum value of the gimbal error, let $q$ be the angle between the $z_1$- and $Z$-axes. The angle $q$ is then a sort of resultant of pitch and roll and might appropriately be called the "tilt" of the aircraft. For a given tilt q, in degrees, the maximum value of the gimbal error is approximately $\epsilon_{max}=0.00873q^2$ degrees. It should be pointed out that under the assumption that the stable element retains its proper orientation, the gimbal error has no direct effect on the bearing of the line of sight but affects only the value of aircraft heading transmitted to the computer.

THE GEOMETRY OF RADAR DATA STABILIZATION

Previously the radar determination of the slant range and bearing of a reference point on the ground was explained under the simplifying assumption that the aircraft maintained a level attitude. In this section it is necessary to explain how errors in slant range and bearing are avoided when the aircraft departs from a level attitude. It would be possible to do this by stabilizing the radar antenna in a manner similar to that by which the optical system is stabilized. Referring to FIG. 17, such stabilization could be accomplished by mounting bearings $A_1$ and $A_2$ in a gimbal ring analogous to the innermost gimbal ring of FIG. 44. By supplying this antenna gimbal system with the roll and pitch signals generated by the stabilization unit, it would be possible to maintain axis $A_1A_2$ in the direction of the vertical regardless of the changing attitude of the aircraft. If this were effected, it would not be difficult to arrange matters so that the map traced out on the P.P.I. would be entirely independent of the attitude of the aircraft.

The difficulty in carrying out this method of stabilization lies in the width, about 60 inches, of the radar antenna used with this system. The antenna is enclosed in a radome attached to the skin of the aircraft. With the axis $A_1A_2$ maintaining a fixed direction with respect to the aircraft, this radome must have a diameter slightly greater than 60 inches but can be rather flat in a direction parallel to $A_1A_2$. If the axis $A_1A_2$ were movable with respect to the aircraft, it would be necessary to use a much larger radome to allow the antenna to assume all possible positions within it, and the aerodynamic objections to such a large radome make it necessary to find some solution to the stabilization problem other than that of stabilizing the antenna. Such an alternative form of stabilization is referred to as radar data stabilization to suggest that the stabilization function is carried out by operating on the data obtained from the radar set instead of attempting to stabilize the signals received by the radar set, as would be accomplished by stabilizing the antenna.

It should be pointed out that unless the antenna itself is stabilized it is impossible to obtain a completely stabilized P.P.I. display. For example, suppose first that the aircraft is level, and consider the line in which the plane of radiation from the antenna intersects the ground when the antenna has some particular rotational position. Any reflectors on this line are imaged on some one radius of the P.P.I. If the aircraft is now supposed to assume a tilted attitude, while remaining at the same position relative to the ground, the reflectors which were first imaged on a single radius of the P.P.I. should continue to be imaged on that radius in spite of the changed attitude of the aircraft. However, this is possible only if there is some rotational position of the antenna for which its plane of radiation intersects the ground in the line containing the reflectors under consideration, and this is possible only if the plane of radiation is vertical. Since the line of reflectors being considered can have any bearing whatever, it follows that a completely stabilized P.P.I. display can be obtained only if the plane of radiation remains vertical for all rotational positions of the antenna, and this is possible only if the antenna is stabilized.

Although it is not possible to obtain a completely stabilized P.P.I. display with an unstabilized antenna, it is possible to stabilize on the face of the P.P.I. the image of one particular ground reflector. To explain how this is accomplished, it is necessary to describe the relationship of the antenna axes to the antenna illustrated in FIG. 17.

The $z_3$-axis coincides with the rotation axis of the antenna in the direction from $A_1$ to $A_2$ and, therefore, coincides with the $z_1$ and $z_2$ axes. The $y_3$-axis coincides with the tilt axis of the antenna in the direction from $B_1$ to $B_2$. The $x_3$-axis is then perpendicular to $A_1A_2$ and to $B_1B_2$ in the direction of the front of the antenna. Here again, as in the case of the stabilization unit axes, the origin of the antenna axes is assumed to coincide with the origin of the fixed XYZ axes.

It should be pointed out that this assumption that all sets of axes have a common origin theoretically leads to a small bombing error. The nature of this error is most readily understood if it is supposed that the computer operation is perfect and the assumptions on which it is designed are exactly satisfied. Then, if a bomb is dropped after sighting and synchronizing by the use of the periscope, the bomb would miss the target by an amount equal to the distance in the aircraft between the location of the periscope and the bomb rack from which the bomb is released. If the operation is performed with radar observations, the bomb would miss the target by an amount equal to the distance between the antenna and the bomb rack. These distances between various points within the aircraft are small compared with the dimensions of the usual targets and can therefore be neglected.

The relative azimuth of the tilt axis of the antenna is specified by the angle $\theta'_{13}$ between the $y_1$ and $y_3$ axes, while the relative azimuth of the plane of radiation is the angle $90°+\theta'_{13}$ between the $y_1$ and $x_3$ axes, the plane of radiation being the $z_3x_3$-plane. It should be noted that, with the definitions adopted here, the antenna axes are fixed with respect to the supports of the antenna reflector rather than with respect to the reflector itself. FIG. 64 illustrates the XYZ-axes and the tilted floor plane of the aircraft containing the $y_1$-axis in the direction of the longitudinal axis of the aircraft and the $y_2$—$y_1$-axis in the direction of the longitudinal axis of the aircraft and the $y_2$-axis of the stabilization unit. The $Zy_2$-plane is then the vertical plane containing the line of sight. Also shown is an azimuth plane determined by the line of sight and the $z_3$-axis normal to the floor plane of the aircraft. At some point in the azimuth rotation of the antenna, the plane of radiation will contain the line of sight and will coincide with the azimuth plane.

The object on the ground whose image is to be stabilized on the P.P.I. is the object on which the line of sight is placed, since it is that object for which lack of stabilization would be most detrimental to the accuracy of the system in bombing or navigation. Thus, while the antenna constantly rotates in azimuth, it is at the instant when its plane of radiation contains the line of sight that the radial sweep on the P.P.I. must have the proper position angle. Furthermore, causing the P.P.I. sweep to occur at the proper position angle is sufficient to stabilize the particular image under consideration, since the slant range to any object on the ground and, therefore, the radial distance to its image on the P.P.I. is unaltered by a change in the attitude of the aircraft.

Let $\delta$ be the angle indicated in FIG. 64 from the $y_2$-axis to the azimuth plane containing the line of sight. At the instant that the plane of radiation of the antenna contains the line of sight, the $x_3$-axis lies in the azimuth plane containing the line of sight, and the angle between the longitudinal axis of the aircraft and the $x_3$-axis is $\theta'_{13}+90°$. Then, from the figure, $\theta'_{13}+90°-\delta=\theta'_{12}$ or $\theta'_{13}+90°-\delta-\theta'_{12}=0$. Now let $\psi$ be the position angle of the sweep on the face of the P.P.I., with $\psi=0$ when the sweep is vertically upward and $\psi$ increasing as the sweep moves around the face of the tube in a clockwise direction (it is assumed that the antenna rotates in a clockwise direction as viewed from above). At the particular instant that the plane of radiation contains the line of sight, the equation $\theta'_{13}+90°-\delta-\theta'_{12}=0$ is valid, and it is desired to have $\psi=\phi$, where $\phi$ is the bearing of the line of sight. This result can be obtained by causing $\psi$ at all times to have the value $$\psi = \phi + (\theta'_{13} + 90° - \delta - \theta'_{12})$$

the term $\theta'_{13}$ in the right member being the one which causes the radial sweep to progress around the face of the P.P.I. as the antenna rotates in azimuth. Rearranging the terms, $\psi = (\phi - \theta'_{12} + \theta'_{13} + 90°) - \delta$, and in this expression $\phi - \theta'_{12} = h_2 - \theta'_{12}$ which is the approximate value $h'_1$ of aircraft heading that is used in the computer. Although this value of aircraft heading contains the gimbal error mentioned above, it is observed that it is the correct value to use in the present application. Should it be found desirable to eliminate the gimbal error by introducing the additional mechanism needed for producing the value of $h_1$, it would still be theoretically correct to compute $h'_1$ for use in stabilizing the P.P.I. presentation. The second term in the last expression for $\psi$ is the azimuth of the plane of radiation of the antenna and is obtained as a shaft rotation measured at one of the bearings $A_1$ or $A_2$ of FIG. 17. The remaining term, $\delta$, is called the "scanner roll correction angle."

Figure 46:
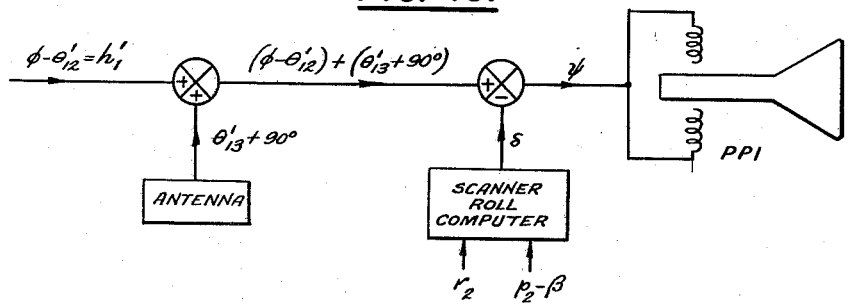
FIG. 46 is a schematic diagram of the means to determine the position angle of the plan position indicator.

FIG. 65 shows a spherical triangle contained in FIG. 64, one side of which is the correction angle $\delta$ necessary for stabilizing the P.P.I. presentation. The known parts of the triangle are the right angle adjacent to $\delta$, the angle $90° - r_2$ adjacent to $\delta$, and the side $90° + (p_2 - \beta)$ opposite to the right angle, the values of $p_2$ and $r_2$ being available from the stabilization unit and the value of $\beta$ from the computer. The values of these known parts are sufficient to determine the value of $\delta$ and, in fact, $\tan \delta = -\sin r_2 \cot (p_2 - \beta)$. This computation is performed by the "scanner roll computer," which is essentially a gimbal system reproducing the relations of FIG. 65. For the present unit is illustrated as a box having inputs $r_2$ and $p_2 - \beta$ and an output $\delta$, its internal construction being described later. FIG. 46 illustrates the operations that are required to position the deflection coil of the P.P.I. when the image of the sighting point is to be stabilized against changes in the attitude of the aircraft. These operations, rather than the simplified ones indicated in FIG. 19, are the ones actually carried out in the system.

Figure 47:
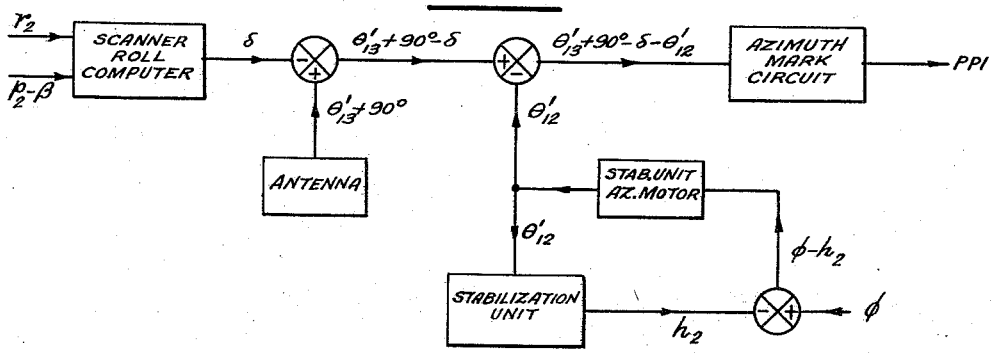
FIG. 47 is a schematic diagram of the bearing measuring circuits for the plan position indicator.

It is necessary next to consider the modifications of the azimuth mark circuits required to account for changes in the attitude of the aircraft. It was shown that the equation $\theta'_{13} + 90° - \delta - \theta'_{12} = 0$ holds when the plane of radiation contains the line of sight, and it is at this instant that the azimuth mark should be made. To effect this result in practice, the illustrative circuit of FIG. 24 is replaced with that of FIG. 47.

It will be helpful to compare the functions performed by the mechanisms illustrated in the last two figures. The connections of FIG. 47 cause the azimuth mark to occur when the plane of radiation contains the line of sight. Since the line of sight is directed toward an object on the ground whose bearing is $\phi$ and whose sighting angle is $\beta$, and since the radar receives a reflected pulse from this object when the object is contained in the plane of radiation, the last statement is equivalent to the statement that the connections illustrated cause the azimuth mark to occur at the instant that the plane of radiation illuminates a radar reflector having bearing $\phi$ and sighting angle $\beta$. The reflected pulse is, therefore, received at the instant that the azimuth mark is made (more properly, recalling the duration of the azimuth mark pulse, the reflected pulse is received at some instant during the duration of the azimuth mark pulse), and the azimuth mark on the P.P.I. must contain the image under consideration. This statement is true whether or not the azimuth mark and reflector image have the proper position angle on the face of the P.P.I., i.e., whether or not the connections from the antenna to the P.P.I. deflection coil are those indicated in FIG. 46. Since the accuracy of determining the slant range and bearing of a ground reflector depends only on obtaining coincidence between the image and the intersection of the range and azimuth marks, it is conceivable that this coincidence could be obtained without the use of the connections of FIG. 46. Thus the azimuth mark correction is to be regarded as a correction which is essential if the radar determination of the aircraft's ground position is to be correct, while the P.P.I. correction is merely one which makes the operator's task easier by preventing the image of the ground reflector, together with the superimposed azimuth and range marks, from moving about on the face of the P.P.I. as the attitude of the aircraft changes.

Another correction which resembles the P.P.I. correction is that which is made by tilting the antenna reflector to maintain uniform illumination on the ground as the attitude of the aircraft changes. Since the plane of radiation of the antenna is perpendicular to the axis $B_1B_2$, motions of the antenna reflector about this axis do not alter the plane of radiation but only the directional distribution of energy within the plane. Failure to make the correction therefore does not cause an error directly, but only makes it more difficult for the operator to make precise settings of the range and azimuth marks on the image of a ground object, since the intensity of the image changes as the aircraft attitude changes.

To explain how the correction is carried out, suppose first that the azimuth axis $A_1A_2$ of the antenna is vertical and that the antenna reflector is rotated to such a position about $B_1B_2$ that the energy returned from various objects on the ground is constant for all ranges, or as nearly constant as the design of the antenna reflector will allow. With the $x_3y_3z_3$-axes defined as before, let $x'_3$ be an axis in the reflector which coincides with the $x_3$-axis when the reflector has the position described, i.e., $x'_3$-axis is horizontal. Now suppose that the aircraft departs from a level attitude and that the $x_3y_3z_3$-axes assume the position shown for the xyz-axes in FIG. 40. If no rotation of the antenna reflector in its bearings $B_1$ and $B_2$ takes place during the change in the attitude of the aircraft, then the $x'_3$-axis coincides with the $x_3$-axis and does not ordinarily lie in a horizontal plane. Recalling that the $y_3$-axis coincides with the center line of the bearings $B_1$ and $B_2$, it is evident from FIG. 40 that the $x'_3$-axis can be brought to a horizontal position by rotating the antenna reflector in its bearings through an angle $-r_3$, and this is the condition required to obtain the desired uniformity of illumination.

In the system, an approximate value of $r_3$ is obtained indirectly from the roll and pitch angles produced by the stabilization unit, and this value of $r_3$, through the use of a servo, positions the antenna reflector in its bearings $B_1$ and $B_2$. In view of the earlier statements on the effect of this correction, an approximate value of $r_3$ is sufficiently accurate for this purpose.

Figure 48:
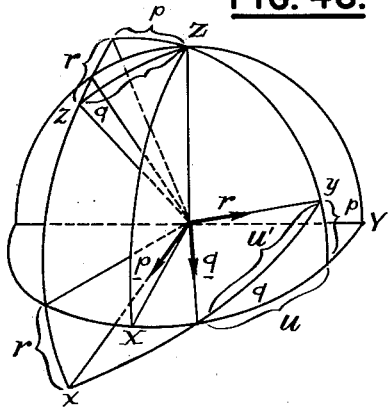
FIG. 48 is a diagram illustrating roll, pitch and tilt vectors.
Figure 49:
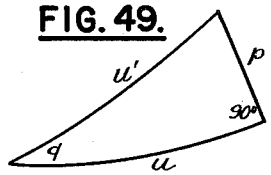
FIG. 49 is a diagram illustrating the relation of tilt to roll and pitch angles.

The computation of this approximate value is made to depend on the vectorial character of small rotations. Previously, the tilt angle q of the xyz-axes of FIG. 40 was defined as the angle between the Z- and z-axes, or the angle between the XY- and xy-planes. Now let the pitch angle p (FIG. 48) be represented by a vector $\underline{p}$ along the x-axis, the roll angle r by a vector $\underline{r}$ along the y-axis, and the tilt angle q by a vector $\underline{q}$ along the line of intersection of the XY-plane and the xy plane. Also let u' be the angle between the $\underline{q}$ and $\underline{r}$ vectors and u be the angle between the $\underline{q}$ vector and the vertical projection of the $\underline{r}$ vector into the horizontal plane. FIG. 49 shows the spherical triangle contained in FIG. 48 from which the relations $$\cos q = \cos p \cos r$$

$$\tan u' = \frac{\tan p}{\sin r}$$

are obtained. If p and q are small, these equations reduce approximately to $$q = \sqrt{p^2 + r^2}$$
$$\tan u' = p/r$$

However, these last equations express exactly the magnitude and direction of the vector sum $\underline{p} + \underline{r}$, so that when p and r are small the vector equation $\underline{q} = \underline{p} + \underline{r}$ is approximately true.

Since the $z_1$, $z_2$, and $z_3$-axes coincide, the aircraft axes, the stabilization unit axes, and the antenna axes all have the same tilt-vector $\underline{q}_1 = \underline{q}_2 = \underline{q}_3$ or $$\underline{r}_1 + \underline{p}_1 = \underline{r}_2 + \underline{p}_2 = \underline{r}_3 + \underline{p}_3.$$

Figure 50:
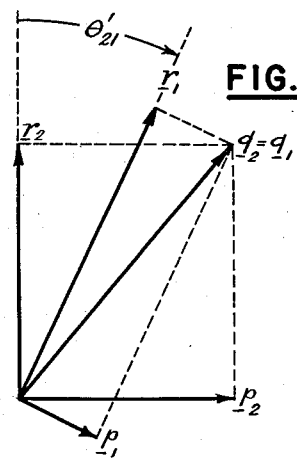
FIG. 50 is a diagram illustrating the tilt vector components.
Figure 51:
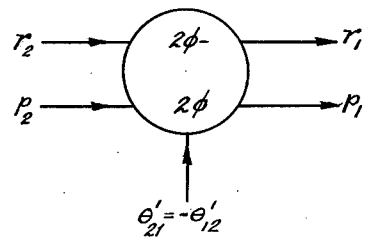
FIGS. 51 and 52 are schematic diagrams of the means to determine approximations of aircraft roll and pitch and antenna roll and pitch, respectively.

FIG. 50 shows how the vector $\underline{q}_2 = \underline{q}_1$ can be expressed as a sum of vectors $\underline{r}_2$ and $\underline{p}_2$ along the stabilization unit axes and also as a sum of vectors $\underline{r}_1$ and $\underline{p}_1$ along the aircraft axes. The angle from the $y_2$-axis to the $y_1$-axis, and therefore the angle between $\underline{r}_2$ and $\underline{r}_1$, is $\theta'_{21} = -\theta'_{12}$. A knowledge of $r_2$ and $p_2$, together with a knowledge of the angle $\theta'_{21}$, is then sufficient to determine $r_1$ and $p_1$. This can be accomplished electrically through the use of a $2\theta - 2\theta$ synchro, described later. For the present purpose it is sufficient to point out that the values of $r_2$, $p_2$, and $\theta'_{21}$ actually determine the values of $r_1$ and $p_1$, and to state that this computation is carried out electrically as indicated schematically in FIG. 51.

Figure 52:
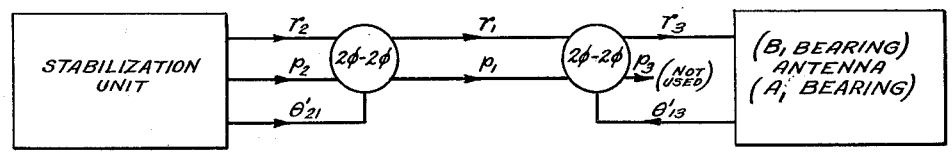
Figure 59:
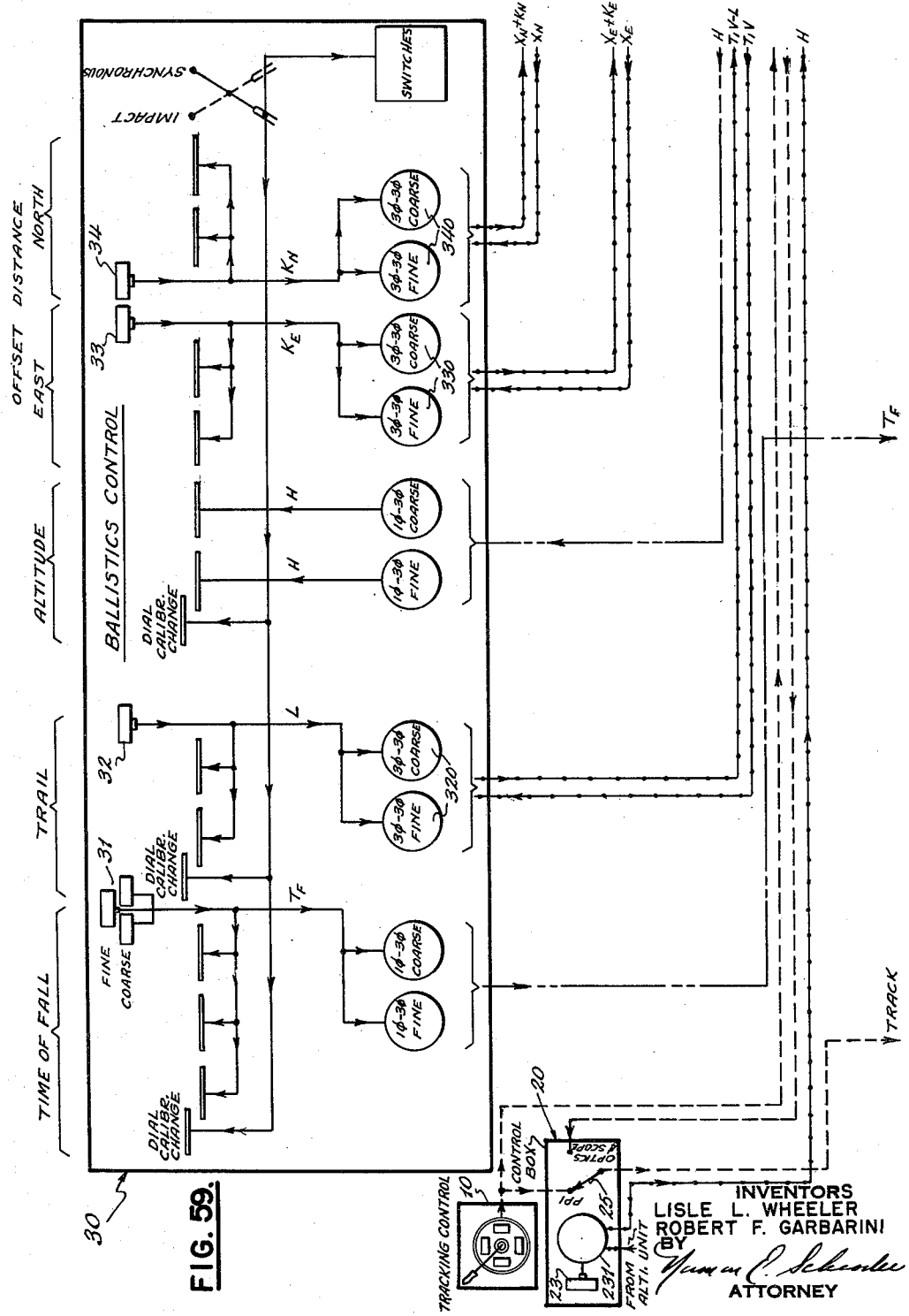
Figure 60:
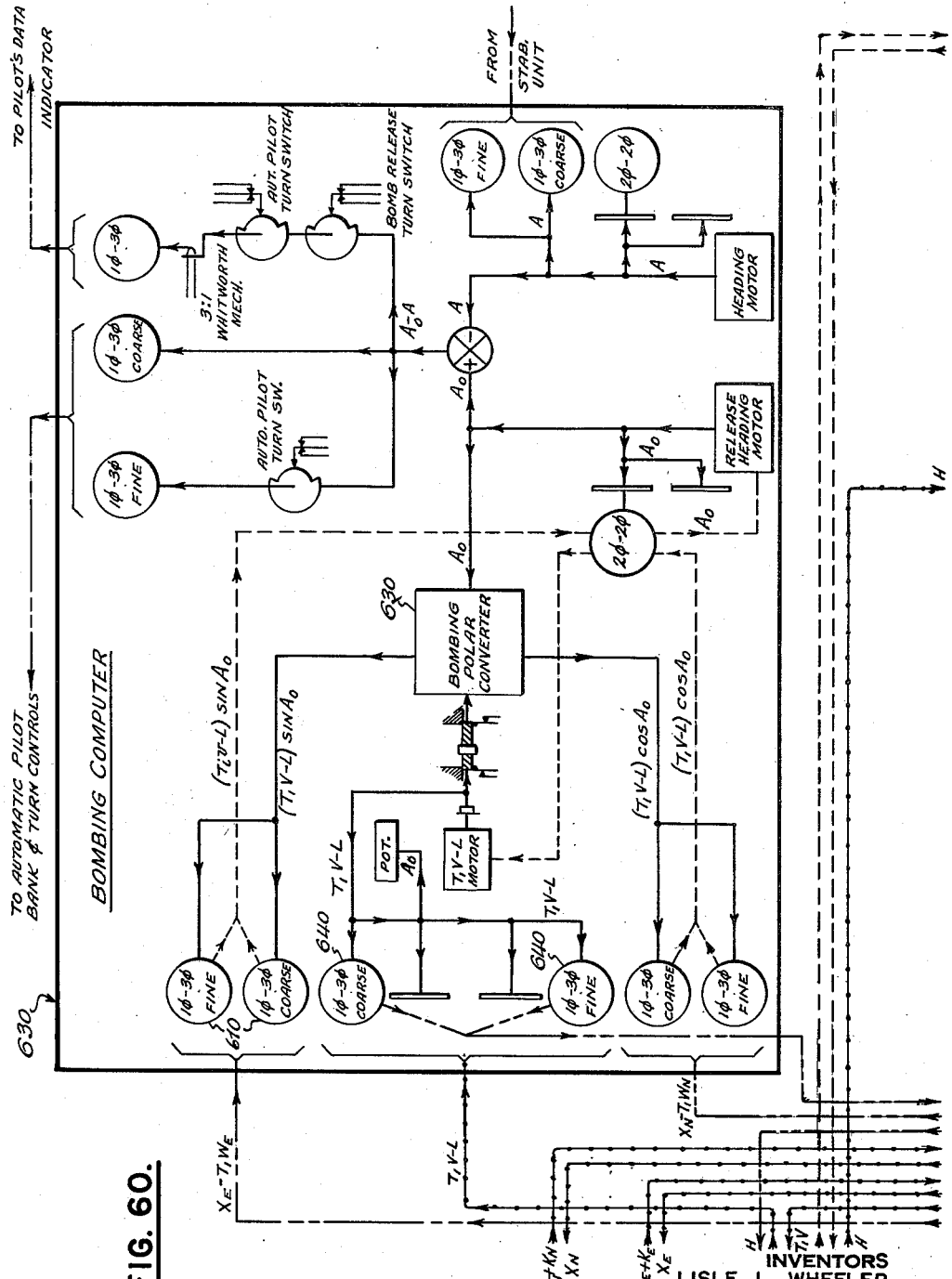

When the values of $r_1$ and $p_1$ are obtained, the values of $r_3$ and $p_3$ are obtained from $r_1$ and $p_1$ in the same manner that $r_1$ and $p_1$ were obtained from $r_2$ and $p_2$, the azimuth angle used in this case being $\theta'_{13}$ instead of $\theta'_{21}$. FIG. 52 indicates the two transformations required to obtain the approximate value of $r_3$ and the sources of the data entering the computation. The value of $\theta'_{13}$ is obtained as a rotation measured at bearing $A_1$ of FIG. 17, and the value of $r_3$ is transmitted to bearing $B_1$ where it is reproduced by a servo as a rotation of the antenna reflector in its bearings.

THE STABILIZATION UNIT

The geometrical requirements of the stabilization unit were described above. It was shown that these requirements can be satisfied if it is possible to build a stable element, which retains a fixed orientation with respect to the North and vertical directions as the attitude of the aircraft changes and as it moves over the surface of the earth. With this stable element supported in an appropriate gimbal system, the data necessary to stabilize the line of sight and the radar data, and to furnish the aircraft heading, are available as shaft rotations at various bearings of the gimbal system. A stabilization system to derive this data is shown schematically in FIG. 12.

The direction of the vertical at a point fixed with respect to the earth is the direction assumed by a plumb line at that point, or the direction normal to the free surface of a liquid at that point. More precisely, to avoid considering the swinging of a plumb line or the surging of a liquid, the direction of the vertical is defined as the direction of the force required to maintain a mass particle fixed with respect to the earth. This force is the resultant of the graviational force on the particle and the much smaller centrifugal force caused by the earth's rotation.

As a result of the acelerations to which an aircraft in flight is subjected, the direction of the force constraining a mass particle to the aircraft is not the same as the true vertical but differs from it by the effect of the force necessary to accelerate the particle so that it remains fixed with respect to the aircraft. The direction of the force constraining a particle to the aircraft is defined as the dynamic vertical, and coincides with the true vertical when the aircraft remains fixed with respect to the earth. While the dynamic vertical oscillates so greatly and so rapidly as to be almost useless as a direct indication of the true vertical, it is possible to subject the dynamic vertical to a smoothing or averaging process. The indicated vertical which results from this process is a more or less accurate approximation of the true vertical. Exactly how accurate this approximation is depends on whether the accelerations of the aircraft are of a random nature or contain systematic components. The possibility of using this method to obtain an indication of the vertical is a result of the fact that the accelerations of a winged aircraft are largely random, while most of the systematic accelerations are of such a nature that their values can be computed independently and their effects compensated.

The usual method of accomplishing this smoothing is by the use of a vertical gyro. The direction of the spin axis of this gyro maintains a fixed direction in space when it is not acted upon by torques. The indications obtained from certain gravity sensitive (and, unavoidably, acceleration sensitive) elements in the system are used to apply a torque to the gyro which precesses its axis in a direction toward the instantaneous direction of the dynamic vertical. The processional motion of the gyro is made so slow that it cannot follow the rapid variations in the direction of the dynamic vertical, and the direction of the gyro axis is therefore a smoothed version of the direction of the dynamic vertical and is taken as the indicated vertical. While the method of obtaining the indicated vertical in the stabilization unit differs from this in detail, the explanation to be given will show that the basic principles are the same.

In aircraft applications an indication of the North direction is obtained by reference to the horizontal component of the earth's magnetic field. In this system, the magnetic field sensitive element is a Sperry Flux Valve, described in detail later. For the purposes of this portion of the description, the Flux Valve can be described as a small disk containing a winding which is constantly excited by a 400 cycle voltage. One face of the disk bears a radial reference line, and the output of the Flux Valve is an electrical signal which indicates the angle between this reference line and the component of the earth's magnetic field which lies in the disk. To obtain the value of aircraft heading from this device, it is necessary that the plane of the disk be horizontal, so that it is affected only by the horizontal component of the field, and that the radial reference line lie in the same vertical plane, or a parallel vertical plane, as the aircraft's longitudinal axis. These conditions can be satisfied by suspending the Flux Valve pendulously on a universal joint related to the aircraft axes, in the manner indicated in FIG. 53. The weight of the Flux Valve maintains the disk in a horizontal plane and, from the arrangement of the pivots, it is clear that the axis $A_1A_2$, which is parallel to the $y_1$- or longitudinal axis of the aircraft, is contained in the same vertical plane as the reference line.

It was implied that the horizontal component of the earth's field is directed toward the true North, while in practice it is directed toward the magnetic North which forms an angle with the true North direction equal to the magnetic variation. When the location of the aircraft is known, the value of magnetic variation is also known and can be applied as a correction to the signal obtained from the Flux Valve. The method of obtaining magnetic variation was described above, and the exact method of using this quantity to correct the Flux Valve heading will be explained presently. The objection to obtaining aircraft heading in the manner described is that the aircraft in flight is subject to accelerations which cause the pendulous Flux Valve to oscillate so that the plane of its disk does not remain horizontal, an incorrect value of aircraft heading thereby being obtained. The oscillation of the magnetic element can be prevented by mounting it on a vertical gyro, this being the method employed in other systems. There is another method, however, of eliminating the effect of the oscillation without stabilizing the magnetic element, this being the principle of the Sperry Gyrosyn Compass.

In the latter arrangement the aircraft is equipped with a directional gyro which alone would indicate aircraft heading except for a slow drift caused by unavoidable torques and to the changing direction in space of the North direction as a result of the earth's rotation and the motion of the aircraft over the surface of the earth. To correct the error from these sources, the heading obtained from the gyro is compared with the heading obtained from the Flux Valve, and the difference of the two values is used to precess the directional gyro to bring the values into agreement. Since the gyro is made to precess very slowly, it smooths the fluctuating Flux Valve indication in the same manner that a vertical gyro smooths the dynamic vertical. It should be pointed out that the use of this method in a compass is merely a matter of convenience, since the magnetic field itself is not affected by accelerations of the aircraft, while the force field from which the vertical indication is derived is so affected and a smoothing process is essential. The convenience of this method of obtaining aircraft heading is a result of the fact that the magnetic element must be mounted in the aircraft in a position remote from the magnetic field of the engines, usually in the wing tip. The limited space available for such an installation makes it difficult to stabilize the element with a vertical gyro, while a pendulous Flux Valve requires very little space. The Flux Valve used in the Sperry Gyrosyn is suspended in the manner indicated in FIG. 53 and is surrounded by a viscous damping fluid. This tends to limit the amplitude of the oscillations of the pendulous magnetic element and gives a certain amount of smoothing in addition to that brought about by the action of the directional gyro.

The application of these principles to the present stabilization unit can be summarized by reference to FIG. 44. The stable element is supported in a gimbal system which by permitting rotations at the pairs of bearing $D_1D_2$, $E_1E_2$, and $V_1V_2$ allows it three degrees of rotational freedom with respect to the stabilization unit axes, the rotation at $F_1F_2$ being regarded as an adjustment which allows the position of the stabilization unit axes to be altered with respect to the aircraft. The stable element contains three gyros which tend to maintain it in a fixed orientation in inertial space. The stable element also contains two levels which indicate the direction of the dynamic vertical. These levels produce signals which act on two of the gyros in such a way as to produce an angular velocity of the stable element about an axis perpendicular to $V_1V_2$, tending to bring $V_1V_2$ into coincidence with the dynamic vertical. At the same time, a value of aircraft heading is obtained from the table element, as described above, and this is compared with the value obtained from a Flux Valve mounted in the wing of the aircraft. The difference between the two values causes the third gyro to precess in such a way as to produce an angular velocity of the stable element about the axis $V_1V_2$. When the stable element attains such an orientation about this axis that the two values of aircraft heading are equal (on the average), then the direction ON is the direction of the horizontal component of the earth's magnetic field. Instead of comparing the two values directly, the magnetic variation is taken into account by adding its value (counted as positive when magnetic North is East of true North) to the magnetic heading produced by the Flux Valve. This gives a value of true heading, as derived from the Flux Valve, which is compared with the indication of true heading obtained from the stabilization unit, and the difference between the two values produces an angular velocity of the stable element about $V_1V_2$.

In describing the gyroscopic action of the stable element, attention is first directed toward the action through which the stable element can maintain a fixed orientation in inertial space, in spite of the presence of external disturbing torques, and then it is explained how this orientation can be slowly changed in order to realize the desired vertical and directional orientation with respect to the earth. It is desirable to explain that an inertial coordinate system, from the theoretical point of view, is one in which Newton's Laws of Motion are valid. In a practical sense, the stars have constant directions from the earth in an inertial coordinate system so that a fixed orientation in inertial space means a fixed orientation with respect to the stars.

For the purpose of this discussion it is assumed that the principles of the gyroscope are well known, especially the fact that the angular rate of precession of a gyro is proportional to the applied torque and takes place about an axis perpendicular to the spin axis and to the axis of the applied torque. Since this law of gyroscopic motion is a consequence of Newton's Laws, the angular rate of precession referred to in this statement is an angular rate with respect to inertial space. As a special case of the above statement, the gyro axis maintains a fixed direction in inertial space in the absence of an applied torque. The explanation of the stable element given here is based on the approximation that the angular momentum vector of a gyro coincides with the axis of symmetry of the gyro rotor, i.e., nutation effects are neglected. One of the objectives of good gyro design is to reduce these effects to an insignificant level. In order to make the explanation as simple as possible, the following description applies directly to a more symmetrical design of the stable element than that of the present stabilization unit. These minor differences in design are discussed briefly later.

In FIG. 54 the stable element is represented, as above, by a cubical box. In any application the stable element is supported in some form of gimbal system, but for the preliminary discussion it is not necessary to consider the method of support. The stable element might be imagined simply as a box which can be picked up in the hands and tested for rotational rigidity by the manual application of torques. For convenience in referring to the various directions in the stable element, a system of mutually perpendicular unit vectors $\underline{u}_1$, $\underline{u}_2$, $\underline{u}_3$ is imagined fixed in the stable element, as illustrated. Considering first the method of obtaining resistance to torque about $\underline{u}_1$ only, suppose a gyroscope $G_1$ is mounted in the element with the gyro case pivoted about an axis parallel to $\underline{u}_2$, this axis being referred to as the pivot axis of the gyro. The gyro case is indicated as an open frame with its pivot axis parallel to $\underline{u}_2$ and with bearings perpendicular to the pivot axis which support the gyro rotor. Before the application of a torque to the stable element, the spin axis is assumed to be in its "normal" position parallel to $\underline{u}_3$. Since only the directions of the various axes are being considered here, it is convenient to say that the pivot axis of $G_1$ is the vector $\underline{u}_2$ and that the normal position of the spin axis of $G_1$ is the vector $\underline{u}_3$.

If a torque is now applied to the stable element about the axis $\underline{u}_1$, gyro $G_1$ precesses about its pivot axis and, as long as this precession continues, the torque is resisted without any rotation of the stable element itself occurring. The rate of precession of the gyro is proportional to the torque so that a greater torque merely precesses the gyro at a greater rate. A steady torque about $\underline{u}_1$ could not be resisted indefinitely in this way since, finally, the spin axis would align itself with $\underline{u}_1$ and all rigidity about this axis would disappear. Torques in alternating directions about $\underline{u}_1$, however, precess the gyro first in one direction and then in the other so that it never departs far from its normal position. Even very great torques of this nature can be completely resisted.

The single gyro described offers no resistance whatever to a torque about $\underline{u}_2$. Such a torque simply produces a rotation of the box about $\underline{u}_2$ while leaving the spin axis of gyro $G_1$ in a fixed direction in space. A torque about $\underline{u}_3$ would also be unresisted if the gyro were in its normal position, since the box and gyro case would simply rotate about the spin axis of the gyro.

For the purpose of resisting a torque about $\underline{u}_2$, a second gyro $G_2$ is mounted in the stable element, the pivot axis being parallel to $\underline{u}_3$ and the spin axis being normally parallel to $\underline{u}_1$. The preceding description of the action of $G_1$ applies equally well to $G_2$ if the subscripts are changed according to the rule 1→2, 2→3, 3→1. In the same manner, a gyro $G_3$ is provided to resist a torque about $\underline{u}_3$. The mounting, normal position of the spin axis, and torque resisting action of the three gyros are summarized in the following table:

| Gyro | Pivot axis | Spin axis | Resists Torque about | Precesses about |
|---|---|---|---|---|
| $G_1$ | $\underline{u}_2$ | $\underline{u}_2$ | $\underline{u}_1$ | $\underline{u}_2$ |
| $G_2$ | $\underline{u}_3$ | $\underline{u}_1$ | $\underline{u}_2$ | $\underline{u}_3$ |
| $G_3$ | $\underline{u}_1$ | $\underline{u}_2$ | $\underline{u}_3$ | $\underline{u}_1$ |

Up to this point it was supposed that any disturbing torque would act about only one of the three directions $\underline{u}_1$, $\underline{u}_2$, or $\underline{u}_3$, but it is clear that each gyro resists a torque about only one axis so that torques can be applied to the three axes simultaneously, each gyro functioning individually in the manner just described. However, torques applied simultaneously about the three axes are equivalent to a single torque applied about an axis having an arbitrary direction in the stable element. The configuration of gyros described is therefore capable of resisting, for a limited period of time, a disturbing torque of any magnitude about an axis having an arbitrary direction with respect to the stable element. The greater the magnitude of such a torque the shorter is the period of time that it can be resisted before one of the gyros precesses into such a position that it is no longer able to resist its proper component of torque. Even a small disturbing torque would finally produce this condition so that the arrangement thus far desribed is unsatisfactory in a practical sense where such small disturbing torques are inevitably present.

Returning again to the base where the disturbing torque is about $\underline{u}_1$ and is resisted by the gyro $G_1$, it is clear that the existence of a precessional motion of $G_1$ about its pivot axis is evidence that the gyro is being called upon to resist some disturbing torque and, therefore, it is natural to use this precessional motion to bring into action a corrective torque which opposes the disturbing torque. Elaborating on the previous example in which it was supposed that the disturbing torque is being applied manually, it might be imagined that a second person stands ready to apply a manual corrective torque about $\underline{u}_1$ whenever a precessional motion of $G_1$ indicates the need for it. By observing the direction of departure of the spin axis from its normal position, this second person could apply a corrective torque in such a sense as to precess the spin axis back toward its normal position. It would obviously be impossible to perform this task with such perfection that the gyro never left its normal position since there would then be no displacement of the gyro to indicate the need for a corrective torque, the corrective torque always being instantaneously exactly opposite to the disturbing torque. If, however, it is recalled that the precessional rate of the gyro is proportional to the disturbing torque, it will be realized that the corrective torque need not return the gyro to its normal position but, is required only to reduce the rate of precession to zero. If this objective is accomplished, the corrective torque completely neutralizes the disturbing torque even though the gyro is not in its normal position. This can be achieved by making the corrective torque proportional to the displacement of the spin axis from its normal position and of such a sense as to precess the gyro toward its normal position if the corrective torque were acting alone.

Suppose then that the gyro is in its normal position and a constant disturbing torque is suddenly applied. The gyro starts to precess about its pivot axis at a rate proportional to the disturbing torque but, as soon as it moves away from its normal position, the corrective torque is applied in such a way as to neutralize part of the disturbing torque, and the precessional rate decreases. This process continues, the displacement increasing, but more slowly, until the corrective torque attains such a magnitude as to neutralize completely the disturbing torque, and the displacement then remains constant. If the disturbing torque is now suddenly removed, the corrective torque remains and precesses the gyro back toward its normal position in the same manner as the disturbing torque originally precessed it away. As the gyro approaches its normal position, the corrective torque diminishes, and the rate of approach to the normal position decreases. Finally, the gyro reaches its normal position, and the corrective torque vanishes. This relation between the position of the gyro spin axis and the magnitude and sense of the corrective torque therefore has the effect of keeping the gyro centered at its normal position when no disturbing torque is acting.

From the symmetry of the form of stable element considered here, this description applies equally well, with appropriate changes in the subscripts, to the other two gyros acting individually and to all three gyros acting simultaneously. It is seen, therefore, that the total corrective torque applied to the stable element should have such a direction and magnitude that its components in the directions of $\underline{u}_1$, $\underline{u}_2$, $\underline{u}_3$ are equal to the angular displacements of the three gyros $G_1$, $G_2$, $G_3$ about their pivot axes $\underline{u}_2$, $\underline{u}_3$, $\underline{u}_1$, these displacements being counted from the normal positions in which the spin axes are in the directions of $\underline{u}_3$, $\underline{u}_1$, $\underline{u}_2$.

In order to obtain signals for controlling the corrective torque, the pivot axis of each of the gyros is provided with a pick-off which produces an alternating voltage of magnitude proportional to the displacement and with a phase the same as, or opposite to, the phase of some reference voltage, depending on the sense of the displacement. These three signals, therefore, specify completely the required corrective torque.

By the expedient of imagining the corrective torque to be applied manually, the necessity of considering the gimbal system which supports the stable element in the aircraft has, thus far, been avoided. This gimbal system was previously considered necessary only for supporting the stable element, while allowing it the required freedom of motion, and for generating as mechanical rotations the angles necessary for optical and radar stabilization. By the addition of appropriate electrical torque motors, this gimbal system also becomes available for the automatic application of corrective torques to the stable element. The gimbal system of the stable element is again illustrated in FIG. 55 in which, for simplicity, the outermost supporting ring of FIG. 44 is omitted and the remainder of the gimbal system illustrated in its relationship to the stabilization unit axes. The assumption is made that the unit vectors $\underline{u}_1$, $\underline{u}_2$, $\underline{u}_3$ introduced earlier have such directions in the stable element that, when the stable element has its proper orientation with respect to the earth, $\underline{u}_1$ is directed toward the East, $\underline{u}_2$ toward the North, and $\underline{u}_3$ vertically upward. In the discussion of the corrective torque, however, it is not necessary to suppose that the stable element is properly oriented. The relative orientations of the stable element and of the periscope axes are defined by the angles $p_2$, $r_2$, and $h_2$ as illustrated. However, it should be emphasized that, since the stable element is not now assumed to have its correct orientation with respect to the earth, these symbols merely stand for the angles at certain bearings of the gimbal system and are not the true pitch, roll, and heading angles of the stabilization unit axes.

FIG. 55 also shows two new unit vectors $\underline{u}_4$ and $\underline{u}_5$, $\underline{u}_4$ being in the direction $D_1D_2$ and $\underline{u}_5$ in the direction of $E_2E_1$. By mounting torque motors at each of the bearings $D_2$, $E_1$, and $V_2$, it is possible to produce a torque on the stable element, and the magnitude and direction of this torque can be varied by changing the signals which energize the three torque motors. The torque developed by the motor $D_2$ can be expressed in the vector form $m_4\underline{u}_4$, that developed by the motor at $E_1$ in the form $m_5\underline{u}_5$, and that by the motor at $V_2$ in the form $m_3\underline{u}_3$. Each torque motor, of course, exerts equal and opposite torques on the inner and outer members of the bearing at which it is mounted, and the expressions given above refer to the torques on the inner members of each of the three bearings. In these expressions each of the scalar multipliers $m_4$, $m_5$, $m_3$ represents the magnitude and sense of the torque developed by one of the three torque motors, and the signals which energize the motors must therefore have magnitudes proportional to these quantities.

To express the total torque on the stable element in terms of the motor torques, the gyroscopic action is disregarded and the stable element is thought of as a simple rigid body. Let $\underline{M}$ be the torque on this rigid body as a result of the motor torques $m_4$, $m_5$, $m_3$. If from some outside source a torque $-\underline{M}$ is also applied directly to the stable element, the stable element is acted upon by two equal and opposite torques and remains in equilibrium. Now, let a small rotation $\underline{u}_4 dr_2$ take place at bearing $D_2$, the values of $p_2$ and $h_2$ remaining constant. The work done by the torque motor at $D_2$ during this rotation is $m_4 dr_2$. The rotation of the stable element as a result of this motion at $D_2$ is represented by the vector $\underline{u}_4 dr_2$. Since the torque on the stable element as a result of the action of all three torque motors is $\underline{M}$, the work done on the stable element is $\underline{M} \cdot \underline{u}_4 dr_2$. However, this was performed by the torque motor at $D_2$ alone, since no rotations of the other two motors occurred. Hence $m_4 dr_2 = \underline{M} \cdot \underline{u}_4 dr_2$ or $m_4 = \underline{M} \cdot \underline{u}_4$ and in a similar manner, it is found that $m_5 = \underline{M} \cdot \underline{u}_5$ and $m_3 = \underline{M} \cdot \underline{u}_3$.

Let $\underline{M} = \mu_4 \underline{u}_4 + \mu_5 \underline{u}_5 + \mu_{45}(\underline{u}_4 \times \underline{u}_5)$, where $\underline{u}_4 \times \underline{u}_5$ is a unit vector perpendicular to $\underline{u}_4$ and $\underline{u}_5$ and $\mu_4$, $\mu_5$, $\mu_{45}$ are scalar multipliers whose values are to be determined. FIG. 56 shows the relations between the mutually perpendicular unit vectors $\underline{u}_1$, $\underline{u}_2$, $\underline{u}_3$ and the mutually perpendicular unit vectors $\underline{u}_4$, $\underline{u}_5$, $\underline{u}_4 \times \underline{u}_5$. From this figure the following table is obtained which gives the cosines of the angles between the various vectors.

*Table of Direction Cosines*

|  | $\underline{u}_4$ | $\underline{u}_5$ | $\underline{u}_4 \times \underline{u}_5$ |
|---|---|---|---|
| $\underline{u}_1$ | $+\cos p_2 \sin h_2$ | $-\cos h_2$ | $-\sin p_2 \sin h_2$ |
| $\underline{u}_2$ | $+\cos p_2 \cos h_2$ | $+\sin h_2$ | $-\sin p_2 \cos h_2$ |
| $\underline{u}_3$ | $+\sin p_2$ | $0$ | $+\cos p_2$ |

Using the expression $\underline{M} = \mu_4 \underline{u}_4 + \mu_5 \underline{u}_5 + \mu_{45}(\underline{u}_4 \times \underline{u}_5)$, the motor torques are $$\begin{bmatrix} m_4 = \underline{M} \cdot \underline{u}_4 = \mu_4 \underline{u}_4 \cdot \underline{u}_4 + \mu_5 \underline{u}_5 \cdot \underline{u}_4 + \mu_{45}(\underline{u}_4 \times \underline{u}_5) \cdot \underline{u}_4 = \mu_4 \\ m_5 = \underline{M} \cdot \underline{u}_5 = \mu_4 \underline{u}_4 \cdot \underline{u}_5 + \mu_5 \underline{u}_5 \cdot \underline{u}_5 + \mu_{45}(\underline{u}_4 \times \underline{u}_5) \cdot \underline{u}_5 = \mu_5 \\ m_3 = \underline{M} \cdot \underline{u}_3 = \mu_4 \underline{u}_4 \cdot \underline{u}_3 + \mu_5 \underline{u}_5 \cdot \underline{u}_3 + \mu_{45}(\underline{u}_4 \times \underline{u}_5) \cdot \underline{u}_3 = \\ \mu_4 \sin p_2 + \mu_{45} \cos p_2 \end{bmatrix}$$

and from these equations $$\mu_4 = m_4$$
$$\mu_5 = m_5$$
$$\mu_{45} = m_3 \sec p_2 - m_4 \tan p_2.$$

Then the torque on the stable element, in terms of the motor torques, is (7) $\underline{M} = m_4 \underline{u}_4 + m_5 \underline{u}_5 + (m_3 \sec p_2 - m_4 \tan p_2)(\underline{u}_4 \times \underline{u}_5)$ On the other hand, the required corrective torque can be expressed in the form (8) $\underline{M} = M_1 \underline{u}_1 + M_2 \underline{u}_2 + M_3 \underline{u}_3$ where the multipliers $M_1$, $M_2$, $M_3$ are the components of the desired corrective torque along the unit vectors fixed in the stable element. According to the previous explanation, these multipliers are proportional to the displacements of the three gyros about their pivot axes, and corresponding voltages are available from the pivot axis pick-offs. It is necessary, then, to express $m_4$, $m_5$, $m_3$ in terms of $M_1$, $M_2$, $M_3$. From the table of direction cosines, $$\begin{bmatrix} \underline{u}_1 = +(\cos p_2 \sin h_2)\underline{u}_4 - (\cos h_2)\underline{u}_5 - (\sin p_2 \sin h_2)(\underline{u}_4 \times \underline{u}_5) \\ \underline{u}_2 = +(\cos p_2 \cos h_2)\underline{u}_4 + (\sin h_2)\underline{u}_5 - (\sin p_2 \cos h_2)(\underline{u}_4 \times \underline{u}_5) \\ \underline{u}_3 = +(\sin p_2)\underline{u}_4 + (\cos p_2)(\underline{u}_4 \times \underline{u}_5) \end{bmatrix}$$

Substituting these in (8), $$\underline{M} = (+M_1 \cos p_2 \sin h_2 + M_2 \cos p_2 \cos h_2 + M_3 \sin p_2)\underline{u}_4$$
$$+ (-M_1 \cos h_2 + M_2 \sin h_2)\underline{u}_5$$
$$+ (-M_1 \sin p_2 \sin h_2 - M_2 \sin p_2 \cos h_2 + M_3 \cos p_2)(\underline{u}_4 \times \underline{u}_5)$$

and comparing this with (7), $$\begin{bmatrix} m_4 = +(+M_1 \sin h_2 + M_2 \cos h_2) \cos p_2 + M_3 \sin p_2 \\ m_5 = (-M_1 \cos h_2 + M_2 \sin h_2) \\ m_3 = [(+M_1 \sin h_2 + M_2 \cos h_2) \sin p_2 \\ \quad + M_3 \cos p_2] \cos p_2 + m_4 \sin p_2 \end{bmatrix}$$
(9)

Except for the omission of the same factor of proportionality in all three equations, these may be interpreted as expressing the required torque motor voltages $m_4$, $m_5$, $m_3$ in terms of the pick-off signals $M_1$, $M_2$, $M_3$. While it would not be difficult to construct an electrical circuit which produced the values of $m_4$, $m_5$, $m_3$ prescribed by Equations 9, in the stabilization unit, advantage is taken of the fact that the value of $p_2$ exceeds the tilt of the aircraft. When $p_2 = 0$, Equations 9 reduce to

(10) $\begin{bmatrix} m_4 = +M_1 \sin h_2 + M_2 \cos h_2 \\ m_5 = -M_1 \cos h_2 + M_2 \sin h_2 \\ m_3 = M_3 \end{bmatrix}$ and these equations are realized very simply by means of a single $2\theta - 2\theta$ synchro in the manner illustrated in FIG. 66. This synchro is mounted at the bearing $V_1$ (see FIG. 55) of the stabilization unit where it is rotated according to the value of $h_2$. Although the approximation $p_2 = 0$ is somewhat arbitrary, it should be pointed out that it is not necessary that the corrective torque be precisely that prescribed by Equations 9. Any discrepancy between the torque called for by the pivot axis pick-offs and that delivered by the torque motors acts simply as another disturbing torque which eventually is neutralized by the torque motors even though Equations 9 are only approximately realized by the electrical circuits employed.

A stable element constructed in accordance with the previous description will theoretically maintain a fixed orientation in inertial space regardless of the presence of disturbing torque. In practice such torques might arise from unbalance of the stable element, from friction in its supporting gimbals, from inertia forces necessary to accelerate the gimbals as the attitude of the aircraft changes, etc. Instantaneous torques of great magnitude will be directly resisted by the action of the three gyroscopes, the maximum torque being limited only by the strength of the mechanical parts. Steady torques will be resisted initially by the action of the gyros and ultimately by the action of the torque motors, the resistance to steady torques being limited by the strength of the torque motors.

It is necessary next to consider how the orientation of the stable element with respect to inertial space is to be changed in order to bring it to the proper orientation with respect to the earth, and how this orientation with respect to the earth is to be maintained in the presence of the earth's rotation and the motion of the aircraft over its surface. Considering first the possibility of obtaining a rotation of the stable element about an axis parallel to $\underline{u}_1$, it is seen from FIG. 54 that such a rotation changes the direction in space of the spin axis of gyro $G_1$. This change in direction is, in fact, a precession of the spin axis and can take place only in the presence of a torque. It is clear from the figure that this precession is of such a nature that it must arise from a torque about the pivot axis $\underline{u}_2$ of $G_1$. Such a torque applied to the stable element as a whole would be resisted in the way already described, but in any case could not be communicated from the stable element to the gyro through the bearings of the pivot axis.

It is necessary, therefore, to provide a means of applying a torque directly to the pivot axis, and this is accomplished by mounting an electrical torque motor at one of the bearings of the pivot axis. One such torque motor is associated with each of the three gyros, and these motors are referred to as internal torque motors to distinguish them from the external torque motors previously described which act on the gimbals supporting the stable element. Considering the gyro $G_1$, a torque $N_1$ applied to its pivot axis provides a proportional precessional rate of the spin axis about the $\underline{u}_1$ vector. In its precession, the gyro $G_1$ carries the whole stable element with it, and the stable element therefore has an angular velocity about $\underline{u}_1$ proportional to the internal torque $N_1$. Similar statements apply to the other two gyros considered separately and to all three gyros acting simultaneously, so that signals $N_1$, $N_2$, $N_3$ applied to the internal torque motors produce an angular velocity of the stable element in space which may be represented by the vector $\omega = N_1\underline{u}_1 + N_2\underline{u}_2 + N_3\underline{u}_3$. In exerting a torque on one of the three gyros, each torque motor applies an opposite torque to the structure of the stable element. This torque is resisted immediately by one of the other gyros and ultimately by the external torque motors in the same manner as any other disturbing torque applied to the stable element as a whole.

The description of the stable element given thus far may be summarized briefly by saying that the stable element consists of a box which is gimballed with respect to the stabilization unit axes in a manner which allows it three degrees of rotational freedom. This box can be given an arbitrary angular velocity with respect to inertial space by supplying the three internal torque motors with signals proportional to the three components of the desired angular velocity, these components being along axes fixed in the box. This angular velocity is realized without regard to disturbing torques acting on the stable element. In the special case in which no signals are applied to the internal torque motors, the stable element maintains a fixed orientation in inertial space.

In describing the method of bringing the stable element into the correct orientation with respect to the earth, it is necessary to refer frequently to three different directions related to the vertical, and it is convenient at the outset to define more or less precisely three unit vectors in these directions. The first is the direction of the true vertical at the location of the aircraft, and the unit vector in this direction is denoted by $\underline{h}$. This direction is normal to the spheroidal surface of the earth and is the direction assumed by a plumb line whose point of support is fixed to the earth. Recalling the earlier reference to the use of a test mass for determining the vertical, $\underline{h}$ is also the direction of the force constraining such a test mass to the aircraft when the aircraft is stationary on the earth. The second vector is denoted by $\underline{k}$ and is in the direction of the dynamic vertical. This is defined as the direction of the force constraining the test mass to the aircraft when the aircraft is in flight. The third unit vector $\underline{u}_3$ is in the direction of the indicated vertical and is obtained by subjecting the vector $\underline{k}$ to some sort of smoothing process and making corrections for certain systematic effects to be described shortly. It is this direction which is regarded as the best approximation to the true vertical which can be obtained in an aircraft in flight. The vector $\underline{u}_3$ just defined is the same as the unit vector $\underline{u}_3$ which is fixed in the stable element in the direction of $V_1V_2$, since the direction $V_1V_2$ has been regarded as vertical in discussing the geometrical aspects of the stabilization problem.

In the design of a practical vertical reference, the selection of the smoothing process used to obtain the indicated vertical depends nearly as much on the desirability of avoiding electrical and mechanical complexity as it does on a theoretical determination of the most effective smoothing process. It seems likely that the accuracy of the vertical indication that can be obtained is limited largely by the accuracy with which it is possible to apply the corrections for the systematic effects alluded to earlier, so that an extreme refinement of the smoothing process is not justified. The discussion therefore proceeds directly to a description of the methods employed in the stabilization unit.

First, it is assumed that the aircraft is stationary on the surface of the earth so that the dynamic vertical $\underline{k}$ coincides with the true vertical $\underline{h}$. Furthermore, since the ultimate accuracy of the vertical determination depends on the behavior of the system when the indicated vertical is close to the true vertical, it is assumed that the direction of $\underline{u}_3$ is nearly the same as that of $\underline{h}$. The departure of $\underline{u}_3$ from $\underline{h}$ can therefore be represented by a rotation vector $\lambda$ perpendicular to both $\underline{u}_3$ and $\underline{h}$, in the sense that a rotation through the angle $-\lambda$ about an axis coinciding with the direction of $\lambda$ would bring $\underline{u}_3$ into coincidence with $\underline{h}$. Since $\lambda$ is perpendicular to $\underline{u}_3$, it lies in the $\underline{u}_1\underline{u}_2$-plane of the stable element and not only defines the departure of $\underline{u}_3$ from $\underline{h}$ but also defines the departure of the $\underline{u}_1\underline{u}_2$-plane from the horizontal plane normal to $\underline{h}$. Then $\lambda$ can be expressed in the form $\lambda = \lambda_1\underline{u}_1 + \lambda_2\underline{u}_2$. Making use of the vectorial character of small rotations, the $\underline{u}_1\underline{u}_2$-plane can be brought to the horizontal and $\underline{u}_3$ into coincidence with $\underline{h}$ by a rotation of the stable element through angle $-\lambda_1$ about $\underline{u}_1$ and a rotation trough angle $-\lambda_2$ about $\underline{u}_2$. Now, measurements of the force of gravity on a test particle mounted in the stable element would give indications of the values of $\lambda_1$ and $\lambda_2$.

In the preferred form of the stabilization unit, this information is obtained from two liquid levels mounted in the stable element. Each of these levels consists of two closed cells placed several inches apart and joined at the top and bottom by a pair of tubes. Each cell contains a set of parallel plates, with the alternate plates electrically connected to form a condenser. The cells are about half filled with a silicone fluid which acts as the dielectric. As the level tilts, the fluid falls in one cell and rises in the other, thereby changing the capacitance of the condensers. These are connected in a bridge circuit and the resulting unbalance is a measure of the tilt of the level. One of these levels is mounted with its length in the direction of $\underline{u}_1$ from the horizontal i.e., the value of $\lambda_1$. The second level is mounted with its length in the direction of $\underline{u}_1$, and its signal is a measure of $\lambda_2$.

It is clear that the departure of $\underline{u}_3$ from $\underline{h}$ represented by the vector $\lambda$ could be removed exponentially by causing $\underline{u}_3$ to move toward $\underline{h}$ with an angular velocity $-\lambda/T$ proportional to $\lambda$, T being a proportionality factor. Since $\underline{u}_3$ is fixed in the stable element, such an angular velocity could be obtained by causing the whole stable element to rotate with an angular velocity $-\lambda/T$ relative to $\underline{h}$. The action of the internal torque motors of the stable element is such as to produce any desired angular velocity of the stable element and, with values of $\lambda_1$ and $\lambda_2$ available from the levels, it is obvious that the level signals can be connected to the torque motors in such a way as to produce the angular velocity $-\lambda/T$. This procedure would be entirely satisfactory if the earth were not rotating, but is not so in the actual case. The reason for this is that the connection of the levels to the internal torque motors produces an angular velocity $-\lambda/T$ of the stable element with respect to inertial space while, in order to produce an exponential decrease of $\lambda$, the angular velocity should be measured with respect to the rotating earth since the vector $\underline{h}$ rotates with the earth. With the simple connections just described, the effect of the earth's rotation would be to prevent $\underline{u}_3$ from attaining coincidence with $\underline{h}$. With a large initial displacement, $\underline{u}_3$ would approach $\underline{h}$ until the remaining signals from the levels were just sufficient to produce an angular velocity of the stable element equal to the horizontal component of the angular velocity of the earth, and the departure of $\underline{u}_3$ from $\underline{h}$ would then remain constant.

This "stand-off" error is eliminated in the stabilization unit by an indirect connection of the levels to the internal torque motors. Each level signal is integrated, and the integrated value of the level signal is added to the level signal itself. The sum of these two quantities is used as an energizing signal to the internal torque motor. The integration is accomplished by a small motor driven by the level signal, the motor being so designed as to run at a speed proportional to the level signal. The number of revolutions turned through by the motor shaft in any interval of time is therefore a measure of the integral of the level signal over that interval. The motor shaft turns a synchro which acts as a signal generator and produces a voltage proportional to the rotation of the motor shaft. This voltage is added to that obtained directly from the level, and the resulting signal is transmitted to the internal torque motor. The effect of this integrated signal is to remove any consistent departure of $\underline{u}_3$ from $\underline{h}$ such as that caused by the earth's rotation. The integrated signal eventually attains a large enough value that it is able to produce the angular rate necessary to account for the earth's rotation without the necessity of an error signal from the level.

The smoothing properties of this system will be recognized by imagining that the aircraft is subject to random accelerations of such a nature that its average position is fixed with respect to the earth. Under these conditions the dynamic vertical oscillates about the true vertical, while the indicated vertical always approaches the dynamic vertical at a rate proportional to its departure from it. (It is assumed here that the system has been in operation for a sufficient length of time that the integrator signals can produce an angular velocity equal to the horizontal component of the earth's angular velocity.) If T is small, the angular rates of the stable element are large, and the indicated vertical follows the dynamic vertical rather closely. On the other hand, if T is large, the indicated vertical remains close to the average position of the dynamic vertical, i.e., close to the true vertical.

In the stabilization unit, the greater part of the smoothing is brought about by choosing a value of T of about 60 seconds. In addition to this, two other secondary smoothing processes are used. In the first place, the liquid of the levels is rather viscous and contributes a certain amount of smoothing. To improve the characteristics of the system still further, the amplifiers which drive the internal torque motors may be designed to provide additional smoothing.

The effects on the vertical indication of the systematic motions of the aircraft are considered next. In this systematic motions of the aircraft are considered next. In this discussion no explicit mention will be made of the random accelerations, but it is to be understood that their effects are superimposed on those to be described and are eliminated by the smoothing properties of the system in the way already described. As the aircraft moves over the surface of the earth, the direction in space of the indicated vertical must change if it is to remain in coincidence with the true vertical. If the ground speed and course angle of the ground track remained constant for a long period of time, the necessary angular rate of the indicated vertical would be supplied by the integrators in the way already described for the earth's rotation. Since it cannot be assumed that this condition will be satisfied, the angular rate must be supplied in a different way. Let $\underline{v}$ be the ground speed of the aircraft, v its magnitude, and C represent the course angle of its ground track. It will be supposed that values of v and C are available in the aircraft, the possibility of obtaining such values, or approximations to them, being considered later. The required angular rate is then v/R where R is the radius of the earth. This angular rate should take place about a line in the horizontal plane perpendicular to the ground track of the aircraft. The vector representing this angular rate therefore lies in the $\underline{u}_1\underline{u}_2$-plane of the stable element. Up to this point the directional orientation of the stable element has not been considered, but it will be seen later that it is normally to be oriented so that $\underline{u}_1$ is toward the East and $\underline{u}_2$ toward the North. If this is the case, then the components of the angular rate v/R are $-(v/R) \cos C$ about $\underline{u}_1$ and $+(v/R) \sin C$ about $\underline{u}_2$, the course angle being measured from the North toward the East. It has been seen that level signals $\lambda_1$ and $\lambda_2$ produce angular rates $-\lambda_1/T$ about $\underline{u}_1$ and $-\lambda_2/T$ about $\underline{u}_2$. The additional angular rates can therefore be obtained by adding the quantity $+(vT/R) \cos C$ to $\lambda_1$ and the quantity $-(vT/R) \sin C$ to $\lambda_2$. Although these quantities are added to the error signals obtained from the levels, it should be pointed out that the velocity of the aircraft does not cause a departure of the dynamic vertical from the true vertical. The corrections should therefore be regarded not as corrections to the error signals but as corrections to the torque motor signals which are necessary to avoid the error which would otherwise be introduced by the smoothing process.

While the components of the aircraft's ground speed are present in the computer and could be used in making the velocity correction, it is preferred to free the stabilization unit as far as possible from dependence on the computer. For this reason the air speed and heading angle, V and A, are used to compute the velocity correction instead of the ground speed and course angle. FIG. 57 indicates schematically the conections from the levels to the internal torque motors and the introduction of the velocity correction. The components of the velocity correction are generated by $1\phi$—$2\phi$ synchro which receives V as an electrical input and is rotated by the value A of aircraft heading obtained from the stabilization unit. The use of air speed and heading instead of ground speed and course is a better approximation than is at first apparent. The presence of wind results in an incorrect velocity correction, but the resultant error of the indicated vertical is constant as long as the wind vector remains constant. This error is therefore ultimately eliminated by the integration of the level signals.

All of the corrections considered thus far are velocity corrections and are necessary to avoid errors due to the velocity of the aircraft, whether due to its own speed relative to the earth or to the rotation of the earth, which would otherwise be introduced by the smoothing process. In addition to these errors, it is necessary to consider systematic departures of the dynamic vertical from the true vertical as a result of persistent accelerations of the aircraft. Such accelerations result from changes in the ground speed vector and from the Coriolis effect. A change in the ground speed vector may be a change in its direction caused by a turn of the aircraft, or a change in its magnitude caused by a change in the speed of the aircraft. In the design of the stabilization unit the point of view was taken that any change in the ground speed vector which is not of a random nature will produce an acceleration of magnitude greater than some minimum value. Thus, any deliberate turn of the aircraft will be made with a rate of turn exceeding some minimum value. Similarly, any deliberate change in the speed of the aircraft will be large enough to produce some minimum acceleration. The minimum value of acceleration incident to these non-random changes in the ground speed vector was taken to be that value corresponding to a deflection of the dynamic vertical from the true vertical of three degrees. In practice it is necessary to use the indicated vertical instead of the true vertical, so that the limiting value is that equivalent to a level signal of three degrees. The level signals $\lambda_1$ and $\lambda_2$ are combined to give the resultant $\lambda = \sqrt{\lambda_1{}^2 + {}_2{}^2}$ and, when the value of $\lambda$ exceeds that corresponding to a deflection of three degrees, an "erection cut off" relay is operated. This relay substitutes artificial level signals corresponding to zero tilt for the signals actually produced by the levels. It also removes the smoothing produced by the internal torque motor amplifiers, on the assumption that the level signals must have been erroneous for a short interval of time before the critical three degree value was reached. The erection cut off does not affect those components of the torque motor signals which are derived from the integrators, nor the velocity correction depending on air speed and heading, so that errors from these sources are not introduced during erection cut off.

The Coriolis acceleration is one which accompanies any velocity relative to the rotating earth. Its magnitude depends on the speed and latitude of the aircraft and its direction is perpendicular to the ground track, to the left in the Northern hemisphere and to the right in the Southern hemisphere. It is possible to show that the Coriolis deflection of the dynamic vertical in a vertical reference used in a bombing system compensates for a related deflection of the bomb as a result of the earth's rotation. For this reason no correction for the Coriolis deflection is made in the stabilization unit.

To establish the directional orientation of the stable element, the value of magnetic heading obtained from the Flux Valve is corrected by the magnetic variation obtained as described above. If B represents the magnetic heading of the aircraft produced by the Flux Valve and a the magnetic variation, then $D = B + a$ is the geographic heading of the aircraft as derived from the Flux Valve. The geographic heading as obtained from the stable element is $h'_1$, as explained above. The difference between these two values, $\mu = h'_1 - D$, is then the departure of the $\underline{u_2}$ vector of the stable element from the meridian plane determined by the Flux Valve, counted as positive when $\underline{u_2}$ is West of the meridian. The rotational displacement of the stable element from the orientation defined by the Flux Valve can therefore be represented by the vector $\underline{\mu} = \mu \underline{u_3}$. This displacement is removed by using the value of $\mu$ to energize the internal torque motor of gyro $G_3$ in such a way as to produce an angular velocity $-\underline{\mu}/T$ of the stable element, the proportionality factor T having the same value as that used in the vertical orientation of the stable element. While the value of $\mu$ fluctuates rapidly as a result of oscillations of the Flux Valve, the action produced by using a large value of T causes the stable element to assume an orientation for which the average value of $\mu$ is zero, i.e., the fluctuations of the Flux Valve indication of aircraft heading are smoothed out.

In the description of the directional orientation, no mention was made of the earth's rotation. At every point of the earth except on the equator, the direction in space of the North direction is changing, this change taking place with an angular velocity equal to the vertical component of the earth's angular velocity. If $\Omega$ denotes the total angular velocity of the earth, then the vertical component of rotation at latitude $\Phi$ is $(\Omega \sin \Phi) \underline{h}$. Assuming that the vertical orientation of the stable element is correct, this requires that the stable element have an angular velocity $(\Omega \sin \Phi) \underline{u_3}$. With the connections from the Flux Valve to the stable element previously described, this angular rate would have to be supplied by an average value of $\mu$ different from zero. This stand off error is eliminated by generating a signal $T\Omega \sin \Phi$ from a synchro in the Navigation Unit, and this is subtracted from the value of $\mu$, the difference being used as a signal to the internal torque motor. In addition to the changing direction in space of the North direction as a result of the earth's rotation, a similar effect is produced by the motion of the aircraft over the surface of the earth, but the magnitude of this effect is so small that it is not taken into account in the stabilization unit. The connecions of the Flux Valve to the stable element are illustrated schematically in FIG. 58.

Random accelerations of the aircraft cause the Flux Valve to oscillate about a position in which its plane is horizontal so that its average measurement of aircraft heading is correct. A persistent acceleration of the aircraft causes the oscillations to take place about a mean position in which the plane of the Flux Valve is tilted and an incorrect value of aircraft heading is obtained. To avoid the influence of such incorrect values on the orientation of the stable element, the erection cut off relay already described is also arranged to close a circuit which effectively makes $\mu = 0$ when the value of $\lambda$ exceeds three degrees. The earth rate signal remains effective during such times.

This section is concluded with some remarks on the differences between the form of three gyro stable elements just described and the form as actually used in the stabilization unit. From the explanation given, it is clear that gyro $G_1$ (FIG. 54) would resist torques about $\underline{u_1}$ equally well if its pivot axis were parallel to $\underline{u_3}$ and its spin axis normally in the direction of $\underline{u_2}$. The effect of its pivot axis torque motor in producing an angular velocity of the stable element about $\underline{u_1}$ would be unchanged. In the actual stabilization unit, gyro $G_1$ has this new position, while the position of $G_2$ is that described earlier, these being referred to as the horizon gyros. The position of the directional gyro $G_3$ is also slightly different from that described, its pivot axis being perpendicular to $\underline{u_3}$ and forming equal angles with $\underline{u_1}$ and $\underline{u_2}$. With this arrangement the spin axes of all three gyros are normally horizontal, the spin axes of the two horizon gyros being perpendicular to each other with the spin axis of the directional gyro bisecting the angle between them.

Although the foregoing describes the preferred form of stable element to be used in the stabilization unit, the ssytem will function equally well if used in conjuction with the stable element described in either of the copending applications S.N. 680,353, filed June 29, 1946, in the name of Willis G. Wing, now Patent 2,631,455, dated March 17, 1953, or S.N. 693,055, filed August 26, 1946, in the name of Robert F. Hays, Jr., now Patent 2,591,697, dated April 8, 1952.

COMPUTER COMPONENTS

In the previous sections the operation of the system was explained as a combination of certain more elementary operations. The purpose of this section is to explain the functioning of the mechanical or electrical components by which these elementary operations are realized. The choice of topics treated is somewhat arbitrary, although the object is to describe these components for which adequate explanations are not readily accessible elsewhere. The functions and manner of operation of such devices as mechanical differentials, three-dimensional cams, mechanical multipliers, Ford type variable speed drives, limit stops, slip clutches, etc., are considered so well known that they do not require discussion herein. Magnetic clutches of the type that may be used in the tracking computer and polar converter are disclosed in more detail in copending applications S.N. 719,276, filed December 30, 1946, and S.N. 728,540, filed February 14, 1947, in the names of Robert F. Garbarini and Robert S. Edwards, now U.S. Patent Nos. 2,514,385, dated July 11, 1950 and 2,490,044, dated December 6, 1949, respectively.

MECHANICAL COMPONENT RESOLVER

A component resolver is a device for forming the rectangular coordinates $x = r \cos \theta$ and $y = r \sin \theta$ from the given values of polar coordinates $r$ and $\theta$, the geometrical relationships being illustrated in FIG. 67. To realize these relationships mechanically, the point P is represented by a pin which is moveable with respect to the base of the resolver. This pin is carried on a radial arm which is positioned in rotation by the $\theta$ input to the resolver. The radial position of the pin is determined by the $r$ input to the resolver. The rectangular coordinates of the pin are converted into mechanical translations by means of sliding members which carry slotted arms embracing the pin (see FIG. 68). The translational representations of x and y may, of course, be converted into rotations by racks on the sliding members which engage pinions on the x and y output shafts. FIG. 69 shows the mechanism which positions the pin according to the polar coordinates $r$ and $\theta$. The arm is positioned according to the value of $\theta$ by rotating a shaft to which the arm is attached. A concentric shaft carries a pinion at its upper end, the pinion engaging a rack which translates the pin along the radial arm. It is evident from the figure that the radial position of the pin is determined by the rotational position of the pinion relative to the arm, rather than its position relative to the base of the resolver. Since it is desirable that the r input to the resolver be measured by a rotation relative to the base, it is necessary to use a compensating differential between the r input and the pinion rotation to remove the effect of a change in $\theta$, as illustrated in FIG. 70. A device of this type is used in tracking computer 70 to resolve the polar coordinate values of true air speed V and aircraft heading A into the corresponding rectangular coordinates $V_E$ and $V_N$.

It is frequently necessary to perform the operation inverse to that described, i.e., to convert rectangular coordinates to polar coordinates. A mechanism for performing this operation is called a polar converter. If the value of $\sqrt{x^2+y^2}$ always exceeds a certain non-zero minimum value, it is possible to use a component resolver as a polar converter simply by causing the x and y members to move in the required manner and using the r and $\theta$ shafts as outputs. When $r=\sqrt{x^2+y^2}$ is small, however, any component of motion of P perpendicular to the radial arm causes a large change in $\theta$, so that the slightest resistance to the $\theta$ motion causes extremely large forces on the pin. For this reason there is some value of r below which the deflections of the various members would lead to excessive errors in the outputs. To avoid this restriction, an indirect method of driving the component resolver is employed. The explanation of this method is deferred until servo systems and synchros are described.

SYNCHROS

In the system, a number of different types of synchros are employed for performing certain mathematical operations and for converting numerical data from mechanical to electrical form. Every type of synchro consists of a stator magnetic structure wound with one or more windings and a rotor structure likewise containing one or more windings. The rotor is carried in bearings and is provided with a shaft by means of which it can be rotated relative to the stator, the whole appearance and construction of a synchro resembling that of a small motor. The electrical connections to the rotor windings are made through slip rings or, in applications not requiring continuous rotation, through flexible leads.

$1\phi - 1\phi$ Synchro

The simplest type of synchro is that in which the stator and rotor each have a single winding. If the rotor winding of such a synchro is excited from an A.-C. source, an alternating magnetic field is set up within the rotor having a fixed direction with respect to it. This magnetic field also passes through the stator structure, but its direction with respect to the stator depends on the angular position of the rotor. The alternating magnetic field in the stator induces a voltage in the stator winding, and this voltage (or the current produced by it in an external circuit) constitutes the output of the synchro. For the purposes of this description, it can be assumed that each winding of a synchro consists of a coil whose axis is perpendicular to the axis of rotation of the rotor, that the magnetic field produced by exciting any winding has a direction parallel to the axis of that winding, and that at any instant this magnetic field is constant in magnitude and direction at all points occupied by any other winding of the synchro. The electrical and magnetic design of a synchro is a problem of satisfying these requirements as nearly as possible.

With these assumptions, the magnetic field of the rotor winding in the simple synchro now being described has a direction forming an angle $\theta$ with the axis of the stator winding, the angle $\theta$ being counted as zero when the rotor has such a position that the axes of the rotor and stator windings have the same direction. The component of this field in the direction of the axis of the stator winding is proportional to $\cos \theta$, and the voltage induced in the stator winding is likewise proportional to $\cos \theta$. Furthermore, the magnitude of the magnetic field is proportional to the exciting voltage. As a result the output voltage of the synchro has a magnitude proportional to $E \cos \theta$, where E is the magnitude of the exciting voltage. By employing a suitable number of turns in the two windings, any desired factor of proportionality can be obtained. For most purposes it is satisfactory to suppose that the number of turns is so chosen that this factor has the value one. The functioning of such a synchro is indicated by the diagram of FIG. 71, where the tilted coil represents the rotor winding and the other coil the stator winding, the angle between their axes being $\theta$. It should be emphasized that E represents the amplitude or peak value of the alternating exciting voltage so that the instantaneous value of the exciting voltage is $E \sin \omega t$, where $\omega = 2\pi f$ is the radian frequency of the exciting voltage. Similarly, the instantaneous value of the output voltage is $E \sin \omega t \cos \theta$. If $\theta$ has such a value that $\cos \theta$ is negative, then the phase of the output voltage is opposite to that of the exciting voltage. Thus, the synchro output can be fully utilized only by some sort of phase sensitive device which must also employ the exciting voltage as a reference for the detection of phase reversal. A synchro of this type is referred to as a $1\phi - 1\phi$ (read "one phase to one phase") synchro and, in the drawings, is represented by the symbol of FIG. 72.

It is evident that, by counting the shaft rotation from one of the two positions in which the axes of the rotor and stator windings are perpendicular instead of parallel, the output voltage of a 1φ—1φ synchro may equally well be expressed in the form E sin θ. For small values of θ, sin θ is nearly equal to the radian measure of the angle θ, and the synchro output may be written as Eθ. In many applications in the system, 1φ—1φ synchros are used as error signal generators. In these applications the error signal developed by the synchro acts in such a way that the synchro shaft is rotated in a direction to reduce the magnitude of the error signal. In these cases it is satisfactory to suppose that the output of synchro is Eθ. An example of this is the 1φ—1φ synchros which are used to detect the departures of the three gyro axes from their normal positions in the stable element of the stabilization unit. By an appropriate distribution of the windings of a 1φ—1φ synchro, it is possible to make the output equal to Eθ even for rather large values of θ. Such a "linear" synchro is used in the system to generate a voltage proportional to true air speed for use in making the air speed correction to the vertical reference.

1φ—2φ Synchro

From the foregoing, it is apparent that a 1φ—1φ synchro can develop a voltage E cos θ or E sin θ. By using two windings on the stator with their axes perpendicular to each other, it is possible to obtain both of these outputs from a single synchro. Such a 1φ—2φ synchro is illustrated in FIGS. 73 and 74. In a mathematical sense, this synchro is exactly equivalent to the mechanical component resolver already described. In the system, such synchros are employed where the resolution need not be performed with a high degree of accuracy. Thus, the voltage proportional to true air speed, which is generated by a 1φ—1φ linear synchro, is used as the input to a 1φ—2φ synchro whose shaft is rotated in aircraft heading, and voltages proportional to the East and North components of true air speed are obtained for making corrections to the vertical reference.

The terms "two phase" and "three phase" used in describing synchros should not be confused with the corresponding terms applied to motors. The stator of a two phase motor carries two windings whose axes are perpendicular to each other, as in the case of a 1φ—2φ synchro, but in the motor the currents in the two windings differ in phase by 90 degrees. In synchros, however, the currents and voltages involved all have the same phase angle, or phase angles differing by 180 degrees in the case of phase reversals. Thus, a 1φ—2φ synchro may be more accurately described by the term "one winding to two winding" instead of "one phase to two phase." However, since the latter terminology is commonly accepted, it is used herein.

2φ—2φ Synchro

Another common type of synchro is the 2φ—2φ synchro illustrated in FIGS. 75 and 76. In this case the rotor also has two perpendicular windings which are separately excited by voltages $E_1$ and $E_2$. Each rotor winding induces a voltage in both of the stator windings just as though the other rotor winding were not present, and the total voltage induced in each stator winding is the sum of the voltages induced by the two rotor windings, the resulting voltages being those indicated. If $\underline{E} = E_1 \underline{u}_1 + E_2 \underline{u}_2$ represents a vector whose components along perpendicular unit vectors $\underline{u}_1$ and $\underline{u}_2$ are $E_1$ and $E_2$, then the components of $\underline{E}$ along perpendicular unit vectors $\underline{v}_1$ and $\underline{v}_2$ forming an angle θ with $\underline{u}_1$ and $\underline{u}_2$ are $E_1 \sin θ + E_2 \cos θ$ and $E_1 \cos θ - E_2 \sin θ$, so that $\underline{E} = (E_1 \sin θ + E_2 \cos θ)\underline{v}_1 + (E_1 \cos θ - E_2 \sin θ)\underline{v}_2$.

A 2φ—2φ synchro therefore provides a convenient method of finding two perpendicular components of a vector when two other perpendicular components are given, and several examples of this application are given in the earlier sections. A 2φ—2φ synchro is usually called a "resolver," although this term would more appropriately be reserved for a 1φ—2φ synchro. A 2φ—2φ synchro might properly be called a "vector transformer." In this description it has been implied that a 1φ—1φ synchro, for example, always contains only one winding on the rotor and one on the stator. In practice, however, it is common to use a 2φ—2φ synchro as either a 1φ—2φ or 1φ—1φ synchro by leaving one or two of the windings unconnected.

1φ—3φ Synchro

The synchros described up to this point are used, for the most part, to perform certain elementary mathematical operations. A more familiar type of synchro is that which is used to convert a shaft rotation into electrical signals which, in some way, represent the position of the shaft and can be easily transmitted to a remote location. The electrical schematic of the 1φ—3φ synchro used for this purpose is indicated in FIG. 77. FIG. 78 is a symbol that may be employed to represent a 1φ—3φ synchro when it is necessary only to indicate its function of converting a shaft rotation into a set of electrical signals which indicate the position of the shaft. The amplitude of the exciting voltage is unimportant in this case, and the excitation voltage is indicated only by its frequency, usually 400 cycles per second.

The methods employed in explaining the other types of synchros would show that the voltages between any two pairs of the three output wires define the angular position of the rotor uniquely. While it is not necessary to know the amplitude of E to make this determination, it is necessary to know the algebraic signs of the output voltages or, more accurately, to know whether the voltages are of the same or opposite phase as the exciting voltage. This requires that a reference signal having a known phase relationship to the exciting voltage be available in making the voltage measurements. In practice, however, the determination of θ at the receiving location is made by employing a 1φ—3φ receiving synchro, instead of through the use of voltage measurements. If the three stator leads of the transmitting synchro of FIG. 77 are connected to the corresponding stator leads of the receiving synchro, the voltages induced in the transmitter windings cause currents to flow in the stator windings of the receiving synchro, setting up a magnetic field within the magnetic structure of the stator. This field has the same direction relative to the stator windings that the field set up in the transmitting synchro by the excited rotor winding has relative to the stator windings of that synchro, and therefore specifies at the receiving location the value of the angle θ.

Two methods are available for converting this magnetic field representation of the angle θ into a shaft rotation. In both methods the rotor of the receiving synchro contains a single winding, i.e., the receiver is a 1φ—3φ synchro. In the first method the rotor winding is excited from the same source as the rotor winding of the transmitting synchro. The rotor then has its own magnetic field, and the mutual influence of the magnetic field of the stator and that of the rotor develops a torque on the rotor. If the rotor is free to turn, it therefore aligns itself with the field of the stator and, hence, with the rotor of the transmitting synchro. With this connection of transmitter and receiver, the two synchros are symmetrically related, and any torque developed by the receiver must be supplied by the transmitter. Unless very large synchros are employed, the torque developed at the receiver is not very great, and it is possible to use this system only if the load on the receiver is small. Two applications of this method in the system are the transmission of turn and time-to-go indications from the computer to the pilot's data indicator.

A more frequent method of converting the magnetic field indication of the angle into a shaft rotation is to use the rotor winding of the receiving synchro simply as a detector of the direction of the magnetic field. For this purpose the rotor winding of the receiving synchro is not excited. The magnetic field then induces a voltage in the rotor winding, the amplitude of this voltage depending on the angular position of the rotor. When the axis of the rotor winding is perpendicular to the magnetic field, the induced voltage is zero, and displacements from this position result in a voltage amplitude proportional to the sine of the displacement angle. There are two positions in which the rotor winding is perpendicular to the magnetic field, but these can be distinguished by using the exciting voltage of the transmitter as a reference for the measurement of the voltage induced in the receiver rotor. By observing this voltage and rotating the receiver synchro rotor by some external means until the voltage is reduced to zero, the receiver rotor is brought to a position perpendicular to the transmitter rotor. It is, of course, necessary to take account of this 90 degree difference in position in setting up the data transmission system. In practice the voltage developed by the receiver rotor is used as an error signal to control a servo motor geared to the shaft of the receiver rotor, and the rotation of the motor reduces the error signal to zero. The receiver rotor is then never permitted to depart greatly from the position of zero voltage, and the error signal can be assumed to be proportional to the angle of departure.

FINE AND COARSE SYNCHROS

The accuracy of a synchro data transmission system is limited by the tolerances in the mechanical and magnetic structure of the synchros and by the uniformity of their windings. It is difficult to reduce the error between transmitter and receiver below approximately one-half degree, although some improvement is possible by selecting pairs of synchros to operate together as transmitter and receiver. In most applications in this system, greater accuracy than this is necessary and is obtained by the use of a "fine and coarse" or "two speed" data transmission system. The shaft whose rotational position is to be transmitted to a remote location is connected directly to a transmitting synchro in the manner already described, and the receiving synchro is likewise connected directly to the remote shaft, these being the "coarse" synchros. In addition, a second "fine" transmitting synchro is used and is geared to the transmitting shaft at such a ratio that it turns through a large number of revolutions while the coarse synchro turns through a single revolution. At the receiving location a fine receiver is also employed which is geared to the coarse receiver through the same ratio used at the transmitters. The error signal developed by the coarse receiver is first reduced nearly to zero, bringing the remote shaft approximately to its proper position, and the error signal developed by the fine receiver is then used for the final positioning.

In practice it is possible to combine the coarse and fine error signals through the use of voltage limiters in such a way that a single error signal is obtained. This composite error signal has the property of passing through zero only twice during an entire revolution of the transmitting shaft, as is the case of an error signal from a transmission system employing only one synchro at each end, and has the additional property of rapidly passing through zero with changes of shaft position as is the case with a fine transmission system. The half degree error normally encountered when a "single speed" transmission system is used can be divided by a factor equal to the fine to coarse speed ratio when fine and coarse synchros are used. In the system the ratios used are 15, 27, and 45. An odd ratio makes it easier to distinguish between the two positions, 180 degrees apart, at which the error signal goes to zero than does an even ratio. It is desirable to use the lowest ratio commensurate with the desired accuracy of transmission because a higher ratio requires a more critical adjustment of the circuits used for combining the fine and coarse error signals.

$3\phi$—$3\phi$ Synchro

Another type of synchro is the differential or $3\phi$—$3\phi$ synchro. In this type, both rotor and stator are wound with three windings, as indicated in FIG. 79. When the three stator windings of such a synchro are connected to the corresponding windings of a transmitter, a magnetic field is set up within the stator magnetic structure of the differential synchro, the direction of which is determined by the angle $\theta_1$ of the transmitter rotor. This field is, in all respects, similar to the field established by the single rotor winding of the usual $1\phi$—$3\phi$ synchro. Hence, by displacing the three rotor windings from the three stator windings through an angle $\theta_2$, an electrical output is obtained which represents the angle $\theta_1+\theta_2$. When it is desired to add an angle $\theta_2$ to an angle $\theta_1$ which has been represented electrically by fine and coarse transmitters, it is possible to use fine and coarse differential synchros to introduce the additional angle $\theta_2$. An application of this procedure in the system is the introduction of the offset distances into the computer. By switching the differential synchros out of the electrical circuits the offset distances can be removed without setting the differential synchros to zero. In schematics involving the operation of addition, it is usually satisfactory to represent a differential synchro by the same symbol that is used for a mechanical differential. In cases where it is desired to call attention to the fact that the addition is performed by a differential synchro, the symbol of FIG. 80 is used.

THE FLUX VALVE

The internal construction of the Flux Valve is indicated in FIG. 81. The magnetic structure consists of two three-legged members joined together at their centers by a cylinder which carries the exciting winding. The pick-off coils are wound around both the upper and lower of a pair of legs and are connected together at their centers, the output signals being obtained from the three remaining leads. The magnetic material of the Flux Valve is one for which the magnetic flux density increases less rapidly with magnetizing force at high flux densities than at low flux densities. This effect is preferred even at the low flux densities produced by the earth's magnetic field.

Suppose first that the Flux Valve is not exposed to any external field and that the central winding is excited from a 400 cycle source. FIG. 82 illustrates one pair of legs, the exciting winding, and the pickoff winding. With current flowing in the exciting winding, magnetic flux passes through the core of the exciting winding, out through the pickoff winding in one leg, and back through the same pickoff winding in the other leg. The magnetic flux in the upper leg is denoted by $F_1$, which is positive when directed outward, and the flux in the lower leg by $F_2$, which is positive when directed inward. The current in the exciting winding is denoted by I and is positive when it tends to make $F_1$ positive. FIG. 83($a$) illustrates one cycle of the exciting current, FIG. 83($b$) the flux $F_1$, and FIG. 83($c$) the flux $F_2$. The curves representing $F_1$ and $F_2$ are less peaked than that of the current I because of the non-linear characteristic of the magnetic material. The total flux in the outward direction through the pickoff winding is $F_1-F_2$ and is zero, as indicated in FIG. 83($d$). The voltage induced in the pickoff winding is proportional to the rate of change of the total flux and is likewise zero, as indicated in FIG. 83($e$).

Suppose next that the earth's magnetic field is directed outward along the pair of legs under consideration. For this case the diagrams of FIG. 84 illustrate the current, fluxes, and voltages corresponding to those of FIG. 83. In Diagrams $b$ and $c$ of FIG. 84, the broken lines represent the flux through the two legs produced by the earth's field. During the first half cycle, the outward flux in the upper leg is only slightly increased by the magnetizing current, due to the non-linear characteristic of the magnetic material. At the same time the inward flux is increased much more because the effect of the magnetizing current is to neutralize the initial flux caused by the earth's field and to reduce the total flux to such an extent that the magnetizing current is more effective in producing flux in the material. On the second half of the cycle, this situation is reversed. Diagram $d$ shows the difference $F_1-F_2$, which is the total flux threading the winding, and Diagram $e$ shows the induced voltage in the pickoff winding. It is evident that this voltage has a frequency of 800 cycles which is twice that of the magnetizing current and, while the induced voltage is not sinusoidal, it nevertheless contains an 800 cycle sine wave component.

In this description it was assumed that the earth's field is directed outward along the pair of legs being considered. It is clear that, if the earth's field is directed inward, the induced voltage would be similar to that just described but of the opposite phase. Another way of describing this situation is to state that, when the earth's field is directed inward, the amplitude of the induced voltage is minus 1 times its amplitude when the field is directed outward. Now, by proper design of the magnetic structure of the Flux Valve, it is possible to achieve an arrangement that, when the horizontal component of the earth's field forms any angle B with the pair of legs being considered, the amplitude of the 800 cycle component of the induced voltage is cos B times its value when the field is directed outward along these legs. This possibility is evidently consistent with the previous statement regarding the phase reversal when B=180°. When the three pickoff windings are connected together as in FIG. 81 and the output voltages considered, it is clear that the Flux Valve produces exactly the same output voltages as would be obtained from a 1$\phi$—3$\phi$ transmitting synchro excited from an 800 cycle source. The axis of the rotor winding in this hypothetical synchro would form an angle B with a chosen one of the axes of the three stator windings. This chosen angle would be equal to the angle B in the Flux Valve as measured between the horizontal component of the earth's field and the axis of a particular one of the three pickoff windings. The electrical output of the Flux Valve could then be converted into a shaft rotation by a receiving synchro in the manner already described, although the reference voltage at the receiver must have a frequency of 800 cycles while the Flux Valve is excited from a 400 cycle source.

The method of utilizing the Flux Valve signal in the stabilization unit is next considered. Referring to FIG. 58, suppose that the magnetic variation $\alpha$ equals zero. The differential at which the difference $\mu=h'_1-D$ is formed is in actuality a 1$\phi$—3$\phi$ receiving synchro. The Flux Valve outputs are connected to the stator windings of this synchro, and the rotor is rotated according to the value of $h'_1$ obtained from the stabilization unit. For small values of $h'_1-D$, the voltage induced in the rotor winding is then an 800 cycle voltage whose amplitude is proportional to the difference $\mu=h'_1-D$. To account for the magnetic variation, the stator structure of the synchro is rotated through an angle $\alpha$ from its normal position by a servo which receives an electrical signal representing the value of $\alpha$ from the Navigation Unit, this rotation of the stator being mathematically equivalent to the differential of FIG. 58 at which $\alpha$ is introduced. The 800 cycle voltage representing the value of $\mu$ is to be combined with a signal representing the value of $T\Omega \sin \Phi$, and the difference $\mu-T\Omega \sin \Phi$ is to be transmitted to the internal torque motor of the directional gyro. This torque motor requires a 400 cycle signal, and the signal $T\Omega \sin \Phi$ is also most easily obtained as a 400 cycle voltage. It is then natural to convert the 800 cycle representation of $\mu$ into a 400 cycle voltage proportional to $\mu$, and this can be combined with $T\Omega \sin \Phi$ through a series combination of the two voltages.

The most obvious way of performing this conversion is to demodulate the 800 cycle signal through the use of an 800 cycle reference voltage and to use the resulting direct voltage to modulate a 400 cycle carrier. This can be achieved more directly, however, with the circuit shown in FIG. 85. The action of this circuit can be explained most easily by describing it as a double pole double throw reversing switch which is operated by a 400 cycle reference voltage, as indicated schematically in FIG. 86. In this illustration the switch is supposed to be to the left during the half cycle when A is negative with respect to B, the change from one position to the other taking place at the instant that the 400 cycle reference voltage passes through zero. In FIG. 87 ($a$) represents an 800 cycle input voltage to the circuit, ($b$) the 400 cycle reference, and ($c$) the output of the reversing switch. The output is exactly the same as the input when the reference voltage is positive and is the negative of the input when the reference voltage is negative. The frequency of ($c$) is evidently 400 cycles, and Diagram ($d$) illustrates the 400 cycle component of ($c$) which could be obtained by filtering. FIG. 88 represents the corresponding voltages when the 800 cycle input has the opposite phase to that in FIG. 87. The 400 cycle outputs in the two cases have opposite phases, as is required in the present application.

In the circuit actually used, the switching operations are brought about by causing certain vacuum tubes to be in a conducting or non-conducting state, in response to the 400 cycle reference voltage. Referring to FIG. 85, during the half cycle of the reference voltage when the plate of diode A is positive the cathode of diode B is negative, and a circulating current flows through the loop formed by the transformer secondary, resistors $R_2$ and diodes A and B. Because of the symmetry of this circuit this action effectively connects the grid of triode E to ground. During this same half cycle the cathode of diode C is positive and the plate of diode D is negative. The diodes are thus blocked and the grid of triode F is allowed to assume the potential of the input.

During the next half cycle of the reference voltage the relative potentials are reversed and the grid of triode F is grounded. Triode E is simultaneously allowed to assume the input potential.

By the use of a large common cathode resistor the triodes act together as a summing and phase inverting circuit and as a result of the effective shifting of the signal voltage from one triode to the other every half cycle of the reference (or on alternate cycles of the signal), a voltage output appears on the plates of the triodes in which alternate cycles of the signal are phase inverted. This voltage contains a fundamental frequency which is one-half of the input signal frequency, or 400 cycles.

SERVOS

Most of the servos in the system are used for reproducing at a remote location a shaft rotation which is developed in some other part of the system. Usually the transmitting shaft is capable of supplying only a small torque while the receiving shaft might be required to supply a large torque to the mechanism which it drives. In many applications of servo mechanisms, this torque amplification is all that is required of the servo. The present description applies equally well whether the servo is used merely as a torque amplifier or whether this amplification is combined with the function of remote transmission of data. In either case the input to the servo consists of a certain angle $\theta$ which may be represented by a shaft rotation or by a set of electrical signals developed by a data transmission system. The output of the servo consists of a shaft rotation $\phi$, and the servo system functions to bring about and maintain the equality $\phi=\theta$, regardless of the motion of $\theta$ or the loads imposed on the $\phi$ motion.

FIG. 89 illustrates the fundamental components of a servo system. The output $\phi$ of the servo is subtracted from the input $\theta$, and the resultant error $\epsilon = \theta - \phi$ is a measure of the departure of the output shaft from its desired position. In most of the servos in the system, the input $\theta$ is a set of electrical signals obtained from a $1\phi$—$3\phi$ transmitting synchro. The output shaft is directly connected to a $1\phi$—$3\phi$ receiving synchro. If the output shaft does not depart greatly from its proper position, then it is apparent that the signal produced by the receiving synchro is nearly proportional to the error in the position of the receiving synchro. In such a data transmission system, the receiving synchro is therefore represented by a differential.

In other servo systems the input is a shaft rotation. In such cases the error signal is usually developed by some type of pickoff which produces a voltage proportional to the angular displacement between the two members and consisting of two members, one rotating with the input shaft and the other rotating with the output shaft. In any case the error signal operates through an amplifier energizing the motor which drives the output shaft and causing it to turn in such direction as to reduce the value of $\epsilon$. It should be stated at once that no servo can be perfect under all conditions of operation, since perfect operation would imply that $\epsilon = 0$ at all times.

The performance of a servo depends largely on the motor and amplifier characteristics which determine the relationships between the error signal $\epsilon$ and the output $\phi$. It is true that the output is not a function of $\epsilon$ alone, since $\epsilon$ also depends on the output load, but in most cases the performance of the servo does not depend greatly on reasonable variations in the output load. In principle, one of the simplest types of servos is that in which the rate of change of $\phi$ is proportional to the value of $\epsilon$. Suppose that in such a servo the input shaft $\theta$ remains in a fixed position and that the value of the output $\phi$ is initially different from $\theta$. Then, the relationship described between $\epsilon = \theta - \phi$ and $\phi$ causes $\phi$ to approach $\theta$ at a rate which is proportional to its instantaneous departure from $\theta$. Thus, the rate is high initially and becomes smaller as the error decreases. In theory, an exact coincidence between the values of $\phi$ and $\theta$ is never attained, but in practice it is usually possible to make the rate of change of $\phi$, for a given error $\epsilon$, so large that $\phi$ and $\theta$ are substantially equal after only a short interval of time. If $\theta$, instead of remaining constant, is changing at a constant rate, then the error $\epsilon$ will increase until the corresponding rate of change of $\phi$ is just equal to the rate of change of $\theta$, and the value of $\phi$ will thereafter differ from the value of $\theta$ by a constant amount. The greater the rate of change of $\theta$, the greater must be the error between $\phi$ and $\theta$ in order that the rate of change of $\phi$ may be equal to that of $\theta$. The value of $\epsilon$, when this condition is reached, is evidently proportional to the rate of change of $\theta$. Such a servo is sometimes referred to as a "rate lag" servo, the lag of the output behind the input being proportional to the rate of the input. In spite of this lag, such servos are nevertheless useful in applications where the input changes slowly, or in cases where the input is nearly constant most of the time and changes occasionally from one constant value to another at a rapid rate, providing that an error in $\phi$ can be tolerated during such transitions.

Although the rate lag servo is simple in theory and satisfactory in some applications, it is a matter of considerable difficulty to obtain an amplifier-motor combination which produces the proportionality between $\epsilon$ and the rate of change of $\phi$ required for this type of servo. Most electric motors develop a torque which is at least approximately proportional to the signal which energizes them, rather than a speed proportional to the signal. In most small servos the output load is largely due to the inertia of the parts which the servo must drive. The greater part of this inertia is generally that of the motor armature itself. If the motor torque is proportional to the error signal, then the acceleration of the output is also proportional to the error signal. Considering again the case when $\theta$ is constant and $\phi$ is initially different from $\theta$, $\phi$ approaches $\theta$ with an acceleration which is proportional to its instantaneous departure from it. As long as $\phi$ is smaller than $\theta$, for example, the acceleration of $\phi$ is positive and $\phi$ approaches $\theta$ with increasing speed. When $\phi$ equals $\theta$, the sign of $\epsilon$ changes, the sign of the acceleration of $\phi$ changes, and the speed starts to decrease. It is therefore evident that such a servo invariably overshoots the desired condition, $\phi = \theta$. The oscillation of $\phi$ about $\theta$ is, in fact, similar to the oscillation of a pendulum about its neutral position and arises from the same cause, the acceleration in both cases being proportional to the displacement.

The overshooting, or hunting, described here is not present in the rate lag servo previously described, since in that case the output rate, rather than its acceleration, decreases as the value of $\phi$ approaches that of $\theta$. Before the servo described here can be of practical use, it is necessary to modify it in such a way as to prevent overshooting, at least to the extent that successive overshoots become smaller. Before describing how this is accomplished, it is desirable to point out that a servo in which the output acceleration is proportional to the error is free from the rate lag error described previously. If the value of $\theta$ were increasing at a constant rate and if the value of $\phi$ could once be made equal to $\theta$ and with the same rate of change as $\theta$, then $\phi$ would remain equal to $\theta$, since the equality of $\phi$ and $\theta$ would result in a zero error signal and the output would therefore have zero acceleration, whence its velocity would remain constant and the equality $\phi = \theta$ would be maintained.

The analogy between this type of servo and a pendulum immediately suggests that the oscillations of the servo could be suppressed by the application of viscous damping to its output shaft, just as the oscillation of the pendulum can be suppressed by suspending it in a viscous liquid. Such a damping device for the servo might consist of a disk on the output shaft which was surrounded by a viscous liquid in a fixed container. The action of such a damper would be to apply to the output shaft a torque proportional to the speed of the shaft and in a sense opposed to its motion. In most servos this result is achieved indirectly by connecting to the output shaft a generator or tachometer which develops a voltage proportional to its speed of rotation. This generator voltage is subtracted from the error signal $\epsilon = \theta - \phi$, and the difference is applied to the amplifier which drives the servo motor. The torque developed by the motor is therefore decreased by an amount proportional to its speed, the result being the same as if the motor were allowed to exert the full torque proportional to the error signal and a part of this torque were nullified by a damping device. This electrical method of damping a servo has the advantage that the power of the motor is not dissipated as in a damper, plus the fact that a smaller motor can be used.

Both the damper and its electrical equivalent, however, reintroduce the rate lag. To realize that this is the case, suppose that $\theta$ is changing at a constant rate. Then, if $\phi$ is changing at the same rate, a damping signal proportional to this rate is present. If the output rate is to remain constant in the presence of this damping signal, it can do so only if the damping signal is opposed by an equal value of $\epsilon = \theta - \phi$, which implies a persistent discrepancy between the values of $\phi$ and $\theta$. The value of the error signal which is required to oppose the damping signal is proportional to the rate of the output, which is equal to the rate of the input in the case considered here. This is precisely the rate lag present in the simple rate lag servo.

By modifying the method of combining the tachometer signal and the error signal, it is possible to eliminate the rate lag described above while retaining the damping action. This is accomplished by applying the tachometer voltage to a resistor-condenser combination which has the property of passing rapid changes in the tachometer voltage and suppressing slow changes. The output of this circuit is then subtracted from the error signal instead of subtracting the tachometer voltage directly. The free oscillations of an undamped servo are ordinarily of a rather high frequency, several cycles per second, and the constants of the auxiliary circuit are chosen so that the voltage developed by the tachometer in the course of these oscillations is passed almost without modification. The action of the damping voltage in suppressing the oscillations is the same as that already described. In the situation described previously, however, in which the value of $\theta$ is changing at a constant rate, the tachometer voltage will be greatly attenuated by the auxiliary circuit, the error signal will not be reduced to such an extent, and the output speed will increase to reduce the value of $\epsilon$. A state will finally be reached for which $\phi$ and $\theta$ are constantly equal. The tachometer voltage, being constant, will be completely suppressed by the circuit, and therefore $\epsilon$ can be zero.

The purpose of the previous explanation was to show how the use of an input tachometer could, in theory, remove the rate lag caused by an output tachometer. The same effect can be obtained without the need of either input or output tachometers. The combined signal from the two tachometers would be proportional to $$d\phi/dt - d\theta/dt$$

However, since $\epsilon$ equals $\theta-\phi$, $d\epsilon/dt$ equals $d\theta/dt-d\phi/dt$. A signal proportional to $d\phi/dt-d\theta/dt$ can therefore be obtained by differentiating the error signal $\epsilon$ and changing the sign of the derivative. This signal is subtracted from the error signal itself or, more directly, the derivative of the error signal is added to the error signal. This is the procedure actually employed instead of using an input tachometer.

The principal methods of damping a servo are therefore the use of an output tachometer, whose voltage may be passed through an auxiliary circuit to eliminate rate lag, or the use of the derivative of the error signal as well as the error signal itself. The selection of the methods used in a particular application depends on a number of factors which are not considered here.

This brief explanation of servo mechanisms is concluded with some remarks concerning the servo components used in the system. The servo motors are of two types. The field control motor resembles a conventional D.-C. motor, except that the field winding is center tapped, and the armature is constantly energized from a D.-C. source of current. The two halves of the field winding are connected in the two plate circuits of a push-pull amplifier output stage. When no signal is impressed on the amplifier, the two plate currents in the output tubes are equal and their magnetic effects in the motor field are equal and opposite. The total external magnetic flux through the armature is then zero, and the motor develops no torque. An amplifier input of one sign or the other unbalances the two plate currents and produces through the motor armature a net magnetic flux, thereby developing torque in one direction or the other depending on the direction of the net magnetic flux.

The second type of servo motor is a two phase alternating current induction motor. The field of this motor has two windings whose axes are separated by 90 degrees, as in the case of a "two phase" synchro winding. One of these windings is constantly excited by a 400 cycle current. When the second winding is unexcited, this "fixed" field produces an alternating magnetic flux through the motor armature which, however, has no tendency to produce rotation. The second or "control" winding, is connected to a transformer in the plate circuit of an amplifier. A 400 cycle current through the control winding which was in phase with the fixed field would only change the direction of the alternating field, and no torque would be developed. The amplifier is so designed, however, that, when a signal is applied to the amplifier, the current through the control field is 90 degrees out of phase with the current in the fixed field. This produces a rotating, instead of an alternating, magnetic field and the eddy currents induced in the armature by this rotating field react with the field in such a way as to produce a torque on the armature. The direction of this torque depends on whether the control current lags or leads the current of the fixed field, and this in turn depends on the phase of the signal received by the amplifier.

The servos in the system employing this two phase induction motor are damped by the use of the derivative of the error signal. The error signal is an alternating voltage whose phase reverses with the sense of the error and whose amplitude is proportional to the magnitude of the error. This voltage is applied to a "resonant rate" circuit which is essentially a resonant circuit of inductance and capacitance in series. A constant alternating voltage results in constant alternating current in this circuit, and the circuit is so designed that a constant current produces no output. If the applied voltage changes, however, the circuit requires an appreciable time for its current to attain the steady state value corresponding to the changed voltage. This delay in the current can be used to produce a voltage approximately equal to the derivative of the input voltage. The servos which employ a small field control motor are also damped with error rates. In these servos, however, the error rate is obtained by demodulating the A.-C. error signal and applying it to a resistor-condenser circuit which produces an approximate derivative.

The servos which use a large field control motor employ an output tachometer for damping. This is a conventional permanent magnet generator which is contained in the same frame and on the same shaft as the servo motor itself. Before the tachometer voltage can be combined with the A.-C. error signal, the latter must be demodulated. The tachometer voltage is then combined with the demodulated error signal, usually through the circuit mentioned earlier which prevents rate lag. In some applications where rate lag is not objectionable, the tachometer voltage is combined directly with the demodulated error signal.

It is appropriate here to mention the electrical variable speed drives which form the tracking control. The tracking motors are field control motors identical with the field control servo motors. Instead of being combined with a D.-C. tachometer, as are some of the servo motors, the tracking motors are combined with an A.-C. tachometer. The structure and winding of this generator resemble those of a two phase induction motor. One field is constantly excited from a 400 cycle source, and the output is obtained from the second field winding. When the rotor is stationary, the magnetic field established by the excited winding cuts the output winding in a direction perpendicular to its axis and induces no voltage in it. When the rotor is rotating, the eddy currents induced in the rotor by the excited field have the effect of shifting the direction of the magnetic field so that it has a component in the direction of the axis of the output winding. This component induces a voltage in the output winding which is approximately proportional to the speed of the rotor. The tachometer voltage is subtracted from the voltage obtained from the hand control unit, and the difference of the two voltages is amplified and controls the field current of the tracking motor. This produces a motor rate proportional to the hand control displacement.

POLAR CONVERTER

In the description of the mechanical component resolver it was explained how the same mechanism can be used to perform the inverse operation under certain conditions of operation, but that this method is not possible if the values of x and y are unrestricted. The method of avoiding this difficulty in the Computer is to use r and $\theta$ as inputs to the mechanism at all times and to adjust the values of r and $\theta$ until the resulting values of x and y are equal to the given values, the values of r and $\theta$ obtained in this way being those related to x and y according to the relationship of FIG. 67.

In order to accomplish this, the r and $\theta$ shafts of a component resolver are turned by motors, as illustrated in FIG. 90. Let x and y be the values produced by the component resolver with inputs r and $\theta$, i.e., $x = r \cos \theta$ and $y = r \sin \theta$, and let $x_0$ and $y_0$ be the given values of the rectangular coordinates. By means of differentials, the differences $x_0 - x$ and $y_0 - y$ can be obtained. It is required to control the r and $\theta$ motors by means of signals derived from $x_0 - x$ and $y_0 - y$ in such a way that the motors drive these differences to zero. Assuming for the present that $x_0 - x$ and $y_0 - y$ are small, let $x_0 - x = dx$ and $y_0 - y = dy$, so that dx and dy are the increments that must be given to x and y respectively, in order to make them equal to $x_0$ and $y_0$. Differentiating the expressions $x = r \cos \theta$ and $y = r \sin \theta$, $$dx = dr \cos \theta - r \, d\theta \sin \theta$$
$$dy = dr \sin \theta + r \, d\theta \cos \theta$$

where dr and $d\theta$ are the increments that must be added to r and $\theta$ to produce increments dx and dy in x and y. Solving these equations for dr and $r \, d\theta$, $$dr = +dx \cos \theta + dy \sin \theta$$
$$r \, d\theta = -dx \sin \theta + dy \cos \theta$$

These equations express dr and $r \, d\theta$ directly in terms of the increments dx and dy. If dx and dy are regarded as components of a vector, dr and $r \, d\theta$ are components of the same vector along axes rotated through the angle $\theta$ from the direction of the axes along which dx and dy are measured, i.e., the new components are along and perpendicular to the radius r. According to the earlier description of a $2\phi - 2\phi$ synchro, such a synchro rotated in the angle $\theta$ produces voltages proportional to dr and $r \, d\theta$ when excited with voltages proportional to dx and dy. FIG. 91 shows the connections which transform the error signals $dx = x_0 - x$ and $dy = y_0 - y$, in accordance with the last equations, into signals for the amplifiers associated with the r and $\theta$ motors. The signal representing $r \, d\theta$ is indicated as passing through a circuit which divides it by r to produce $r \, d\theta / r = d\theta$ before entering the $\theta$ amplifier. In practice, the gain of the $\theta$ amplifier is controlled by the value of r to produce a similar effect. The r and $\theta$ motors are equipped with D.-C. tachometers, and the amplifiers employ circuits to combine the rate voltages with the error signals as in the case of the servos previously described.

In the polar converters used in the system, the inputs x and y are represented by synchro signals. The x and y outputs of the component resolver drive $1\phi - 3\phi$ synchros which act as receivers for the $x_0$ and $y_0$ synchro signals, and the error signals from the receivers are proportional, for small errors, to $x_0 - x$ and $y_0 - y$. An analysis of the behavior of the system when the errors are large becomes rather involved, but it is possible to show that the operation is always such as to reduce the errors. The ultimate accuracy of the conversion from rectangular to polar coordinates depends, of course, on the behavior of the system when the errors are small, and the previous description applies to this case.

The polar converter just described would more accurately be called a two dimensional polar converter. Such a device is used in the synchronous solution of the bombing problem in the manner indicated in FIG. 36. For the impact solution of the bombing problem, the component resolver which forms the mechanical part of this polar converter is used as a conventional component resolver (see FIG. 37). In addition to this two dimensional polar converter, the computer also contains a three dimensional polar converter to carry out the operations indicated schematically in FIG. 26. FIG. 92 illustrates the geometrical relation between three dimensional rectangular coordinates x, y, z and the corresponding three dimensional polar (or spherical) coordinates r, $\phi$, $\theta$. (Note: The symbols r, $\phi$, $\theta$ used here are those conventionally employed for spherical coordinates in analytic geometry and have no connection with the same symbols used elsewhere in this specification.)

In the computer, z corresponds to altitude and is always positive, while x and y may have either sign. Denoting by R the projection of r onto the xy-plane, it is seen from the figure that the conversion of values of x, y, z into values of r, $\phi$, $\theta$ be regarded as a sequence of two conversions from two dimensional rectangular coordinates to two dimensional polar coordinates. In the first conversion the values of x and y are used to obtain values of R and $\theta$. In the second conversion, R and z are treated as rectangular coordinates and are converted into polar coordinates r and $\phi$. In the three dimensional polar converter, the conversion of x and y into R and $\theta$ is performed by a two dimensional polar converter of the type already described. To convert R and z into r and $\phi$, use is made of the fact that z is always greater than zero and R is never less than zero. These circumstances make it possible to obtain r and $\phi$ simply by using R and z as rectangular coordinate inputs to a component resolver which produces r and $\phi$ directly without the use of servos. In designing the polar converter, however, it was found desirable to obtain the value of $\phi$ in this way, r being obtained from a three dimensional cam. Since the value of r is determined by the values of R and z, it would be possible in principle to construct a three dimensional cam translated in z and rotated in R from which a lift r could be obtained. The scale factors of the cam can be improved, however, by designing it to produce the smaller lift $r - R$ when translated in z and rotated in R. The lift $r - R$ is then added by means of a differentital to the value of R giving $(r - R) + R = r$ as the required output. This operation is indicated in FIG. 93. While the primary outputs of the three dimensional polar converter are (in the rotation of this discussion) r, $\phi$, $\theta$, the value of R is a secondary output for use in controlling the ground range sweep of the PPI display.

SCANNER ROLL COMPUTER

Previously the mathematical operations carried out by the scanner roll computer were described. This device is an example of a gimbal computer which reproduces spherical polygons in model form, the polygon being a triangle in this application. Before proceeding to a description of this computer, it will be convenient to make some statements regarding gimbal computers in general.

Any spherical polygon is made up of a sequence of segments of great circle arcs joined to each other at their ends. The arcs of the polygon are referred to as its sides and the junctions of successive sides as vertices. To avoid the necessity of considering the size of the sphere on which the polygon is drawn, the sides are measured by the angles which they subtend at the center of the sphere. The angles of the polygon are the angles between the two sides meeting at a vertex. In a theoretical discussion of a gimbal computer, it is simplest to describe the angles of a polygon in terms of the exterior angles. If one imagines himself walking around the polygon, the exterior angle at any vertex is the angle that must be turned through in passing from one side to the next. A closed polygon of n sides also has n angles, or a total of 2n "parts." Except in special cases, if all but three parts of a polygon have given values, then the values of these three parts are determined.

The mechanical representation of a spherical polygon depends on the fact that any side or any angle of a spherical polygon can be represented by a pair of gimbal rings pivoted together. As used here the term gimbal ring, or simply gimbal, refers to any member which supports two axes in the same plane and in directions perpendicular to each other. For a theoretical discussion, a gimbal ring can be represented as in FIG. 94 by a sleeve bearing and a short shaft joined by a member which maintains the axis of the bearing and the axis of the shaft in the same plane and perpendicular to each other. In the figure this member is shown as a quadrant of a circle, but any member which produces the required relationship between the bearing and the shaft would be satisfactory. The gimbals employed in actual gimbal computers are usually complete rings which carry two bearings on one axis and two shafts on an axis at right angles to the first.

Figure 95:
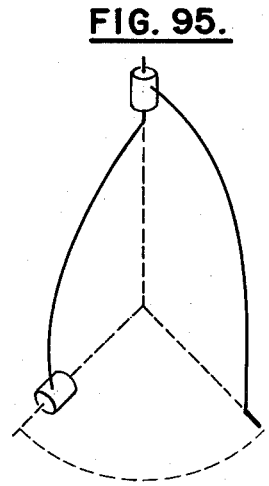

A side of a spherical polygon can be represented by two gimbal rings pivoted together as in FIG. 95, the shaft of one gimbal being held in the bearing of the other. The broken lines are the three axes of the two gimbals which have one axis in common. These lines intersect at a point which represents the center of the sphere and the broken arc joining the two lines is the side which is represented by the gimbals in the position shown. The angular measure of this side is evidently present as a relative angular displacement between the common shaft and bearing and may be read by means of a dial and pointer mounted at this common axis. If the side is a known side of the polygon under consideration, some means must be provided for introducing the required displacement of the two gimbals. In an actual gimbal computer, this is usually accomplished by mounting a received synchro and servo motor at the common axis of the two gimbals, the angle to be set up being transmitted from a synchro elsewhere in the system. If the side is an unknown side whose measure is required, a means must be provided for determining the displacement existing between the two gimbals, and this is ordinarily accomplished by mounting a transmitting synchro at the common axis, the electrical signals representing the displacement being transmitted to other parts of the system.

Figure 96:
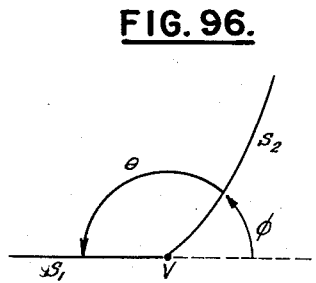
Figure 97:
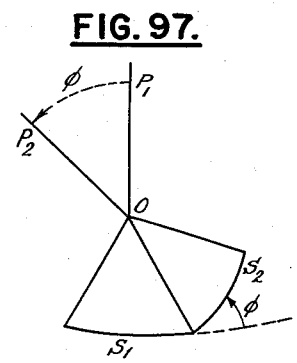
Figure 98:
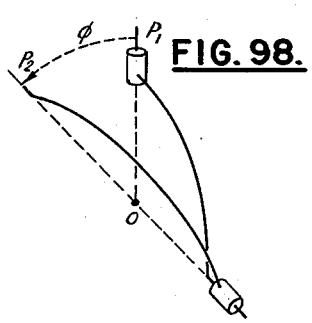
Figure 99:
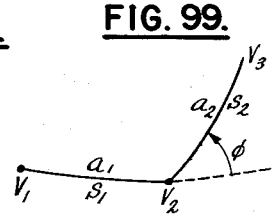

To describe how an angle of a spherical polygon can also be represented by a pair of gimbals, FIG. 96 shows two sides $S_1$ and $S_2$ meeting at a vertex V at which the exterior angle is $\phi$. The interior angle, which is more commonly used in describing the angle between two sides, is indicated by $\theta$. The polar axis of an arc on a sphere is a line through the center of the sphere perpendicular to the plane of the arc. FIG. 97 shows the arcs $S_1$ and $S_2$ and their polar axes $OP_1$ and $OP_2$, O being the center of the sphere. It is clear from the figure that the angle between the two polar axes is equal to the exterior angle at the vertex V. An exterior angle of a polygon can therefore be represented mechanically by a pair of gimbals pivoted together as in FIG. 98, the broken lines $OP_1$ and $OP_2$ representing the polar axes of the sides adjacent to the vertex. The angular measure of the exterior angle is present as an angular displacement of the two gimbals at their common axis. This configuration of two gimbals is the same as that previously described for representing a side of a polygon, and the same remarks concerning the establishment of a known angle or the determination of an unknown angle are applicable here.

Figure 100:
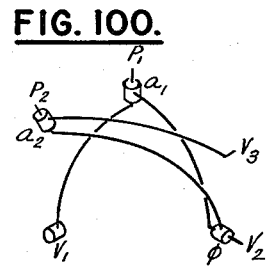

Having seen how a side or an angle of a polygon is represented, it is easy to see how any sequence of consecutive sides and angles is to be represented. Suppose, for example, that it is desired to represent the configuration of FIG. 99, in which $S_1$ is a side of angular measure $a_1$ having ends $V_1$ and $V_2$, and $S_2$ is a side of angular measure $a_2$ having ends $V_2$ and $V_3$, so that $V_2$ is the vertex at which the sides $S_1$ and $S_2$ meet, $\phi$ being the exterior angle at this vertex. If the two gimbals of FIG. 95 are taken as representing the side $a_1$, then it is seen by comparing FIGS. 95 and 98 that one of the two gimbals required for representing the angle $\phi$ is already present so that, once $a_1$ is represented, the adjacent angle requires only one more gimbal. This third gimbal is then one of the two required for the second side $a_2$, with the result that only one more gimbal is needed for this side. FIG. 100 then shows the four gimbals required to represent the configuration of FIG. 99, the proper angular displacement between pairs of gimbals being indicated at the common axis of each pair. This process can be continued to form a polygon of any number of sides. The representation of the first side requires two gimbals, and each additional part, angle, or side requires an additional gimbal. Thus, the open polygon $V_1S_1V_2 \ldots V_nS_nV_{n+1}$ of n sides would be represented by 2n gimbals. If this polygon is to be closed, then one end $V_1$ of the first side $S_1$ and one end $V_{n+1}$ of the last side $S_n$ constitute a single vertex, and the shaft representing $V_{n+1}$ is to be placed in the bearing which represents $V_1$.

Figure 101:
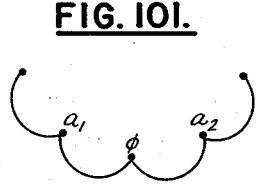
Figure 103:
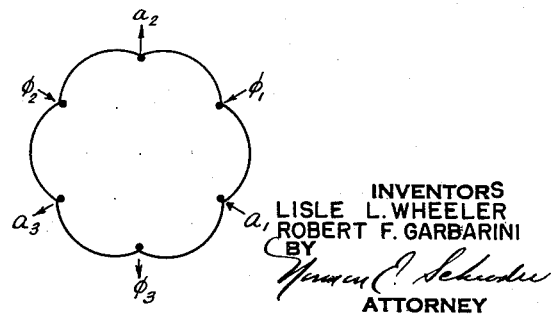
Figure 102:
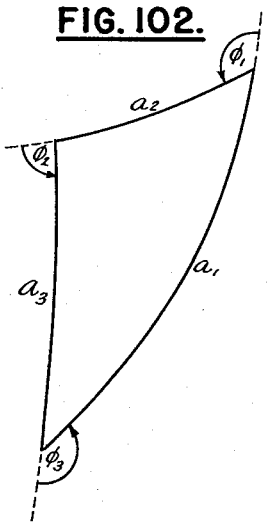

From FIG. 100 it is apparent that it is difficult to draw two dimensional figures which illustrate the relationships in space of a large number of gimbals. It is possible, however, to represent any gimbal computer by a plane diagram which is of a symbolic rather than of a pictorial character. In such a diagram the gimbals are represented by quadrants of circles, all of the same size. Instead of attempting to represent the true angular relationship between the planes of the various gimbals, all gimbals are drawn in the same plane, the axes on which pairs of gimbals are pivoted being represented simply as junction points between pairs of gimbals. FIG. 101 is a diagram constructed according to this scheme and is equivalent to FIG. 100. The angular measures of the various parts are indicated at the corresponding junction points of the diagram. FIG. 102 shows the general spherical triangle with the values of the sides and angles indicated, and FIG. 103 is the diagram of a gimbal computer which represents the triangle. This diagram also shows a method of indicating known and unknown parts of a polygon, known parts being designated by input arrows directed toward the corresponding junctions and unknown parts by output arrows directed away from the junctions.

In a practical gimbal computer, the assembly of gimbals must be supported in some way. This can be achieved by attaching any one gimbal to the base of the computer, i.e., making the base of the computer so that it is the mathematical equivalent of a gimbal. For this reason a gimbal computer sometimes appears to contain one less gimbal than is required to represent the polygon under consideration but it should be recognized that the base supports two perpendicular axes and is therefore to be counted as a gimbal. In the symbolic diagram of a gimbal computer, the gimbal which serves as a base can be indicated by drawing it as two sides of a square instead of as a circular quadrant. The base gimbal is selected as a matter of convenience, although it is usually desirable to choose a gimbal for which the two axes are inputs to the computer, since this allows the relatively heavy servo motors to be mounted on the base instead of being carried on a movable gimbal.

In certain other cases a gimbal computer contains fewer gimbals than would be thought necessary to represent the polygon under consideration. This is true when certain sides or angles of the polygon have values which are not merely known but are also constant. The angular displacement between the pair of gimbals corresponding to a constant part then remains fixed, and the pair of gimbals can be replaced with a single member which maintains the same angle between the two distinct axes of the originl pair of gimbals. The term "gimbal" can be extended to a member of this kind, even though its two axes are not perpendicular. Every fixed part of a polygon then allows two gimbals to be replaced with a single gimbal, with the result that the mechanical representation of an n-sided polygon with m fixed parts requires 2n—m gimbals, the base of the computer being counted as a gimbal. When the fixed part is one of 90 degrees, the two axes of the single gimbal which replaces two are perpendicular to each other, and this gimbal is not distinguishable from any other. If the fixed part is different from 90 degrees, the axes of the resulting gimbal are not perpendicular, and this fact can be indicated on the diagram of the computer by showing that gimbal as an arc of a circle equal to the angle between the axes and noting that angle at the gimbal. It should be pointed out that, when a single gimbal replaces a pair of fixed gimbals, the angles at the two axes of the new gimbal measured between that gimbal and the ones adjacent to it differ by 90 degrees from the values they previously had. This is a result of the fact that the plane of the single gimbal is perpendicular to the planes of the two gimbals which it replaces.

The diagram of FIG. 103 can easily be specialized to obtain the gimbal system of the scanner roll computer. For this purpose the triangle of FIG. 102 is identified with that of FIG. 65 by letting $a_1 = 90° + (p_2 - \beta)$, $$\phi_1 = 180° - (90° - r_2)$$

Figure 104:
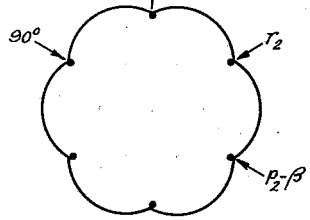
Figure 105:
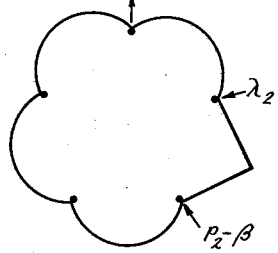

$a_2 = \delta$, and $\phi_2 = 90°$. In indicating in a diagram the inputs and outputs to a gimbal computer, it is unnecessary to indicate any constant part of a variable input or output, since such constants can be accounted for in setting up the data transmission systems. With this convention, FIG. 104 is a diagram of a gimbal system representing the triangle of FIG. 65. Since one of the inputs is constantly equal to 90 degrees, the two corresponding gimbals can be replaced with a single gimbal. This simplified gimbal system is shown diagrammatically in FIG. 105. This same diagram indicates which of the gimbals is to serve as the base of the computer. FIG. 106 is an isometric drawing showing the complete gimbal rings of the actual scanner roll computer. The output $\delta$ is taken from a $1\phi$—$3\phi$ synchro at the center of the computer. It should be noticed that the stator (or case) of the synchro carries two perpendicular axes, the axis on which it is supported in the gimbal ring surrounding it and the axis of its rotor shaft. According to the earlier definition, the synchro is therefore the equivalent of a gimbal and the synchro, as well as the base, must be counted among the five gimbals of FIG. 105.

It is appropriate to describe here the way in which the synchro output is utilized. It was pointed out above that the angle $\delta$ is needed to correct the azimuth mark and also the P.P.I. position angle. The rotor of the synchro is excited from a 400 cycle source, and signals which represent in the conventional manner the angle $\delta$ are obtained from the three stator leads. These signals are the starting point for the sequence of operations indicated in FIG. 47, the additions involving $\theta'_{13}$ and $\theta'_{12}$ being carried out by differential synchros rotated by the azimuth axes of the antenna and stabilization unit, respectively. The correction needed for the P.P.I. position angle is obtained from the same synchro by a different method. It is evident that any two windings of a three winding stator that are connected in series are equivalent, except for a constant factor of porportionality, in the output voltage, to a single winding whose axis bisects the angle between the axes of the two windings under consideration. The voltage across a properly selected pair of stator leads is therefore the same as would be obtained from a $1\phi$—$1\phi$ synchro, i.e., proportional to sin $\delta$. This signal is subtracted from the error signal of the P.P.I. position angle receiving synchro before the latter is used as an input to the servo amplifier. The servo therefore turns the deflection coil and receiving synchro until this combined signal is zero. This means that the error signal developed by the receiving synchro must be proportional to sin $\delta$ and, hence, that the rotor must be displaced through an angle $\delta$ from the position it would otherwise assume. These operations are indicated in FIG. 46. Although the output of the synchro used for correcting the P.P.I. position angle is really sin $\delta$, the output has been shown as $\delta$ because it is used in such a way as to produce a rotation equal to $\delta$ and not to its sine.

EQUIVALENCE OF PRISMS AND MIRRORS

In the previous discussion of the periscope optical systems, it was convenient to suppose that deflections of the line of sight from the axis of the telescope were produced by mirrors placed in front of the telescope objective. The purpose of the following paragraphs is to demonstrate the equivalence of a prism and a mirror in the application under consideration.

FIG. 107 shows the path of a ray of light through an isosceles prism with a reflecting base. Let $R_1F_1$ be a ray which enters the prism at $F_1$ and is refracted there to strike the base at B. The ray is then reflected at B and emerges from the prism at $F_2$, being refracted there to assume the final direction $F_2R_2$. If the incident ray $R_1F_1$ is displaced parallel to itself, the angle which the ray makes with the normal to the face of the prism is not changed and, therefore, the refracted ray $F_1B$ does not change in direction but moves parallel to itself. This parallel motion of $F_1B$ results in a parallel motion of the reflected ray $BF_2$ and, therefore, of the emergent ray $F_2R_2$ so that parallel rays incident on one face emerge as parallel rays from the other face. As a consequence, in order to find the relation between the directions of an incident ray and its emergent ray, the given incident ray may be replaced with any ray parallel to it. Consider then a ray parallel to the given ray which strikes the base of the prism at a point B on the bisector $B_1B_2$ of the base, this being the particular ray illustrated in the figure. Because the segments $BF_1$ and $BF_2$ make equal angles with the normal to the base at a point B on the bisector of the base, they meet their respective faces at equal angles and are therefore refracted through equal angles, so that the whole course of the ray $R_1F_1B$ is congruent to the ray $R_2F_2B$. If the part of the path $R_1F_1B$ were represented by a material wire, bent at $F_1$, and where turned through an angle of 180 degrees about the normal to the base at B, it would then coincide with the other part of the path $R_2F_2B$. The rays $R_1F_1$ and $R_2F_2$ therefore make equal angles with the base of the prism in parallel planes perpendicular to the base. The angle of the incident ray is equal to the angle of the emergent ray, just as the angles of incidence and reflection from a plane mirror are equal. However, if the rays $R_1F_1$ and $R_2F_2$ are extended without refraction through the faces of the prism, they do not strike the base of the prism at the same point and, to this extent, the prism does not behave as a plane mirror, the final ray having the same direction it would have if reflected from a mirror but being displaced parallel to such a ray. If, however, the prism is placed before the objective of a telescope intended for viewing distant objects, it is indistinguishable from a mirror because the rays issuing from a single point of a distant object are substantially parallel, and such a telescope brings all rays of a parallel bundle to a single image point.

An extension of this argument shows that the prism introduces no chromatic aberration. If white light enters the prism along $R_1F_1$, the components of different colors are refracted different amounts at $F_1$ due to the variation of refractive index with color. These colored rays strike the base at different points and are reflected to emerge from the second face at different points. The demonstration of the equality of the angles of incidence and emergence, however, made no use of the particular value of the refractive index so that this relation holds between the incident ray and any one of the emergent colored rays. The emergent colored rays are, therefore, parallel to one another. If the telescope is achromatized for distant objects, its property of bringing parallel rays to a single image point extends also to rays of different colors, and the colored rays emerging from the prism are recombined by the telescope.

The property of the prism which makes its use necessary in the periscope is its ability to transmit rays which make a small angle with its base. A mirror would have to be extremely large in order to intercept and reflect an appreciable cross section of a parallel bundle which make a small angle with base, while the prism intercepts and effectively reflects all the rays of such a bundle which strike its sloping face. The prisms used in the periscope consist of two isosceles prisms, such as that shown in FIG. 107, with their reflecting bases cemented together. This construction allows the prism to transmit rays originating on either side of the plane of the cemented bases and produces the effect of a thin mirror with two reflecting faces which can be used "edge on" to the incident light.

TIMING CONTROLS FOR MEMORY POINT TRACKING MECHANISM

Figure 61:
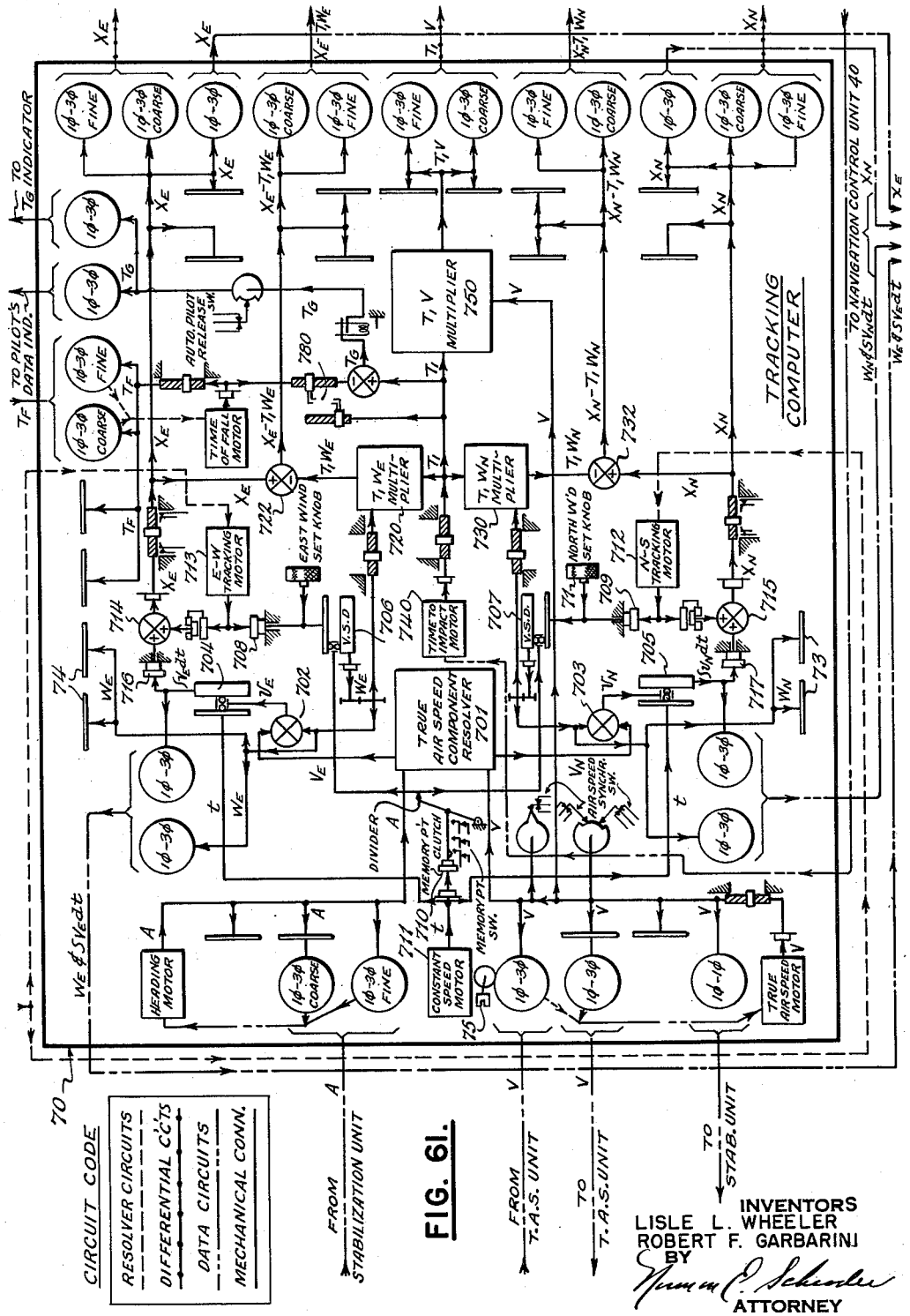

Under the heading, Wind Determination, it was stated that during a tracking run the tracking control 10 (FIG. 3) is effective to control the cross hairs during a period from 15 seconds after the run is started until 5 minutes after the run is started. To obtain this result the "Displacement-Memory Point" switch 21 (FIG. 4) is arranged, when shifted to its memory point position, to close a relay circuit which is effective:

(1) To retain switch 21 in its memory point position;
(2) To de-energize the field windings of tracking motors 712, 713; and
(3) To engage clutches 708, 709, 710 (FIG. 61).

The de-energization of motors 712, 713 renders the tracking control ineffective temporarily to control the sight line. The engagement of clutch 710 causes a pinion 760 (FIG. 108) to be rotated by constant speed motor 711, the time reference of the system, to advance a rack 761 against the tension of its restoring spring. Fixed to the end of rack 761 is a contact closing member 762 adapted, during the course of the travel of the rack, to close contacts 763, 764 and 765. Also fixed to rack 761 is a pendant arm 766 having a roller 767. In the starting position of rack 761 the roller 767 is aligned with, but out of contact with, a lever 768 pivoted to the frame at 769. During the travel of rack 761, roller 767 engages lever 768 and rotates it about its pivot to actuate a roller 770 mounted on the end of a rod 771 which transmits the lever movement to the ball carriage of memory point variable speed drive 706.

Another roller and rod (not shown) are arranged to actuate the ball carriage of memory point variable speed drive 707 simultaneously.

The device is so arranged that 15 seconds after the engagement of clutch 710, rack 761 is advanced to a point where member 762 closes contact 763 and roller 767 engages lever 768. The closing of contact 763 activates suitable circuits to re-energize the field windings of tracking motors 712, 713 and to light a signal lamp to inform the operator that tracking control 10 is ready for use. By use of the tracking control, the operator may then position the cross hairs to adjust the wind components, as required during the remainder of the tracking run. As roller 767 rotates lever 765 the ball carriages of the memory point variable speed drives are moved proportionally to the time elapsed since the start of the run.

At the expiration of 4½ minutes of the tracking run, rack 761 is advanced to a point to cause member 762 to close contacts 764. These contacts energize a circuit to light a second signal lamp to warn the operator that only 30 seconds of the tracking run remain. At the expiration of 5 minutes of the tracking run, member 762 closes contact 765 which closes suitable circuits to perform the following functions:

(1) To de-energize clutches 708, 709 and 710;
(2) To de-energize the relay holding switch 21 in its memory point position; and
(3) To open the signal lamp circuits established by contacts 763 and 764.

De-energization of clutch 710 releases rack 761 and permits it to be returned to its starting position by its spring. As the rack is returned, a spring attached to rod 771 restores the rod and lever 768 to their starting positions, whereby the ball carriages of variable speed drives 706, 707 are returned to their outermost positions. The de-energization of clutches 708, 709 isolates the memory point variable speed drives from the tracking circuit and prevents any change in the wind components established during the tracking run. The restoration of switch 21 to its displacement position closes a suitable circuit to re-energize the field windings of tracking motors 712, 713 to permit the cross hairs to be moved in displacement by the operator by the use of tracking control 10.

GLOSSARY OF SYMBOLS

In some instances the symbols employed throughout the specification are used in several ways. This is necessary to reduce the number of symbols to a minimum, and to adhere more or less closely to convention. Listed below are the symbols used and, where a particular symbol is used in more than one way, each meaning is listed together with the symbol.

| Symbol | Definition |
| --- | --- |
| $A, h_1$ | Aircraft heading. |
| $A_0$ | Release heading. |
| $a$ | Angular measure of a side of a spherical polygon. |
| $\alpha$ | Magnetic variation. |
| $B$ | Magnetic heading. |
| $\beta$ | Sighting angle. |
| $C$ | Course angle of ground track. |
| $D$ | Slant range, true heading. |
| $\delta$ | Radar correction angle. |
| $\Delta$ | Difference. |
| $E$ | Voltage, East. |
| $e$ | Error, error signal. |
| $F_1, F_2, F_3$ | Components of magnetic flux, forces. |
| $f$ | Frequency. |
| $H$ | Altitude. |
| $h$ | Heading of a system axis. |
| $h'_1$ | Approximate heading of the aircraft. |
| $h_2$ | Heading of the stabilization unit axes. |
| $\theta$ | Relative bearing, shaft rotation, angle of spherical polygon, polar coordinate, spherical coordinate. |
| $\theta'_{12}$ | Angle between the aircraft and stabilization unit axes measured in the floor plane of the aircraft. |
| $\theta'_{13}$ | Angle between the aircraft and antenna axes measured in the floor plane of the aircraft. |
| $I$ | Current. |
| $K$ | Offset distance. |
| $L$ | Trail. |
| $\Lambda$ | Longitude. |
| $\lambda$ | Level signal resultant. |
| $\lambda_1, \lambda_2$ | Level signals. |
| $M$ | Torque in the stable element as a result of $m_3, m_4, m_5$. |
| $M_1, M_2, M_3$ | Components of $M$. |
| $m_3, m_4, m_5$ | External motor torques. |
| $\mu$ | Difference between aircraft heading as obtained from the stabilization unit and aircraft heading obtained from the Flux Valve, corrected for magnetic variation. |
| $N$ | North, torque perpendicular to gyro spin axis. |
| $n$ | Number. |
| $O$ | Center. |
| $P$ | Pitch. |
| $p_2$ | Pitch of stabilization unit axes. |
| $q$ | Tilt. |
| $R$ | Radius, ground range. |
| $r$ | Roll, polar coordinate, spherical coordinate. |
| $r_2$ | Roll of stabilization unit axes. |
| $\rho$ | $T_1V-L$. |
| $S$ | Side of a spherical polygon. |
| $t, T$ | Time, time interval. |
| $T_F$ | Time-of-fall. |
| $T_G$ | Time-to-go. |
| $T_I$ | Time-to-impact. |
| $u_1, u_2, u_3$ | Unit vectors. |
| $V$ | Airspeed. |
| $V_0$ | Airspeed at release. |
| $v$ | Ground speed. |
| $W$ | Wind. |
| $X$ | Ground travel. |
| $x$ | Rectangular coordinate. |
| $XYZ$ | Axes having a fixed orientation. |
| $xyz$ | Axes whose orientation is specified by roll, pitch and heading. |
| $x_1y_1z_1$ | Aircraft axes. |
| $x_2y_2z_2$ | Stabilization unit axes. |
| $x_3y_3z_3$ | Antenna axes. |
| $\Phi$ | Latitude. |
| $\phi$ | Bearing of the line-of-sight, angular position, exterior angle, spherical coordinate. |
| $Y$ | Ground travel of bomb during interval $T_1$. |
| $y$ | Rectangular coordinate. |
| $\psi$ | Position angle of PPI image. |
| $\Omega$ | Angular velocity of the earth. |
| $\omega$ | Angular velocity. |

Since many changes could be made in the above construction and many apparently widely different embodiments of this invention could be made without departing from the scope thereof, it is intended that all matter contained in the above description or shown in the accompanying drawings shall be interpreted as illustrative and not in a limtiing sense.

What is claimed is:

1. A ground travel computer for aircraft comprising means to determine the heading of the aircraft with respect to magnetic North, means to determine the airspeed of the aircraft, means to resolve aircraft heading and airspeed into components along North-South and East-West axes, means to determine the components of wind direction and magnitude along such axes by reference to a ground position, means to combine the components of aircraft heading and airspeed with the corresponding components of wind direction and magnitude, means to convert each of the combined components to corresponding tentative values of latitude and longitude, computer means responsive to said tentative values of latitude and longitude for providing a measure of magnetic variation at said values of latitude and longitude, and means responsive to said variation measure for controlling said heading determining means whereby to convert said tentative values of latitude and longitude to actual values thereof.

2. A bombing computer for aircraft comprising means to determine the heading and airspeed of the aircraft, means to resolve aircraft heading and airspeed into components along North-South and East-West axes, means to determine the components of wind direction and magnitude along such axes, means to combine the components of aircraft heading and airspeed with the corresponding components of wind direction and magnitude, means to integrate each of the combined components with respect to time whereby to provide measures of North-South and East-West components of ground position of the craft with respect to a target, means to multiply each of the components of wind direction and magnitude by a tentative value of time-to-impact, means to combine such products with the respective North-South and East-West components of aircraft position whereby to provide tentative values of North-South, East-West components of release heading and air mass distance to target minus trail based on said tentative value of time-to-impact, means to convert said tentative component values to the corresponding polar coordinate values of release heading and air mass distance to target minus trail, means to multiply the tentative value of time-to-impact by airspeed, means to subtract trail from such product whereby to provide a tentative value of air mass distance to target based on airspeed and trail, means to compare both said tentative values of air mass distance to target minus trail for providing an output proportional to the difference therebetween, and means to vary said tentative value of time-to-impact in accordance with said output whereby to provide a measure of the actual time-to-impact and simultaneously to correct said values of release heading and air mass distance to target minus trail.

3. Apparatus as set forth in claim 2 further including means to subtract time-of-fall from the output of said last-mentioned means to derive time-to-go, and means to subtract aircraft heading from the corrected value of release heading to derive an aircraft turn signal.

4. Apparatus as set forth in claim 3 further including means operable to release a bomb, and means to operate the bomb release means when time-to-impact equals time-of-fall.

5. Apparatus as set forth in claim 2 further including a sighting device and means to position the sight line established by the sighting device, means to establish the North-South and East-West components of the distance between a target and an aiming point, means to combine the aiming point components with the corresponding integrals with respect to time of said combined components of aircraft heading, airspeed and wind direction and magnitude, means to convert the last recited values and the value of altitude to their corresponding polar coordinate values, and means to control the sight line positioning means in accordance with such polar coordinate values.

6. An impact bombing computer for aircraft comprising a sighting device and means to position the sight line established by the sighting device, means operative continuously to determine the heading, airspeed and altitude of the aircraft, means to determine the North-South and East-West components of wind direction and magnitude, means to multiply each of the wind components by time-of-fall, means to combine each such product with a tentative value of the corresponding components of distance-to-impact-point whereby to provide a first tentative measure of required North-South and East-West sighting device position components based on said tentative value of distance-to-impact point, means to multiply time-of-fall by airspeed, means to subtract trail from such product, means to resolve such difference and the value of aircraft heading into their rectangular coordinate values whereby to provide a second tentative measure of required North-South and East-West sighting device position components based on actual measures of distance-to-impact point, means to equate said first and second tentative measures, means to modify the tentative values of distance-to-impact point in accordance with the inequality of such equated measures, means to convert said component measures and the value of altitude to their corresponding polar coordinate values, and means to control the sight line positioning means in accordance with such polar coordinate values.

7. A pilot's indicator for bomber aircraft for correlating degrees of turn of said craft with time-to-go to bomb release comprising a first scale calibrated in degrees of turn and increasing in magnitude from each side of a zero turn reference index corresponding to a reference heading, a second scale calibrated in increasing values of time-to-go from each side of a zero time-to-go reference index, said zero reference indices being mutually aligned with each other, a heading pointer cooperable with said first scale for indicating the degrees of turn of said craft in either direction from said reference heading, a pair of time-to-go pointers cooperable with said second scale, each pointer being movable in like magnitudes but opposite directions from said time-to-go reference index, means for positioning said first pointer in accordance with turns of said aircraft from said reference heading, and means for positioning said pair of pointers in accordance with time to go to bomb release whereby as the time-to-go to bomb release decreases said pair of pointers indicate the limits of the amount of turn of the aircraft permissible for effective bombing.

8. An aircraft navigation aid for correlating degrees of turn of said craft with a computed, variable flight condition which is satisfied in dependence upon a craft heading attaining a reference heading comprising a first scale calibrated in degrees of turn and increasing in magnitude from each side of a zero turn reference index corresponding to said reference heading, a second scale calibrated in values of said computed condition from each side of a condition-satisfied reference index, said zero reference indices being mutually aligned with each other, a heading pointer cooperable with said first scale for indicating the degrees of turn of said craft in either direction from said reference heading, a pair of pointers cooperable with said second scale and said first pointer, each pointer being positionable in like magnitudes but opposite directions from said condition-satisfid reference index, means for positioning said first pointer in accordance with turns of said aircraft from said reference heading, and means for positioning said pair of pointers in accordance with said computed condition whereby as the condition approaches satisfaction said pair of pointers indicate the limits of the amount of turn of the aircraft permissible for condition satisfaction.

9. In a bombing computer for aircraft including means for continuously supplying measures of craft heading, airspeed, and altitude, the combination comprising means for providing measures of the North-South and East-West components of craft position with respect to a target, means for providing a measure of a tentative value of time-to-impact, means for combining said time-to-impact measure with measures of North-South and East-West components of wind and for supplying an output proportional to the product thereof, means for algebraically combining respective components of ground position with the products of said last-mentioned means whereby to provide measures of tentative values of North-South and East-West components of release heading and air mass distance to target minus trail, means for converting said North-South and East-West components of release heading and air mass distance to target minus trail to their corresponding polar coordinate values whereby to provide a first tentative measure of air mass distance to target, means coupled to receive said tentative measure of time-to-impact and said airspeed measure for providing an output proportional to the product thereof, means for subtracting a measure of trail from said last product whereby to provide a second tentative measure of air mass distance to target, and means responsive to the difference between said first and second measures for varying the tentative value of said time-to-impact measure until said difference is zero whereby to correct said tentative time-to-impact value and thereby provide a corrected value of release heading and air mass distance to target.

References Cited in the file of this patent

UNITED STATES PATENTS

| | | |
|---|---|---|
| 1,919,191 | Bates | July 25, 1933 |
| 2,116,508 | Colvin | May 10, 1938 |
| 2,408,356 | Willard | Sept. 24, 1946 |
| 2,428,770 | Albert | Oct. 14, 1947 |
| 2,480,208 | Alvarez | Aug. 20, 1949 |
| 2,507,567 | Garnier | May 16, 1950 |
| 2,577,313 | Downing | Dec. 4, 1951 |
| 2,593,902 | Lee | Apr. 22, 1952 |
| 2,823,585 | Gray et al. | Feb. 18, 1958 |
| 2,825,055 | Chance | Feb. 25, 1958 |